US011516224B2

(12) United States Patent
Almaz et al.

(10) Patent No.: US 11,516,224 B2
(45) Date of Patent: Nov. 29, 2022

(54) USING AN ENTITY REPUTATION WHEN CALCULATING AN ENTITY RISK SCORE

(71) Applicant: Forcepoint, LLC, Austin, TX (US)

(72) Inventors: Assaf Almaz, Ra'anana (IL); Ofir Arkin, Tel Aviv (IL)

(73) Assignee: Forcepoint LLC, Austin, TX (US)

( * ) Notice: Subject to any disclaimer, the term of this patent is extended or adjusted under 35 U.S.C. 154(b) by 280 days.

(21) Appl. No.: 17/012,640

(22) Filed: Sep. 4, 2020

(65) Prior Publication Data

US 2022/0070201 A1 Mar. 3, 2022

Related U.S. Application Data

(60) Provisional application No. 63/072,563, filed on Aug. 31, 2020.

(51) Int. Cl.
*H04L 9/40* (2022.01)
*G06F 21/56* (2013.01)
(Continued)

(52) U.S. Cl.
CPC .......... *H04L 63/14* (2013.01); *G06F 21/566* (2013.01); *G06F 21/577* (2013.01);
(Continued)

(58) Field of Classification Search
CPC ... H04L 63/14; H04L 63/102; H04L 63/1416; H04L 63/1425; H04L 63/1433;
(Continued)

(56) References Cited

U.S. PATENT DOCUMENTS 6,366,926 B1 4/2002 Pohlmann et al.
8,819,442 B1 * 8/2014 Gehrig ............... H04L 63/1433
713/180
(Continued)

FOREIGN PATENT DOCUMENTS

WO 2006099218 A2 9/2006
WO 2016081520 A1 5/2016

OTHER PUBLICATIONS

Goebel et al., Comparing Ingress and Egress Detection to Secure Interdomain Routing: An Experimental Analysis, Dec. 2011, ACM, vol. 11, No. 2, Article 5, pp. 5:1-5:26.
(Continued)

*Primary Examiner* — Darren B Schwartz
(74) *Attorney, Agent, or Firm* — Terrile, Cannatti & Chambers; Stephen A. Terrile

(57) ABSTRACT

A system, method, and computer-readable medium are disclosed for performing event risk score generation operation. The event risk score generation operation includes identifying an anomalous event from a plurality of events enacted by the entity; generating a first event risk severity score based upon the anomalous event; generating a second event risk severity score based upon a historical entity risk function, the historical entity risk function providing an indication of historical security risk of the entity; generating an entity risk severity score for the entity, the generating using the historical entity risk function and the event risk severity score; performing a risk-adaptive prevention operation, the risk-adaptive prevention operation using the entity risk severity score, the risk-adaptive prevention operation adaptively responding to mitigate risk associated with the anomalous event.

20 Claims, 21 Drawing Sheets

(51) Int. Cl.
*G06F 21/57* (2013.01)
*H04L 67/306* (2022.01)

(52) U.S. Cl.
CPC ........ *H04L 63/102* (2013.01); *H04L 63/1416* (2013.01); *H04L 63/1425* (2013.01); *H04L 63/1433* (2013.01); *H04L 63/205* (2013.01); *H04L 67/306* (2013.01); *G06F 2221/034* (2013.01)

(58) Field of Classification Search
CPC ..... H04L 63/205; H04L 67/306; H04L 63/20; G06F 21/566; G06F 21/577; G06F 2221/034
See application file for complete search history.

(56) References Cited

U.S. PATENT DOCUMENTS

| | | | |
|---|---|---|---|
| 8,863,297 B2 | 10/2014 | Sharma et al. | |
| 8,955,091 B2 | 2/2015 | Kailash et al. | |
| 9,081,940 B2 | 7/2015 | Trevor et al. | |
| 9,516,053 B1 | 12/2016 | Muddu et al. | |
| 9,805,422 B1* | 10/2017 | May | G06Q 40/02 |
| 9,882,918 B1 | 1/2018 | Ford et al. | |
| 10,003,607 B1 | 6/2018 | Kolman et al. | |
| 10,015,185 B1* | 7/2018 | Kolman | H04L 63/1425 |
| 10,147,065 B1 | 12/2018 | Yiftachel et al. | |
| 10,496,815 B1 | 12/2019 | Steiman et al. | |
| 10,686,819 B2* | 6/2020 | Mylavarapu | H04L 63/1433 |
| 10,936,717 B1 | 3/2021 | Herman Saffar et al. | |
| 2002/0104014 A1 | 8/2002 | Zobel et al. | |
| 2002/0156601 A1 | 10/2002 | Tu et al. | |
| 2003/0093479 A1 | 5/2003 | Mellen-Garnett et al. | |
| 2003/0105801 A1 | 6/2003 | Tse et al. | |
| 2004/0143753 A1* | 7/2004 | Hernacki | H04L 63/14 726/25 |
| 2005/0229183 A1 | 10/2005 | Araujo et al. | |
| 2008/0086759 A1 | 4/2008 | Colson | |
| 2008/0288330 A1 | 11/2008 | Hildebrand et al. | |
| 2009/0177985 A1 | 7/2009 | Mueller et al. | |
| 2009/0199264 A1 | 8/2009 | Lang | |
| 2010/0064341 A1 | 3/2010 | Aldera | |
| 2010/0169474 A1 | 7/2010 | Beckett, III et al. | |
| 2010/0212010 A1 | 8/2010 | Stringer et al. | |
| 2011/0225650 A1 | 9/2011 | Margolies et al. | |
| 2011/0246460 A1 | 10/2011 | Hsieh et al. | |
| 2011/0246988 A1 | 10/2011 | Hui et al. | |
| 2011/0307957 A1 | 12/2011 | Barcelo et al. | |
| 2013/0024937 A1* | 1/2013 | Glew | G06F 21/577 726/23 |
| 2013/0246605 A1 | 9/2013 | Mahadik et al. | |
| 2014/0007132 A1 | 1/2014 | Gaxiola et al. | |
| 2014/0172497 A1* | 6/2014 | Kim | G06Q 10/0635 705/7.28 |
| 2014/0359777 A1* | 12/2014 | Lam | G06F 21/577 726/25 |
| 2015/0074750 A1 | 3/2015 | Pearcy et al. | |
| 2015/0229624 A1 | 8/2015 | Grigg et al. | |
| 2015/0339477 A1 | 11/2015 | Abrams et al. | |
| 2016/0004862 A1 | 1/2016 | Almehmadi et al. | |
| 2016/0180078 A1 | 6/2016 | Chhabra et al. | |
| 2016/0205106 A1 | 7/2016 | Yacoub et al. | |
| 2016/0226911 A1 | 8/2016 | Boss et al. | |
| 2016/0232352 A1 | 8/2016 | Chen et al. | |
| 2016/0232353 A1 | 8/2016 | Gupta et al. | |
| 2016/0248797 A1 | 8/2016 | Yampolskiy et al. | |
| 2016/0321352 A1 | 11/2016 | Patel et al. | |
| 2016/0328562 A1 | 11/2016 | Saxena et al. | |
| 2016/0357778 A1 | 12/2016 | MacKenzie et al. | |
| 2017/0070506 A1 | 3/2017 | Reddy et al. | |
| 2017/0098086 A1* | 4/2017 | Hoernecke | G06Q 10/10 |
| 2017/0213037 A1* | 7/2017 | Toledano | H04L 63/06 |
| 2017/0230417 A1 | 8/2017 | Amar et al. | |
| 2017/0286671 A1 | 10/2017 | Chari et al. | |
| 2018/0004948 A1 | 1/2018 | Martin et al. | |
| 2018/0027006 A1 | 1/2018 | Zimmermann et al. | |
| 2018/0084012 A1 | 3/2018 | Joseph et al. | |
| 2018/0124091 A1 | 5/2018 | Sweeney et al. | |
| 2018/0218157 A1 | 8/2018 | Price et al. | |
| 2018/0219888 A1 | 8/2018 | Apostolopoulos | |
| 2018/0302266 A1 | 10/2018 | Makovsky et al. | |
| 2018/0307833 A1 | 10/2018 | Noeth et al. | |
| 2018/0309795 A1 | 10/2018 | Ithal et al. | |
| 2018/0316684 A1 | 11/2018 | Desai et al. | |
| 2018/0337971 A1 | 11/2018 | Aleksandrov | |
| 2018/0341758 A1 | 11/2018 | Park et al. | |
| 2019/0036970 A1* | 1/2019 | Shih | H04L 63/1425 |
| 2019/0066670 A1 | 2/2019 | White et al. | |
| 2019/0180208 A1* | 6/2019 | Nelson | G06F 16/22 |
| 2019/0205533 A1 | 7/2019 | Diehl et al. | |
| 2019/0245881 A1* | 8/2019 | Ward | H04L 63/1433 |
| 2019/0318128 A1 | 10/2019 | Ackerman et al. | |
| 2020/0117177 A1 | 4/2020 | Cantrell | |
| 2020/0314134 A1 | 10/2020 | Izrael et al. | |
| 2021/0152570 A1 | 5/2021 | Mortensen et al. | |
| 2021/0158362 A1* | 5/2021 | Fazeli | H04L 63/123 |
| 2021/0194903 A1 | 6/2021 | Medvedovsky et al. | |
| 2021/0226976 A1 | 7/2021 | Almaz et al. | |
| 2021/0250342 A1* | 8/2021 | Budman | H04L 63/08 |
| 2021/0273958 A1 | 9/2021 | McLean | |
| 2021/0337299 A1 | 10/2021 | Dickins et al. | |

OTHER PUBLICATIONS

Papagiannapoulou et al., Concept-Based Image Clustering and Summarization of Event-Related Image Collections, Nov. 7, 2014, ACM, pp. 23-28.

Du et al., Defense Deployment with Network Egress and Ingress Filtering, 2010, IEEE, pp. 1-6.

Manusankar et al., Intrusion Detection System with Packet Filtering for IP Spoofing, Dec. 29, 2010, IEEE pp. 563-567.

Pramit Choudhary, Introduction to Anomaly Detection, Oracle Data Science, Feb. 15, 2017 https://blogs.oracle.com/datascience/introduction-to-anomaly-detection.

Anomaly, Detecting Anomalies with Moving Median Decomposition, Jan. 12, 2016 https://anomaly.io/anomaly-detection-moving-median-decomposition/.

NRCS, U.S. Department of Agriculture, Natural Resources Conservation Service, Media vs. Average to Describe Normal, downloaded Jul. 8, 2020, https://www.wcc.nres.usda.gov/normals/median_average.htm.

The Mitre Corporation, Mitre Attack, Enterprise Matrix screenshot, Jul. 2, 2020, https://attack.mitre.org/matrices/enterprise/.

* cited by examiner

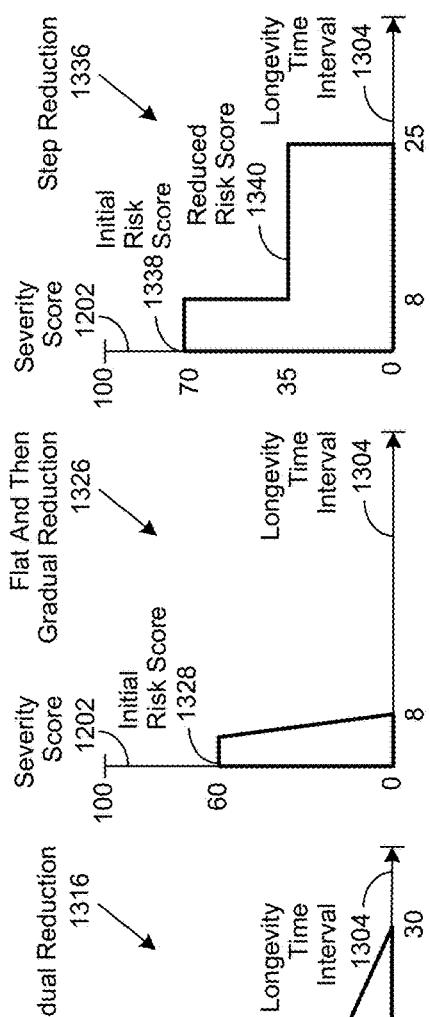
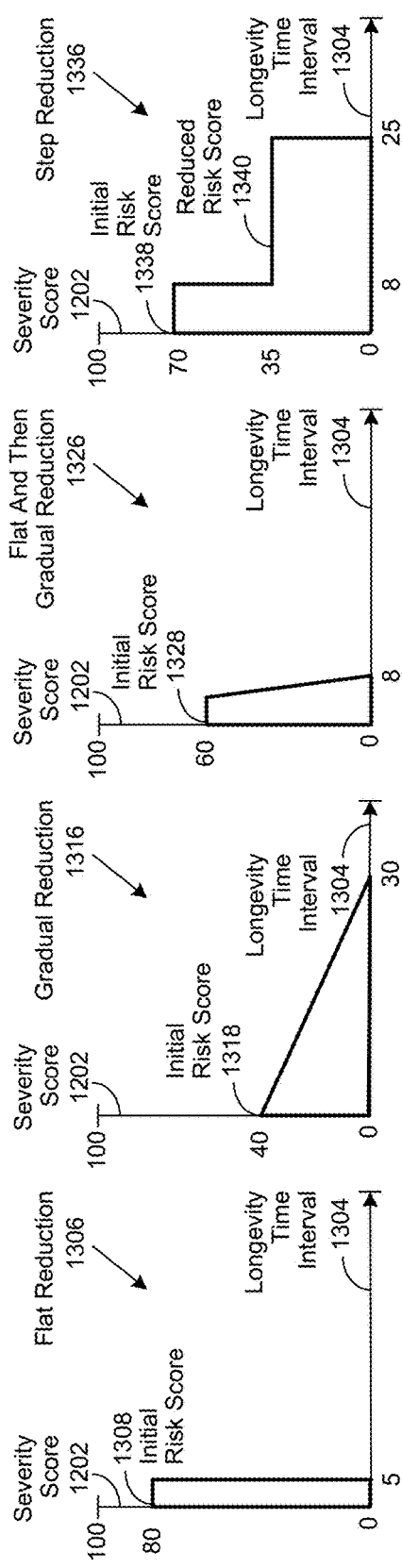
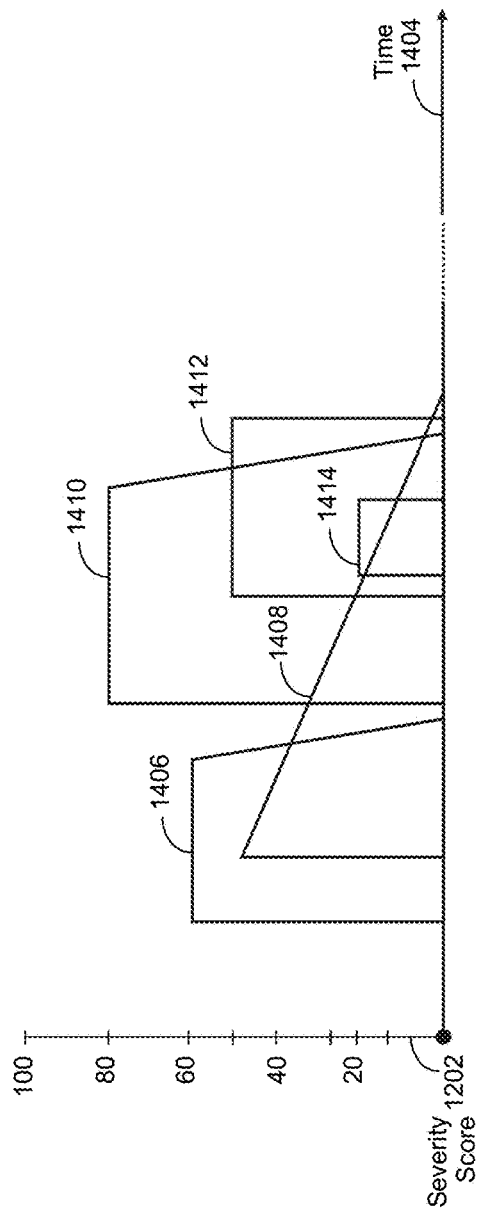

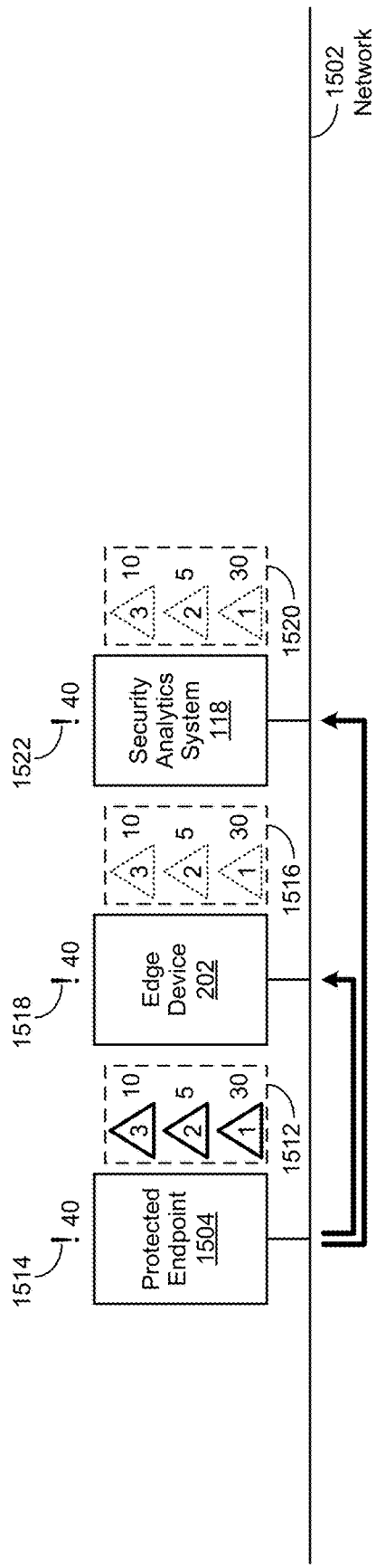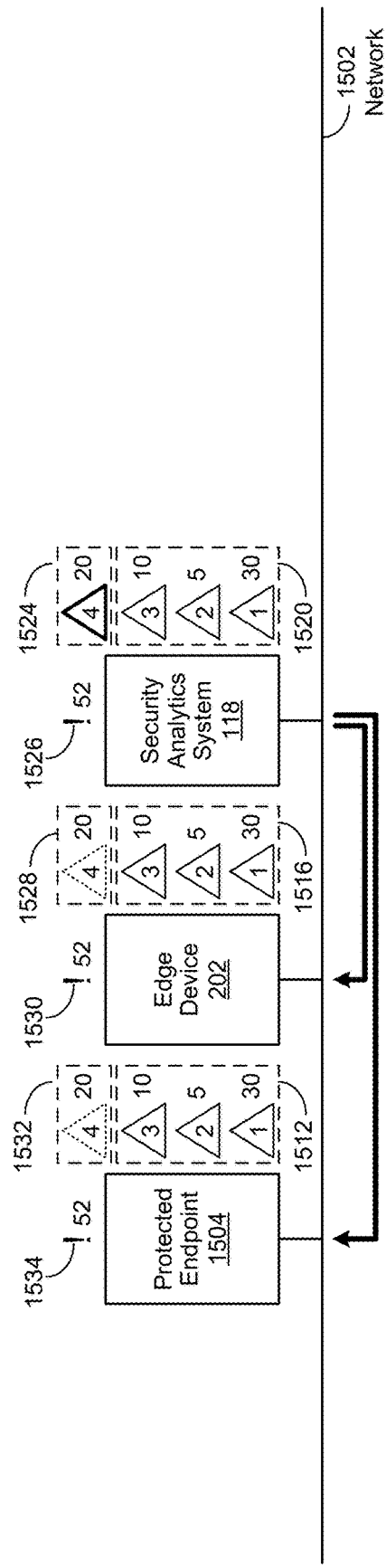

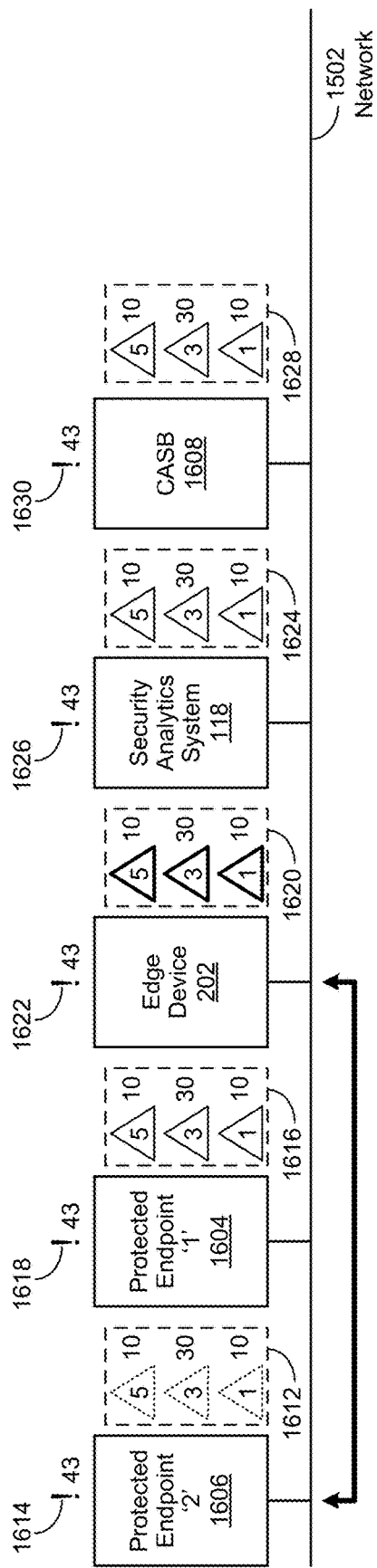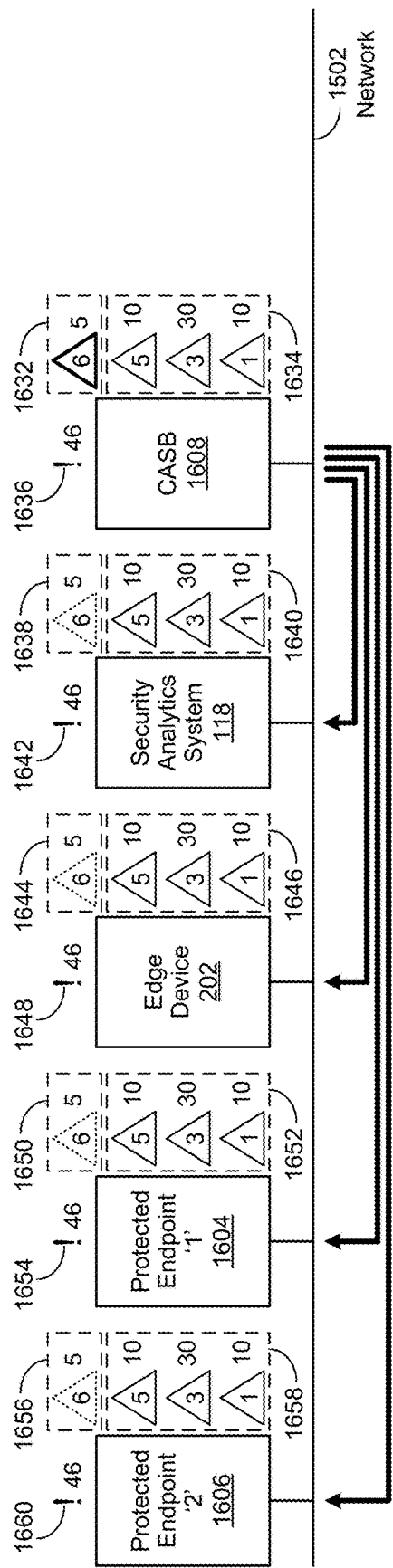

USING AN ENTITY REPUTATION WHEN CALCULATING AN ENTITY RISK SCORE

BACKGROUND OF THE INVENTION

Field of the Invention

The present invention relates in general to the field of computers and similar technologies, and in particular to software utilized in this field. Still more particularly, it relates to a method, system and computer-usable medium for generating a security risk severity score.

Description of the Related Art

Users interact with physical, system, data, and services resources of all kinds, as well as each other, on a daily basis. Each of these interactions, whether accidental or intended, poses some degree of security risk. However, not all behavior poses the same risk. Furthermore, determining the extent of risk corresponding to individual events can be difficult. In particular, ensuring that an entity is who they claim to be can be challenging.

As an example, a first user may attempt to pose as a second user to gain access to certain confidential information. In this example, the first user may be prevented from accessing the confidential information if it can be determined that they are illegitimately posing as the second user. More particularly, access to the confidential information may be prevented if the identity of the first user is resolved prior to the confidential information actually being accessed. Likewise, the first user's access to the confidential information may be prevented if their identity cannot be resolved to the identity of the second user.

SUMMARY OF THE INVENTION

In one embodiment the invention relates to a method for generating an anomalous event risk score, comprising: monitoring a plurality of electronically-observable actions of an entity, the plurality of electronically-observable actions of the entity corresponding to a respective plurality of events enacted by the entity; converting the plurality of electronically-observable actions of the entity to electronic information representing the plurality of actions of the entity; identifying an anomalous event from the plurality of events enacted by the entity; generating a first event risk severity score based upon the anomalous event; generating a second event risk severity score based upon a historical entity risk function, the historical entity risk function providing an indication of historical security risk of the entity; generating an entity risk severity score for the entity, the generating using the historical entity risk function and the event risk severity score; and, performing a risk-adaptive prevention operation, the risk-adaptive prevention operation using the entity risk severity score, the risk-adaptive prevention operation adaptively responding to mitigate risk associated with the anomalous event.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: monitoring a plurality of electronically-observable actions of an entity, the plurality of electronically-observable actions of the entity corresponding to a respective plurality of events enacted by the entity; converting the plurality of electronically-observable actions of the entity to electronic information representing the plurality of actions of the entity; identifying an anomalous event from the plurality of events enacted by the entity; generating a first event risk severity score based upon the anomalous event; generating a second event risk severity score based upon a historical entity risk function, the historical entity risk function providing an indication of historical security risk of the entity; generating an entity risk severity score for the entity, the generating using the historical entity risk function and the event risk severity score; and, performing a risk-adaptive prevention operation, the risk-adaptive prevention operation using the entity risk severity score, the risk-adaptive prevention operation adaptively responding to mitigate risk associated with the anomalous event.

In another embodiment the invention relates to a computer-readable storage medium embodying computer program code, the computer program code comprising computer executable instructions configured for: monitoring a plurality of electronically-observable actions of an entity, the plurality of electronically-observable actions of the entity corresponding to a respective plurality of events enacted by the entity; converting the plurality of electronically-observable actions of the entity to electronic information representing the plurality of actions of the entity; identifying an anomalous event from the plurality of events enacted by the entity; generating a first event risk severity score based upon the anomalous event; generating a second event risk severity score based upon a historical entity risk function, the historical entity risk function providing an indication of historical security risk of the entity; generating an entity risk severity score for the entity, the generating using the historical entity risk function and the event risk severity score; and, performing a risk-adaptive prevention operation, the risk-adaptive prevention operation using the entity risk severity score, the risk-adaptive prevention operation adaptively responding to mitigate risk associated with the anomalous event.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 13a through 13d show a graphical representation of a plurality of reduction functions used to decrease the value of an initial event risk severity score over an associated longevity time interval;

FIGS. 14a through 14c show the use of reduction functions to generate an entity risk severity score from associated event risk severity scores at a certain point in time;

FIGS. 15a through 15f show a simplified block diagram of distributed security risk scoring operations performed in a distributed security risk scoring environment;

FIGS. 16a and 16b show a simplified block diagram of distributed security risk scoring operations performed in a distributed security risk scoring environment to generate an entity risk severity score for a user entity;

DETAILED DESCRIPTION

Figure 1:
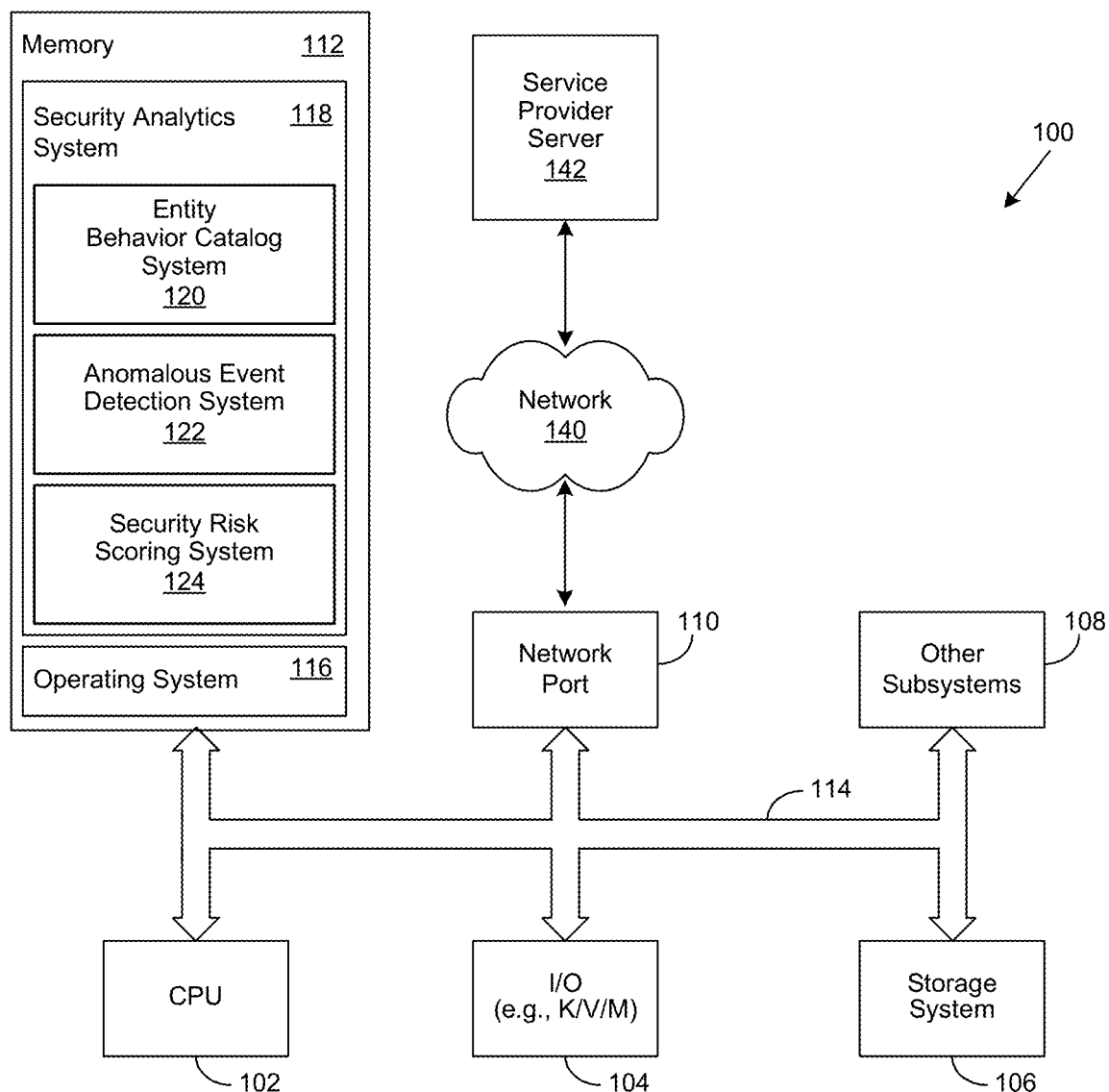
FIG. 1 depicts an exemplary client computer in which the present invention may be implemented.

A method, system and computer-usable medium are disclosed for generating a security risk severity score. Certain aspects of the invention reflect an appreciation that the existence of any entity, whether it is an individual user, a group of users, an organization, a device, a system, a network, an account, a domain, an operation, a process, a software application, or a service, represents some degree of security risk. Certain aspects of the invention likewise reflect an appreciation that observation and analysis of one or more events, described in greater detail herein, may provide an indication of possible anomalous, abnormal, unexpected, or malicious behavior, any or all of which may represent a security risk.

Certain aspects of the invention reflect an appreciation that known approaches to anomalous event detection include the use of rule sets that are not based upon statistics. Certain aspects of the invention likewise reflect an appreciation that typical general-purpose anomalous event detection generally requires a learning period (e.g., thirty days) to collect counters and build a statistical behavioral baseline. Likewise, certain aspects of the invention reflect an appreciation that a proven statistical behavior baseline implemented for one event, or class of events, may be used as an initial statistical behavior baseline for similar events. Accordingly, the initial detection of an anomalous events associated with a particular entity may be facilitated prior to the collection of event data directly associated with the entity itself. In particular, certain aspects of the invention reflect an appreciation that such an initial detection may be particularly advantageous when an endpoint device is first implemented, such as its initial use by a new member of an organization.

Certain aspects of the invention likewise reflect an appreciation that malicious behavior by an entity, such as a user, may be difficult to detect when anomalous events associated with the entity take place over an extended period of time. For an example, an employee may believe they become a potential security risk only after they give their notice, and only thereafter will their activities will be tracked. As a result, the employee may begin stockpiling and exfiltrating data long before an actual resignation occurs (e.g., 60 days) in an attempt to reduce suspicion. Furthermore, such activities may be performed intermittently in an attempt to further reduce suspicion.

Certain aspects of the invention reflect an appreciation that a user may use two or more endpoint devices, either directly or indirectly, concurrently or at different times, as described in greater detail herein, to further mask malicious behavior. Certain aspects of the invention likewise reflect an appreciation that it is generally difficult to assess the security risk of such distributed entity activities, whether such behavior occurs concurrently or over time. Likewise, certain aspects of the invention reflect an appreciation that it can also be difficult to maintain a historical indicator of risk corresponding to past anomalous events associated with a particular entity.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a security analytics system 118. In one embodiment, the information handling system 100 is able to download the security analytics system 118 from the service provider server 142. In another embodiment, the security analytics system 118 is provided as a service from the service provider server 142.

In various embodiments, the security analytics system 118 performs a security analytics operation. In certain embodiments, the security analytics operation improves processor efficiency, and thus the efficiency of the information handling system 100, by facilitating security analytics functions.

As will be appreciated, once the information handling system 100 is configured to perform the security analytics operation, the information handling system 100 becomes a specialized computing device specifically configured to perform the security analytics operation and is not a general purpose computing device. Moreover, the implementation of the security analytics system 118 on the information handling system 100 improves the functionality of the information handling system 100 and provides a useful and concrete result of performing security analytics functions to mitigate security risk.

In certain embodiments, the security analytics system 118 may be implemented to include an entity behavior catalog (EBC) system 120, an anomalous event detection system 122, a security risk scoring system 124, or a combination thereof. In various embodiments, the EBC system 120 may be implemented to perform certain entity behavior catalog operations, as described in greater detail herein. In various embodiments, the anomalous event detection system 122 may be implemented to perform certain anomalous event detection operations, as likewise described in greater detail herein. As likewise described in greater detail herein, the security risk scoring system 124 may be implemented in various embodiments to perform certain security risk scoring operations.

Figure 2:
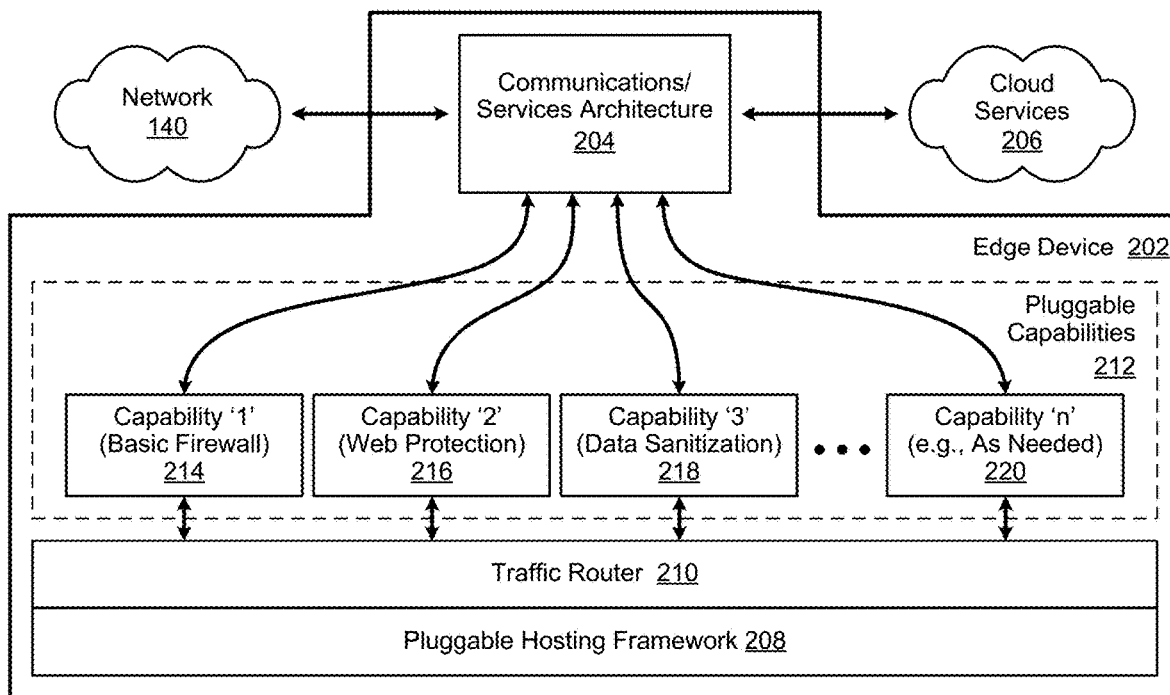
FIG. 2 is a simplified block diagram of an edge device.

FIG. 2 is a simplified block diagram of an edge device implemented in accordance with an embodiment of the invention. As used herein, an edge device, such as the edge device 202 shown in FIG. 2, broadly refers to a device providing an entry point into a network 140. Examples of such edge devices 202 may include routers, routing switches, integrated access devices (IADs), multiplexers, wide-area network (WAN) access devices, and network security appliances. In certain embodiments, the network 140 may be a private network (e.g., an enterprise network), a semi-public network (e.g., a service provider core network), or a public network (e.g., the Internet).

Skilled practitioners of the art will be aware that edge devices 202 are often implemented as routers that provide authenticated access to faster, more efficient backbone and core networks. Furthermore, current industry trends include making edge devices 202 more intelligent, which allows core devices to operate at higher speed as they are not burdened with additional administrative overhead. Accordingly, such edge devices 202 often include Quality of Service (QoS) and multi-service functions to manage different types of traffic. Consequently, it is common to design core networks with switches that use routing protocols such as Open Shortest Path First (OSPF) or Multiprotocol Label Switching (MPLS) for reliability and scalability. Such approaches allow edge devices 202 to have redundant links to the core network, which not only provides improved reliability, but enables enhanced, flexible, and scalable security capabilities as well.

In certain embodiments, the edge device 202 may be implemented to include a communications/services architecture 204, various pluggable capabilities 212, a traffic router 210, and a pluggable hosting framework 208. In certain embodiments, the communications/services architecture 202 may be implemented to provide access to and from various networks 140, cloud services 206, or a combination thereof. In certain embodiments, the cloud services 206 may be provided by a cloud infrastructure familiar to those of skill in the art. In certain embodiments, the edge device 202 may be implemented to provide support for a variety of generic services, such as directory integration, logging interfaces, update services, and bidirectional risk/context flows associated with various analytics. In certain embodiments, the edge device 202 may be implemented to provide temporal information, described in greater detail herein, associated with the provision of such services.

In certain embodiments, the edge device 202 may be implemented as a generic device configured to host various network communications, data processing, and security management capabilities. In certain embodiments, the pluggable hosting framework 208 may be implemented to host such capabilities in the form of pluggable capabilities 212. In certain embodiments, the pluggable capabilities 212 may include capability '1' 214 (e.g., basic firewall), capability '2' 216 (e.g., general web protection), capability '3' 218 (e.g., data sanitization), and so forth through capability 'n' 220, which may include capabilities needed for a particular operation, process, or requirement on an as-needed basis. In certain embodiments, such capabilities may include the performance of operations associated with providing real-time resolution of the identity of an entity at a particular point in time. In certain embodiments, such operations may include the provision of associated temporal information (e.g., time stamps).

In certain embodiments, the pluggable capabilities 212 may be sourced from various cloud services 206. In certain embodiments, the pluggable hosting framework 208 may be implemented to provide certain computing and communication infrastructure components, and foundation capabilities, required by one or more of the pluggable capabilities 212. In certain embodiments, the pluggable hosting framework 208 may be implemented to allow the pluggable capabilities 212 to be dynamically invoked. Skilled practitioners of the art will recognize that many such embodiments are possible. Accordingly, the foregoing is not intended to limit the spirit, scope or intent of the invention.

Figure 3:
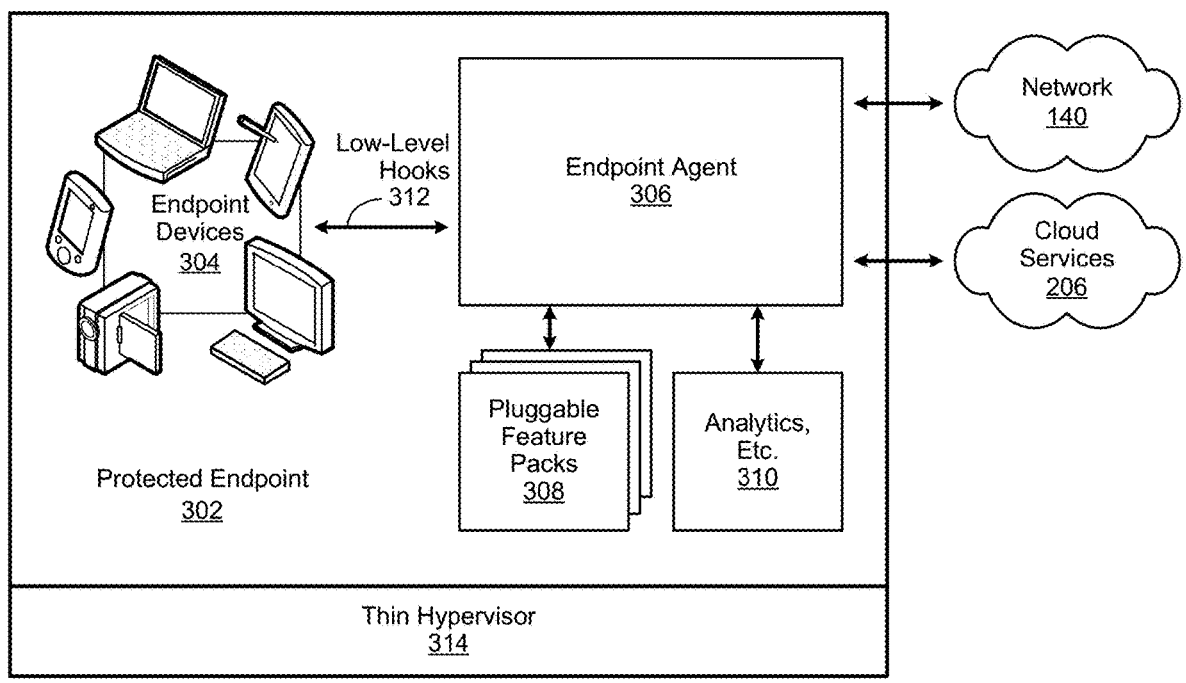
FIG. 3 is a simplified block diagram of an endpoint agent.

FIG. 3 is a simplified block diagram of an endpoint agent implemented in accordance with an embodiment of the invention. As used herein, an endpoint agent 306 broadly refers to a software agent used in combination with an endpoint device 304 to establish a protected endpoint 302. Skilled practitioners of the art will be familiar with software agents, which are computer programs that perform actions on behalf of a user or another program. In various approaches, a software agent may be autonomous or work together with another agent or a user. In certain of these approaches the software agent is implemented to autonomously decide if a particular action is appropriate for a given event, such as an observed entity behavior, described in greater detail herein.

An endpoint device 304, as likewise used herein, refers to an information processing system such as a personal computer, a laptop computer, a tablet computer, a personal digital assistant (PDA), a smart phone, a mobile telephone, a digital camera, a video camera, or other device that is capable of storing, processing and communicating data. In certain embodiments, the communication of the data may take place in real-time or near-real-time. As used herein, real-time broadly refers to processing and providing information within a time interval brief enough to not be discernable by a user. As an example, a cellular phone conversation may be used to communicate information in real-time, while an instant message (IM) exchange may be used to communicate information in near real-time. In certain embodiments, the communication of the information may take place asynchronously. For example, an email message may be stored on an endpoint device 304 when it is offline.

In this example, the information may be communicated to its intended recipient once the endpoint device 304 gains access to a network 140.

A protected endpoint 302, as likewise used herein, broadly refers to a policy-based approach to network security that typically requires endpoint devices 304 to comply with particular criteria before they are granted access to network resources. As an example, a given endpoint device 304 may be required to have a particular operating system (OS), or version thereof, a Virtual Private Network (VPN) client, anti-virus software with current updates, and so forth. In certain embodiments, the protected endpoint 302 may be implemented to perform operations associated with providing real-time resolution of the identity of an entity at a particular point in time, as described in greater detail herein. In certain embodiments, the protected endpoint 302 may be implemented to provide temporal information, such as timestamp information, associated with such operations.

In certain embodiments, the real-time resolution of the identity of an entity at a particular point in time may be based upon contextual information associated with a given entity behavior. As used herein, contextual information broadly refers to any information, directly or indirectly, individually or in combination, related to a particular entity behavior. In certain embodiments, entity behavior may include an entity's physical behavior, cyber behavior, or a combination thereof. As likewise used herein, physical behavior broadly refers to any entity behavior occurring within a physical realm. More particularly, physical behavior may include any action enacted by an entity that can be objectively observed, or indirectly inferred, within a physical realm.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user that can be electronically observed.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, makes them electronically-observable.

As likewise used herein, cyberspace broadly refers to a network 140 environment capable of supporting communication between two or more entities. In certain embodiments, the entity may be a user, an endpoint device 304, or various resources, described in greater detail herein. In certain embodiments, the entities may include various endpoint devices 304 or resources operating at the behest of an entity, such as a user. In certain embodiments, the communication between the entities may include audio, image, video, text, or binary data.

As described in greater detail herein, the contextual information may include an entity's authentication factors. Contextual information may likewise include various temporal identity resolution factors, such as identification factors associated with the entity, the date/time/frequency of various entity behaviors, the entity's location, the entity's role or position in an organization, their associated access rights, and certain user gestures employed by the user in the enactment of a user behavior. Other contextual information may likewise include various user interactions, whether the interactions are with an endpoint device 304, a network 140, a resource, or another user. In certain embodiments, user behaviors, and their related contextual information, may be collected at particular points of observation, and at particular points in time, described in greater detail herein. In certain embodiments, a protected endpoint 302 may be implemented as a point of observation for the collection of entity behavior and contextual information.

In certain embodiments, the endpoint agent 306 may be implemented to universally support a variety of operating systems, such as Apple Macintosh®, Microsoft Windows®, Linux®, Android® and so forth. In certain embodiments, the endpoint agent 306 may be implemented to interact with the endpoint device 304 through the use of low-level hooks 312 at the operating system level. It will be appreciated that the use of low-level hooks 312 allows the endpoint agent 306 to subscribe to multiple events through a single hook. Consequently, multiple functionalities provided by the endpoint agent 306 can share a single data stream, using only those portions of the data stream they may individually need. Accordingly, system efficiency can be improved and operational overhead reduced.

In certain embodiments, the endpoint agent 306 may be implemented to provide a common infrastructure for pluggable feature packs 308. In various embodiments, the pluggable feature packs 308 may provide certain security management functionalities. Examples of such functionalities may include various anti-virus and malware detection, data loss protection (DLP), insider threat detection, and so forth. In certain embodiments, the security management functionalities may include one or more functionalities associated with providing real-time resolution of the identity of an entity at a particular point in time, as described in greater detail herein.

In certain embodiments, a particular pluggable feature pack 308 may be invoked as needed by the endpoint agent 306 to provide a given functionality. In certain embodiments, individual features of a particular pluggable feature pack 308 are invoked as needed. It will be appreciated that the ability to invoke individual features of a pluggable feature pack 308, without necessarily invoking all such features, will likely improve the operational efficiency of the endpoint agent 306 while simultaneously reducing operational overhead. Accordingly, the endpoint agent 306 can self-optimize in certain embodiments by using the common infrastructure and invoking only those pluggable components that are applicable or needed for a given user behavior.

In certain embodiments, the individual features of a pluggable feature pack 308 are invoked by the endpoint agent 306 according to the occurrence of a particular user behavior. In certain embodiments, the individual features of a pluggable feature pack 308 are invoked by the endpoint agent 306 according to the occurrence of a particular temporal event, described in greater detail herein. In certain embodiments, the individual features of a pluggable feature pack 308 are invoked by the endpoint agent 306 at a particular point in time. In these embodiments, the method by which a given user behavior, temporal event, or point in time is selected is a matter of design choice.

In certain embodiments, the individual features of a pluggable feature pack 308 may be invoked by the endpoint agent 306 according to the context of a particular user behavior. As an example, the context may be the user enacting the user behavior, their associated risk classification, which resource they may be requesting, the point in time the user behavior is enacted, and so forth. In certain embodiments, the pluggable feature packs 308 may be sourced from various cloud services 206. In certain embodiments, the pluggable feature packs 308 may be dynamically sourced from various cloud services 206 by the endpoint agent 306 on an as-needed basis.

In certain embodiments, the endpoint agent 306 may be implemented with additional functionalities, such as event analytics 310. In certain embodiments, the event analytics 310 functionality may include analysis of various user behaviors, described in greater detail herein. In certain embodiments, the endpoint agent 306 may be implemented with a thin hypervisor 314, which can be run at Ring −1, thereby providing protection for the endpoint agent 306 in the event of a breach. As used herein, a thin hypervisor broadly refers to a simplified, OS-dependent hypervisor implemented to increase security. As likewise used herein, Ring −1 broadly refers to approaches allowing guest operating systems to run Ring 0 (i.e., kernel) operations without affecting other guests or the host OS. Those of skill in the art will recognize that many such embodiments and examples are possible. Accordingly, the foregoing is not intended to limit the spirit, scope or intent of the invention.

Figure 4:
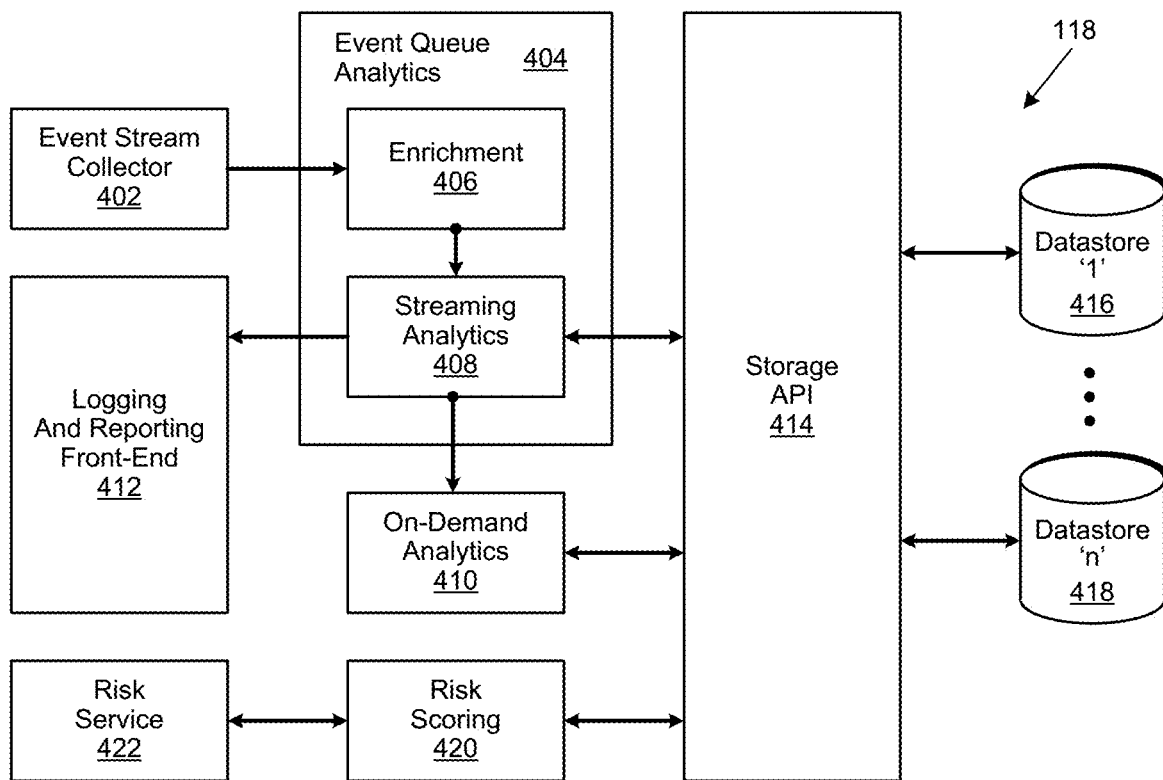
FIG. 4 is a simplified block diagram of a security analytics system.

FIG. 4 is a simplified block diagram of a security analytics system implemented in accordance with an embodiment of the invention. In certain embodiments, the security analytics system 118 shown in FIG. 4 may include an event queue analytics 404 module, described in greater detail herein. In certain embodiments, the event queue analytics 404 subsystem may be implemented to include an enrichment 406 module and a streaming analytics 408 module. In certain embodiments, the security analytics system 118 may be implemented to provide log storage, reporting, and analytics capable of performing streaming 408 and on-demand 410 analytics operations. In certain embodiments, such operations may be associated with defining and managing an entity behavior profile (EBP), described in greater detail herein. In certain embodiments, an EBP may be implemented as an adaptive trust profile (ATP). In certain embodiments, an EBP may be implemented to detect entity behavior that may be of analytic utility, adaptively responding to mitigate risk, or a combination thereof, as described in greater detail herein. In certain embodiments, entity behavior of analytic utility may be determined to be anomalous, abnormal, unexpected, malicious, or some combination thereof, as likewise described in greater detail herein.

In certain embodiments, the security analytics system 118 may be implemented to provide a uniform platform for storing events and contextual information associated with various entity behaviors and performing longitudinal analytics. As used herein, longitudinal analytics broadly refers to performing analytics of entity behaviors occurring over a particular period of time. As an example, an entity may iteratively attempt to access certain proprietary information stored in various locations. In addition, the attempts may occur over a brief period of time. To continue the example, the fact that the information the user is attempting to access is proprietary, that it is stored in various locations, and the attempts are occurring in a brief period of time, in combination, may indicate the entity behavior enacted by the entity is suspicious. As another example, certain entity identifier information (e.g., a user name) associated with an entity may change over time. In this example, a change in the entity's user name, during a particular time period or at a particular point in time, may represent suspicious entity behavior.

In certain embodiments, the security analytics system 118 may be implemented to be scalable. In certain embodiments, the security analytics system 118 may be implemented in a centralized location, such as a corporate data center. In these embodiments, additional resources may be added to the security analytics system 118 as needs grow. In certain embodiments, the security analytics system 118 may be implemented as a distributed system. In these embodiments, the security analytics system 118 may span multiple information handling systems. In certain embodiments, the security analytics system 118 may be implemented in a cloud environment. In certain embodiments, the security analytics system 118 may be implemented in a virtual machine (VM) environment. In such embodiments, the VM environment may be configured to dynamically and seamlessly scale the security analytics system 118 as needed. Skilled practitioners of the art will recognize that many such embodiments are possible. Accordingly, the foregoing is not intended to limit the spirit, scope or intent of the invention.

In certain embodiments, an event stream collector 402 may be implemented to collect event and related contextual information, described in greater detail herein, associated with various entity behaviors. In these embodiments, the method by which the event and contextual information is selected to be collected by the event stream collector 402 is a matter of design choice. In certain embodiments, the event and contextual information collected by the event stream collector 402 may be processed by an enrichment module 406 to generate enriched entity behavior information. In certain embodiments, the enrichment may include certain contextual information related to a particular entity behavior or event. In certain embodiments, the enrichment may include certain temporal information, such as timestamp information, related to a particular entity behavior or event.

In certain embodiments, enriched entity behavior information may be provided by the enrichment module 406 to a streaming 408 analytics module. In turn, the streaming 408 analytics module may provide some or all of the enriched entity behavior information to an on-demand 410 analytics module. As used herein, streaming 408 analytics broadly refers to analytics performed in near real-time on enriched entity behavior information as it is received. Likewise, on-demand 410 analytics broadly refers herein to analytics performed, as they are requested, on enriched entity behavior information after it has been received. In certain embodiments, the enriched entity behavior information may be associated with a particular event. In certain embodiments, the enrichment 406 and streaming analytics 408 modules may be implemented to perform event queue analytics 404 operations, as described in greater detail herein.

In certain embodiments, the on-demand 410 analytics may be performed on enriched entity behavior associated with a particular interval of, or point in, time. In certain embodiments, the streaming 408 or on-demand 410 analytics may be performed on enriched entity behavior associated with a particular user, group of users, one or more non-user entities, or a combination thereof. In certain embodiments, the streaming 408 or on-demand 410 analytics may be performed on enriched entity behavior associated with a particular resource, such as a facility, system, datastore, or service. Those of skill in the art will recognize that many such embodiments are possible. Accordingly, the foregoing is not intended to limit the spirit, scope or intent of the invention.

In certain embodiments, the results of various analytics operations performed by the streaming 408 or on-demand 410 analytics modules may be provided to a storage Application Program Interface (API) 414. In turn, the storage API 412 may be implemented to provide access to various datastores '1' 416 through 'n' 418, which in turn are used to store the results of the analytics operations. In certain embodiments, the security analytics system 118 may be implemented with a logging and reporting front-end 412, which is used to receive the results of analytics operations performed by the streaming 408 analytics module. In certain embodiments, the datastores '1' 416 through 'n' 418 may variously include a datastore of entity identifiers, temporal events, or a combination thereof.

In certain embodiments, the security analytics system 118 may include a risk scoring 420 module implemented to perform risk scoring operations, described in greater detail herein. In certain embodiments, functionalities of the risk scoring 420 module may be provided in the form of a risk management service 422. In certain embodiments, the risk management service 422 may be implemented to perform operations associated with defining and managing an entity behavior profile (EBP), as described in greater detail herein. In certain embodiments, the risk management service 422 may be implemented to perform operations associated with detecting entity behavior that may be of analytic utility and adaptively responding to mitigate risk, as described in greater detail herein. In certain embodiments, the risk management service 422 may be implemented to provide the results of various analytics operations performed by the streaming 406 or on-demand 408 analytics modules. In certain embodiments, the risk management service 422 may be implemented to use the storage API 412 to access various enhanced cyber behavior and analytics information stored on the datastores '1' 414 through 'n' 416. Skilled practitioners of the art will recognize that many such embodiments are possible. Accordingly, the foregoing is not intended to limit the spirit, scope or intent of the invention.

Figure 5:
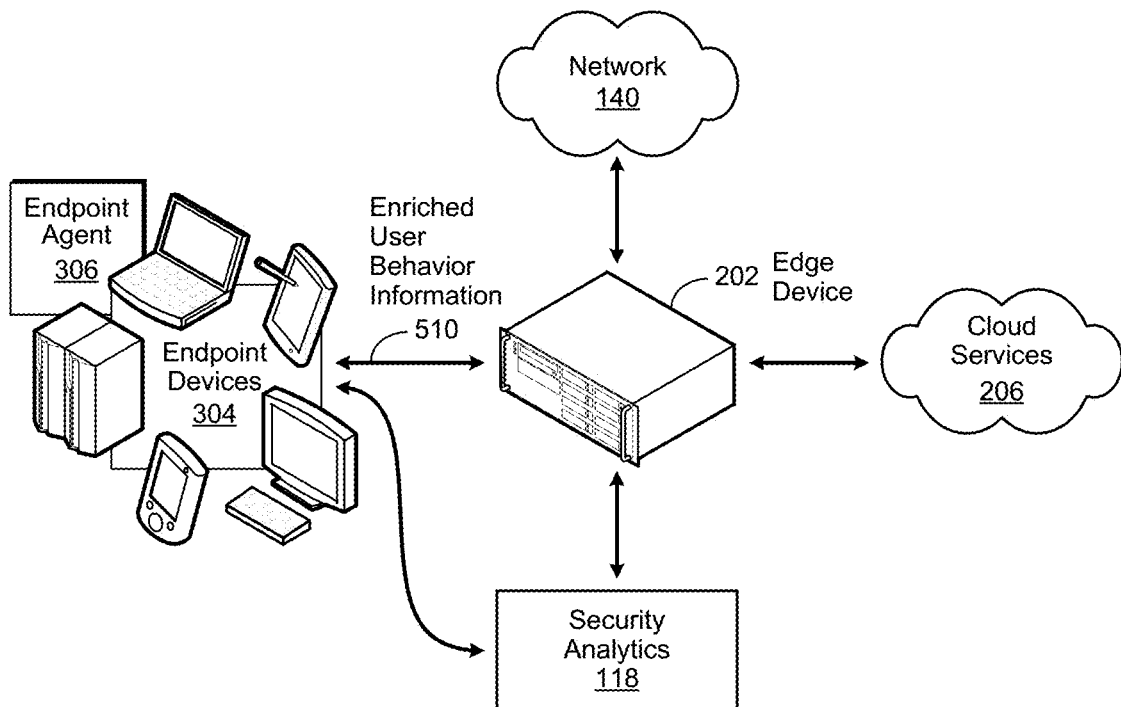
FIG. 5 is a simplified block diagram of the operation of a security analytics system.

FIG. 5 is a simplified block diagram of the operation of a security analytics system implemented in accordance with an embodiment of the invention. In certain embodiments, the security analytics system 118 may be implemented to perform operations associated with providing real-time resolution of the identity of an entity at a particular point in time. In certain embodiments, the security analytics system 118 may be implemented in combination with one or more endpoint agents 306, one or more edge devices 202, cloud services 206, and a security analytics system 118, and a network 140 to perform such operations.

In certain embodiments, the network edge device 202 may be implemented in a bridge, a firewall, or a passive monitoring configuration. In certain embodiments, the edge device 202 may be implemented as software running on an information processing system. In certain embodiments, the network edge device 202 may be implemented to provide integrated logging, updating and control. In certain embodiments, the edge device 202 may be implemented to receive network requests and context-sensitive cyber behavior information in the form of enriched cyber behavior information 510, described in greater detail herein, from an endpoint agent 306, likewise described in greater detail herein.

In certain embodiments, the security analytics system 118 may be implemented as both a source and a sink of entity behavior information. In certain embodiments, the security analytics system 118 may be implemented to serve requests for user/resource risk data. In certain embodiments, the edge device 202 and the endpoint agent 306, individually or in combination, may provide certain entity behavior information to the security analytics system 118 using either push or pull approaches familiar to skilled practitioners of the art.

As described in greater detail herein, the edge device 202 may be implemented in certain embodiments to receive enriched user behavior information 510 from the endpoint agent 306. It will be appreciated that such enriched user behavior information 510 will likely not be available for provision to the edge device 202 when an endpoint agent 306 is not implemented for a corresponding endpoint device 304. However, the lack of such enriched user behavior information 510 may be accommodated in various embodiments, albeit with reduced functionality associated with operations associated with providing real-time resolution of the identity of an entity at a particular point in time.

In certain embodiments, a given user behavior may be enriched by an associated endpoint agent 306 attaching contextual information to a request. In one embodiment, the context is embedded within a network request, which is then provided as enriched user behavior information 510. In another embodiment, the contextual information is concatenated, or appended, to a request, which in turn is provided as enriched user behavior information 510. In these embodiments, the enriched user behavior information 510 is unpacked upon receipt and parsed to separate the request and its associated contextual information. Those of skill in the art will recognize that one possible disadvantage of such an approach is that it may perturb certain Intrusion Detection System and/or Intrusion Detection Prevention (IDS/IDP) systems implemented on a network 140.

In certain embodiments, new flow requests are accompanied by a contextual information packet sent to the edge device 202. In these embodiments, the new flow requests may be provided as enriched user behavior information 510. In certain embodiments, the endpoint agent 306 may also send updated contextual information to the edge device 202 once it becomes available. As an example, an endpoint agent 306 may share a list of files that have been read by a current process at any point in time once the information has been collected. To continue the example, such a list of files may be used to determine which data the endpoint agent 306 may be attempting to exfiltrate.

In certain embodiments, point analytics processes executing on the edge device 202 may request a particular service. As an example, risk scores on a per-user basis may be requested. In certain embodiments, the service may be requested from the security analytics system 118. In certain embodiments, the service may be requested from various cloud services 206.

In certain embodiments, contextual information associated with a user behavior may be attached to various network service requests. In certain embodiments, the request may be wrapped and then handled by proxy. In certain embodiments, a small packet of contextual information associated with a user behavior may be sent with a service request. In certain embodiments, service requests may be related to Domain Name Service (DNS), web, email, and so forth, all of which are essentially requests for service by an endpoint device 304. In certain embodiments, such service requests may be associated with temporal event information, described in greater detail herein. Consequently, such requests can be enriched by the addition of user behavior contextual information (e.g., UserAccount, interactive/automated, data-touched, temporal event information, etc.). Accordingly, the edge device 202 can then use this information to manage the appropriate response to submitted requests. In certain embodiments, such requests may be associated with providing real-time resolution of the identity of an entity at a particular point in time.

In certain embodiments, the security analytics system 118 may be implemented in different operational configurations. In one embodiment, the security analytics system 118 may be implemented by using the endpoint agent 306. In another embodiment, the security analytics system 118 may be implemented by using endpoint agent 306 in combination with the edge device 202. In certain embodiments, the cloud services 206 may likewise be implemented for use by the endpoint agent 306, the edge device 202, and the security analytics system 118, individually or in combination. In these embodiments, the security analytics system 118 may be primarily oriented to performing risk assessment operations related to user actions, program actions, data accesses, or a combination thereof. In certain embodiments, program actions may be treated as a proxy for the user.

In certain embodiments, the endpoint agent 306 may be implemented to update the security analytics system 118 with user behavior and associated contextual information, thereby allowing an offload of certain analytics processing overhead. In one embodiment, this approach allows for longitudinal risk scoring, which assesses risk associated with certain user behavior during a particular interval of time. In another embodiment, the security analytics system 118 may be implemented to perform risk-adaptive operations to access risk scores associated with the same user account, but accrued on different endpoint devices 304. It will be appreciated that such an approach may prove advantageous when an adversary is "moving sideways" through a network environment, using different endpoint devices 304 to collect information.

In certain embodiments, the security analytics system 118 may be primarily oriented to applying risk mitigations in a way that maximizes security effort return-on-investment (ROI). In certain embodiments, the approach may be accomplished by providing additional contextual and user behavior information associated with user requests. As an example, a web gateway may not concern itself with why a particular file is being requested by a certain entity at a particular point in time. Accordingly, if the file cannot be identified as malicious or harmless, there is no context available to determine how, or if, to proceed.

To extend the example, the edge device 202 and security analytics system 118 may be coupled such that requests can be contextualized and fitted into a framework that evaluates their associated risk. It will be appreciated that such an embodiment works well with web-based data loss protection (DLP) approaches, as each transfer is no longer examined in isolation, but in the broader context of an identified user's actions, at a particular time, on the network 140.

As another example, the security analytics system 118 may be implemented to perform risk scoring processes to decide whether to block or allow unusual flows. It will be appreciated that such an approach is highly applicable to defending against point-of-sale (POS) malware, a breach technique that has become increasingly more common in recent years. It will likewise be appreciated that while various edge device 202 implementations may not stop all such exfiltrations, they may be able to complicate the task for the attacker.

In certain embodiments, the security analytics system 118 may be primarily oriented to maximally leverage contextual information associated with various user behaviors within the system. In certain embodiments, data flow tracking is performed by one or more endpoint agents 306, which allows the quantity and type of information associated with particular hosts to be measured. In turn, this information may be used to determine how the edge device 202 handles requests. By contextualizing such user behavior on the network 140, the security analytics system 118 can provide intelligent protection, making decisions that make sense in the broader context of an organization's activities. It will be appreciated that one advantage to such an approach is that information flowing through an organization, and the networks they employ, should be trackable, and substantial data breaches preventable. Skilled practitioners of the art will recognize that many such embodiments and examples are possible. Accordingly, the foregoing is not intended to limit the spirit, scope or intent of the invention.

Figure 6:
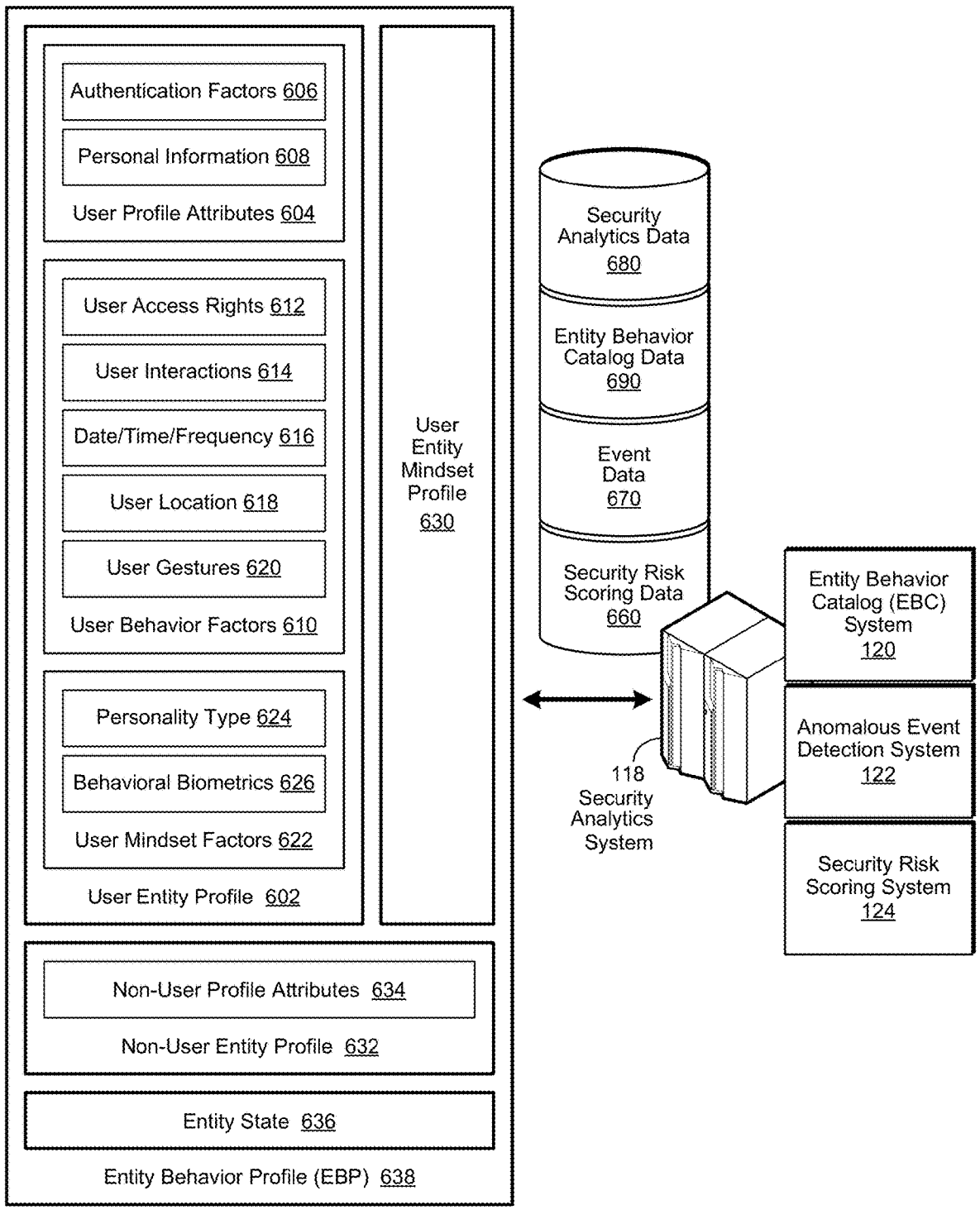
FIG. 6 shows a simplified block diagram of an entity behavior profile (EBP)

FIG. 6 shows a simplified block diagram of an entity behavior profile (EBP) implemented in accordance with an embodiment of the invention. As used herein, an entity behavior profile 638 broadly refers to a collection of information that uniquely describes a particular entity's identity and their associated behavior, whether the behavior occurs within a physical realm or cyberspace. In certain embodiments, an EBP 638 may be used to adaptively draw inferences regarding the trustworthiness of a particular entity. In certain embodiments, as described in greater detail herein, the drawing of the inferences may involve comparing a new entity behavior to known past behaviors enacted by the entity. In certain embodiments, new entity behavior of analytic utility may represent entity behavior that represents a security risk. As likewise used herein, an entity broadly refers to something that exists as itself, whether physically or abstractly. In certain embodiments, an entity may be a user entity, a non-user entity, or a combination thereof. In certain embodiments, the identity of an entity may be known or unknown.

As used herein, a user entity broadly refers to an entity capable of enacting a user entity behavior, as described in greater detail herein. Examples of a user entity include an individual person, a group of people, an organization, or a government. As likewise used herein, a non-user entity broadly refers to an entity whose identity can be described and may exhibit certain behavior, but is incapable of enacting a user entity behavior. Examples of a non-user entity include an item, a device, such as endpoint and edge devices, a network, an account, a domain, an operation, a process, and an event. Other examples of a non-user entity include a resource, such as a geographical location or formation, a physical facility, a venue, a system, a software application, a data store, and a service, such as a service operating in a cloud environment.

Certain embodiments of the invention reflect an appreciation that being able to uniquely identity a device may assist in establishing whether or not a particular login is legitimate. As an example, user impersonations may not occur at the user's endpoint, but instead, from another device or system. Certain embodiments of the invention likewise reflect an appreciation that profiling the entity behavior of a particular device or system may assist in determining whether or not it is acting suspiciously.

In certain embodiments, an account may be local account, which runs on a single machine. In certain embodiments, an account may be a global account, providing access to multiple resources. In certain embodiments, a process may be implemented to run in an unattended mode, such as when backing up files or checking for software updates. Certain embodiments of the invention reflect an appreciation that it is often advantageous to track events at the process level as a method of determining which events are associated with background processes and which are initiated by a user entity.

In certain embodiments, an EBP 638 may be implemented to include a user entity profile 602, an associated user entity mindset profile 630, a non-user entity profile 632, and an entity state 636. As used herein, a user entity profile 602 broadly refers to a collection of information that uniquely describes a user entity's identity and their associated behavior, whether the behavior occurs within a physical realm or cyberspace. In certain embodiments, as described in greater detail herein, the user entity profile 602 may include user profile attributes 604, user behavior factors 610, user mindset factors 622, or a combination thereof. In certain embodiments, the user profile attributes 604 may include certain user authentication factors 606, described in greater detail herein, and personal information 608.

As used herein, a user profile attribute 604 broadly refers to data or metadata that can be used, individually or in combination with other user profile attributes 604, user behavior factors 610, or user mindset factors 622, to ascertain the identity of a user entity. In various embodiments, certain user profile attributes 604 may be uniquely associated with a particular user entity. In certain embodiments, the personal information 608 may include non-sensitive personal information associated with a user entity, such as their name, title, position, role, and responsibilities. In certain embodiments, the personal information 608 may likewise include technical skill level information, peer information, expense account information, paid time off (PTO) information, data analysis information, insider information, misconfiguration information, third party information, or a combination thereof. In certain embodiments, the personal information 608 may contain sensitive personal information associated with a user entity. As used herein, sensitive personal information (SPI), also commonly referred to as personally identifiable information (PII), broadly refers to any information usable to ascertain the identity of a user entity, either by itself, or in combination with other information, such as contextual information described in greater detail herein.

Examples of SPI may include the full or legal name of a user entity, initials or nicknames, place and date of birth, home and business addresses, personal and business telephone numbers, their gender, and other genetic information. Additional examples of SPI may include government-issued identifiers, such as a Social Security Number (SSN) or a passport number, vehicle registration plate and serial numbers, and driver's license numbers. Other examples of SPI may include certain email addresses and social media identifiers, credit and debit card numbers, and other digital identity information. Yet other examples of SPI may include employer-issued identifiers, financial transaction information, credit scores, electronic medical records (EMRs), insurance claim information, personal correspondence, and so forth. Further examples of SPI may include user authentication factors 606, such as biometrics, user identifiers and passwords, and personal identification numbers (PINs).

In certain embodiments, the SPI may include information considered by an individual user, a group of users, or an organization (e.g., a company, a government or non-government organization, etc.), to be confidential or proprietary. One example of such confidential information is protected health information (PHI). As used herein, PHI broadly refers to any information associated with the health status, provision of health care, or payment for health care that is created or collected by a "covered entity," or an associate thereof, that can be linked to a particular individual. As used herein, a "covered entity" broadly refers to health plans, healthcare clearinghouses, healthcare providers, and others, who may electronically communicate any health-related information associated with a particular individual. Examples of such PHI may include any part of a patient's medical record, healthcare record, or payment history for medical or healthcare services.

As used herein, a user behavior factor 610 broadly refers to information associated with a user entity's behavior, whether the behavior occurs within a physical realm or cyberspace. In certain embodiments, user behavior factors 610 may include the user entity's access rights 612, the user entity's interactions 614, and the date/time/frequency 616 of when the interactions 614 are enacted. In certain embodiments, the user behavior factors 610 may likewise include the user entity's location 618, and the gestures 620 used by the user entity to enact the interactions 614.

In certain embodiments, the user entity gestures 620 may include key strokes on a keypad, a cursor movement, a mouse movement or click, a finger swipe, tap, or other hand gesture, an eye movement, or some combination thereof. In certain embodiments, the user entity gestures 620 may likewise include the cadence of the user's keystrokes, the motion, force and duration of a hand or finger gesture, the rapidity and direction of various eye movements, or some combination thereof. In certain embodiments, the user entity gestures 620 may include various audio or verbal commands performed by the user.

As used herein, user mindset factors 622 broadly refer to information used to make inferences regarding the mental state of a user entity at a particular point in time, during the occurrence of an event or an enactment of a user behavior, or a combination thereof. As likewise used herein, mental state broadly refers to a hypothetical state corresponding to the way a user entity may be thinking or feeling. Likewise, as used herein, an event broadly refers to the occurrence of an action performed by an entity. In certain embodiments, the user entity mindset factors 622 may include a personality type 624. Examples of known approaches for determining a personality type 624 include Jungian types, Myers-Briggs type indicators, Keirsey Temperament Sorter, Socionics, Enneagram of Personality, and Eyseneck's three-factor model.

In certain embodiments, the user mindset factors 622 may include various behavioral biometrics 626. As used herein, a behavioral biometric 628 broadly refers to a physiological indication of a user entity's mental state. Examples of behavioral biometrics 626 may include a user entity's blood pressure, heart rate, respiratory rate, eye movements and iris dilation, facial expressions, body language, tone and pitch of voice, speech patterns, and so forth.

Certain embodiments of the invention reflect an appreciation that certain user behavior factors 610, such as user entity gestures 620, may provide additional information related to inferring a user entity's mental state. As an example, a user entering text at a quick pace with a rhythmic cadence may indicate intense focus. Likewise, an individual user intermittently entering text with forceful keystrokes may indicate the user is in an agitated state. As another example, the user may intermittently enter text somewhat languorously, which may indicate being in a thoughtful or reflective state of mind. As yet another example, the user may enter text with a light touch with an uneven cadence, which may indicate the user is hesitant or unsure of what is being entered.

Certain embodiments of the invention likewise reflect an appreciation that while the user entity gestures 620 may provide certain indications of the mental state of a particular user entity, they may not provide the reason for the user entity to be in a particular mental state. Likewise, certain embodiments of the invention include an appreciation that certain user entity gestures 620 and behavioral biometrics 626 are reflective of an individual user's personality type 624. As an example, aggressive, forceful keystrokes combined with an increased heart rate may indicate normal behavior for a particular user when composing end-of-month performance reviews. In various embodiments, certain user entity behavior factors 610, such as user gestures 620, may be correlated with certain contextual information, as described in greater detail herein.

In certain embodiments, a security analytics system 118, described in greater detail herein, may be implemented to include an entity behavior catalog (EBC) system 120, an anomalous event detection system 122, and a security risk scoring system 124, or a combination thereof. In certain embodiments, the security analytics system 118 may be implemented to access a repository of event 670 data, a repository of security risk scoring data 660, a repository of EBC 690 data, and a repository of security analytics 680 data, or a combination thereof. In various embodiments, the security analytics system 118 may be implemented to use certain information stored in the repository of event 670 data, the repository of security risk scoring 660 data, the repository of EBC 690 data, and the repository of security analytics 680 data, or a combination thereof, to perform a security analytics operation, described in greater detail herein. In certain embodiments, the results of a particular security analytics operation may be stored in the repository of security analytics 680 data.

In certain embodiments, the EBC system 120 may be implemented to generate, manage, store, or some combination thereof, information related to the behavior of an associated entity. In certain embodiments, the information related to the behavior of a particular entity may be stored in the form of an EBP 638. In certain embodiments, the EBC system 120 may be implemented to store the information related to the behavior of a particular entity in the repository of EBC 690 data. In various embodiments, the EBC system 120 may be implemented to generate certain information related to the behavior of a particular entity from event information associated with the entity, as described in greater detail herein. In certain embodiments, event information associated with a particular entity may be stored in the repository of event 670 data.

In various embodiments, the EBC system 120 may be implemented as a cyber behavior catalog. In certain of these embodiments, the cyber behavior catalog may be implemented to generate, manage, store, or some combination thereof, information related to cyber behavior, described in greater detail herein, enacted by an associated entity. In various embodiments, as likewise described in greater detail herein, the information generated, managed, stored, or some combination thereof, by such a cyber behavior catalog, may be related to cyber behavior enacted by a user entity, a non-user entity, or a combination thereof.

In certain embodiments, the anomalous event detection system 122 may be implemented to perform an anomalous event detection operation, likewise described in greater detail herein. In various embodiments, as likewise described in greater detail herein, the anomalous event detection system 122 may be implemented to use certain event information stored in the repositories of security risk scoring 660, event 670, EBC 690, and security analytics 680 data, or a combination thereof, to perform the anomalous event detection operation. As used herein, an anomalous event detection operation broadly refers to any operation that may be performed to detect an anomalous event associated with a particular user or non-user entity. In certain embodiments, a particular anomalous event detection operation may be performed as a security operation, described in greater detail herein.

In certain embodiments, the EBC system 120 may be implemented to use a user entity profile 602 in combination with an entity state 636 to generate a user entity mindset profile 630. As used herein, entity state 636 broadly refers to the context of a particular event or entity behavior. In certain embodiments, the entity state 636 may be a long-term entity state or a short-term entity state. As used herein, a long-term entity state 636 broadly relates to an entity state 636 that persists for an extended interval of time, such as six months or a year. As likewise used herein, a short-term entity state 636 broadly relates to an entity state 636 that occurs for a brief interval of time, such as a few minutes or a day. In various embodiments, the method by which an entity state's 636 associated interval of time is considered to be long-term or short-term is a matter of design choice.

As an example, a particular user may have a primary work location, such as a branch office, and a secondary work location, such as their company's corporate office. In this example, the user's primary and secondary offices respectively correspond to the user's location 618, whereas the presence of the user at either office corresponds to an entity state 636. To continue the example, the user may consistently work at their primary office Monday through Thursday, but at their company's corporate office on Fridays. To further continue the example, the user's presence at their primary work location may be a long-term entity state 636, while their presence at their secondary work location may be a short-term entity state 636. Accordingly, a date/time/frequency 616 user entity behavior factor 610 can likewise be associated with user behavior respectively enacted on those days, regardless of their corresponding locations. Consequently, the long-term user entity state 636 on Monday through Thursday will typically be "working at the branch office" and the short-term entity state 636 on Friday will likely be "working at the corporate office."

As likewise used herein, a user entity mindset profile 630 broadly refers to a collection of information that reflects an inferred mental state of a user entity at a particular time during the occurrence of an event or an enactment of a user behavior. As an example, certain information may be known about a user entity, such as their name, their title and position, and so forth, all of which are user profile attributes 604. Likewise, it may be possible to observe a user entity's associated user behavior factors 610, such as their interactions with various systems, when they log-in and log-out, when they are active at the keyboard, the rhythm of their keystrokes, and which files they typically use.

Certain embodiments of the invention reflect an appreciation these behavior factors 610 can be considered to be a behavioral fingerprint. In certain embodiments, the user behavior factors 610 may change, a little or a lot, from day to day. These changes may be benign, such as when a user entity begins a new project and accesses new data, or they may indicate something more concerning, such as a user entity who is actively preparing to steal data from their employer. In certain embodiments, the user behavior factors 610 may be implemented to ascertain the identity of a user entity. In certain embodiments, the user behavior factors 610 may be uniquely associated with a particular entity.

In certain embodiments, observed user behaviors may be used to build a user entity profile 602 for a particular user or other entity. In addition to creating a model of a user's various attributes and observed behaviors, these observations can likewise be used to infer things that are not necessarily explicit. Accordingly, in certain embodiments, a behavioral fingerprint may be used in combination with an EBP 638 to generate an inference regarding an associated user entity. As an example, a particular user may be observed eating a meal, which may or may not indicate the user is hungry. However, if it is also known that the user worked at their desk throughout lunchtime and is now eating a snack during a mid-afternoon break, then it can be inferred they are indeed hungry.

As likewise used herein, a non-user entity profile 632 broadly refers to a collection of information that uniquely describes a non-user entity's identity and their associated behavior, whether the behavior occurs within a physical realm or cyberspace. In various embodiments, the non-user entity profile 632 may be implemented to include certain non-user profile attributes 634. As used herein, a non-user profile attribute 634 broadly refers to data or metadata that can be used, individually or in combination with other non-user profile attributes 634, to ascertain the identity of a non-user entity. In various embodiments, certain non-user profile attributes 634 may be uniquely associated with a particular non-user entity.

In certain embodiments, the non-user profile attributes 634 may be implemented to include certain identity information, such as a non-user entity's network, Media Access Control (MAC), or physical address, its serial number, associated configuration information, and so forth. In various embodiments, the non-user profile attributes 634 may be implemented to include non-user behavior information associated with interactions between certain user and non-user entities, the type of those interactions, the data exchanged during the interactions, the date/time/frequency of such interactions, and certain services accessed or provided.

In various embodiments, the EBC system 120 may be implemented to use certain data associated with an EBP 638 to provide a probabilistic measure of whether a particular electronically-observable event is of analytic utility. In certain embodiments, an electronically-observable event that is of analytic utility may be determined to be anomalous, abnormal, unexpected, or malicious. In certain embodiments, an electronically-observable event determined to be anomalous, abnormal, unexpected, or malicious may be associated with an operation performed by a particular endpoint device, described in greater detail herein. To continue the prior example, a user may typically work out of their company's corporate office on Fridays. Furthermore, various user mindset factors 622 within their associated user entity profile 602 may indicate that the user is typically relaxed and methodical when working with customer data. Moreover, the user's user entity profile 602 indicates that such user interactions 614 with customer data typically occur on Monday mornings and the user rarely, if ever, copies or downloads customer data. However, the user may decide to interact with certain customer data late at night, on a Friday, while in their company's corporate office. As they do so, they exhibit an increased heart rate, rapid breathing, and furtive keystrokes while downloading a subset of customer data to a flash drive.

Consequently, their user entity mindset profile 630 may reflect a nervous, fearful, or guilty mindset, which is inconsistent with the entity state 634 of dealing with customer data in general. More particularly, downloading customer data late at night on a day the user is generally not in their primary office results in an entity state 634 that is likewise inconsistent with the user's typical user behavior. As a result, the EBC system 120 may infer that the user's behavior may represent a security threat. Those of skill in the art will recognize that many such embodiments and examples are possible. Accordingly, the foregoing is not intended to limit the spirit, scope or intent of the invention.

Certain embodiments of the invention reflect an appreciation that the quantity, and relevancy, of information contained in a particular EBP 638 may have a direct bearing on its analytic utility when attempting to determine the trustworthiness of an associated entity and whether or not they represent a security risk. As used herein, the quantity of information contained in a particular EBP 638 broadly refers to the variety and volume of EBP elements it may contain, and the frequency of their respective instances, or occurrences, related to certain aspects of an associated entity's identity and behavior. As used herein, an EBP element broadly refers to any data element stored in an EBP 638, as described in greater detail herein. In various embodiments, an EBP element may be used to describe a particular aspect of an EBP, such as certain user profile attributes 604, user behavior factors 610, user mindset factors 622, user entity mindset profile 630, non-user profile attributes 634, and entity state 636.

In certain embodiments, statistical analysis may be performed on the information contained in a particular EBP 638 to determine the trustworthiness of its associated entity and whether or not they represent a security risk. For example, a particular authentication factor 606, such as a biometric, may be consistently used by a user entity for authenticating their identity to their endpoint device. To continue the example, a user ID and password may be used by the same, or a different user entity, in an attempt to access the endpoint device. As a result, the use of a user ID and password may indicate a security risk due to its statistical infrequency. As another example, a user entity may consistently access three different systems on a daily basis in their role as a procurement agent. In this example, the three systems may include a financial accounting system, a procurement system, and an inventory control system. To continue the example, an attempt by the procurement agent to access a sales forecast system may appear suspicious if never attempted before, even if the purpose for accessing the system is legitimate.

As likewise used herein, the relevancy of information contained in a particular EBP 638 broadly refers to the pertinence of the EBP elements it may contain to certain aspects of an associated entity's identity and behavior. To continue the prior example, an EBP 638 associated with the procurement agent may contain certain user profile attributes 604 related to their title, position, role, and responsibilities, all or which may be pertinent to whether or not they have a legitimate need to access the sales forecast system. In certain embodiments, the user profile attributes 604 may be implemented to include certain job description information. To further continue the example, such job description information may have relevance when attempting to determine whether or not the associated entity's behavior is suspicious. In further continuance of the example, job description information related to the procurement agent may include their responsibility to check sales forecast data, as needed, to ascertain whether or not to procure certain items. In these embodiments, the method by which it is determined whether the information contained in a particular EBP 638 is of sufficient quantity and relevancy is a matter of design choice.

Various embodiments of the invention likewise reflect an appreciation that accumulating sufficient information in an EBP 638 to make such a determination may take a certain amount of time. Likewise, various embodiments of the invention reflect an appreciation that the effectiveness or accuracy of such a determination may rely upon certain entity behaviors occurring with sufficient frequency, or in identifiable patterns, or a combination thereof, during a particular period of time. As an example, there may not be sufficient occurrences of a particular type of entity behavior to determine if a new entity behavior is inconsistent with known past occurrences of the same type of entity behavior. Accordingly, various embodiments of the invention reflect an appreciation that a sparsely-populated EBP 638 may likewise result in exposure to certain security vulnerabilities. Furthermore, the relevance of such sparsely-populated information initially contained in an EBP 638 first implemented may not prove very useful when using an EBP 638 to determine the trustworthiness of an associated entity and whether or not they represent a security risk.

Figure 7A:
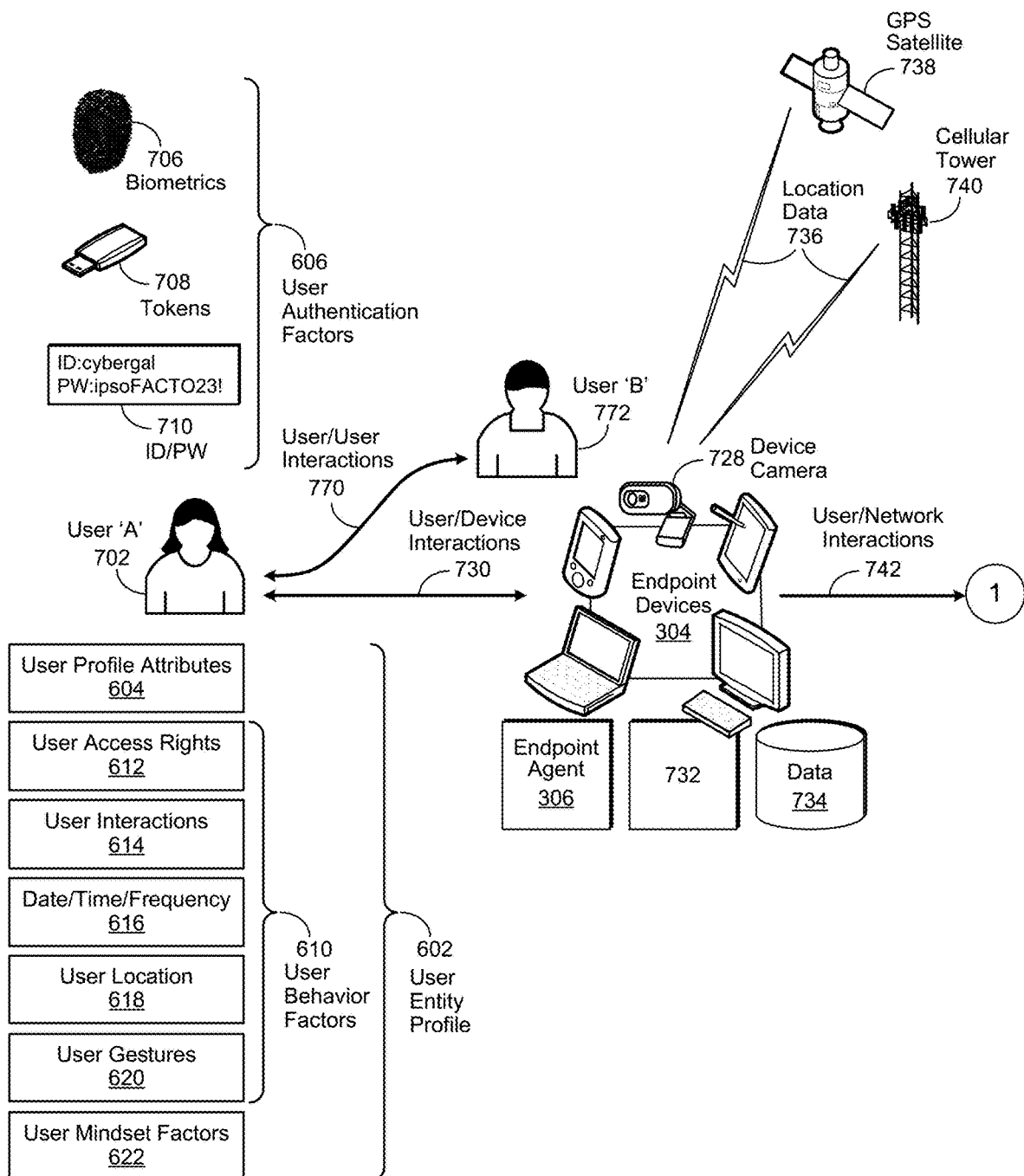
FIGS. 7a and 7b are a simplified block diagram of the operation of a security analytics system.
Figure 7B:
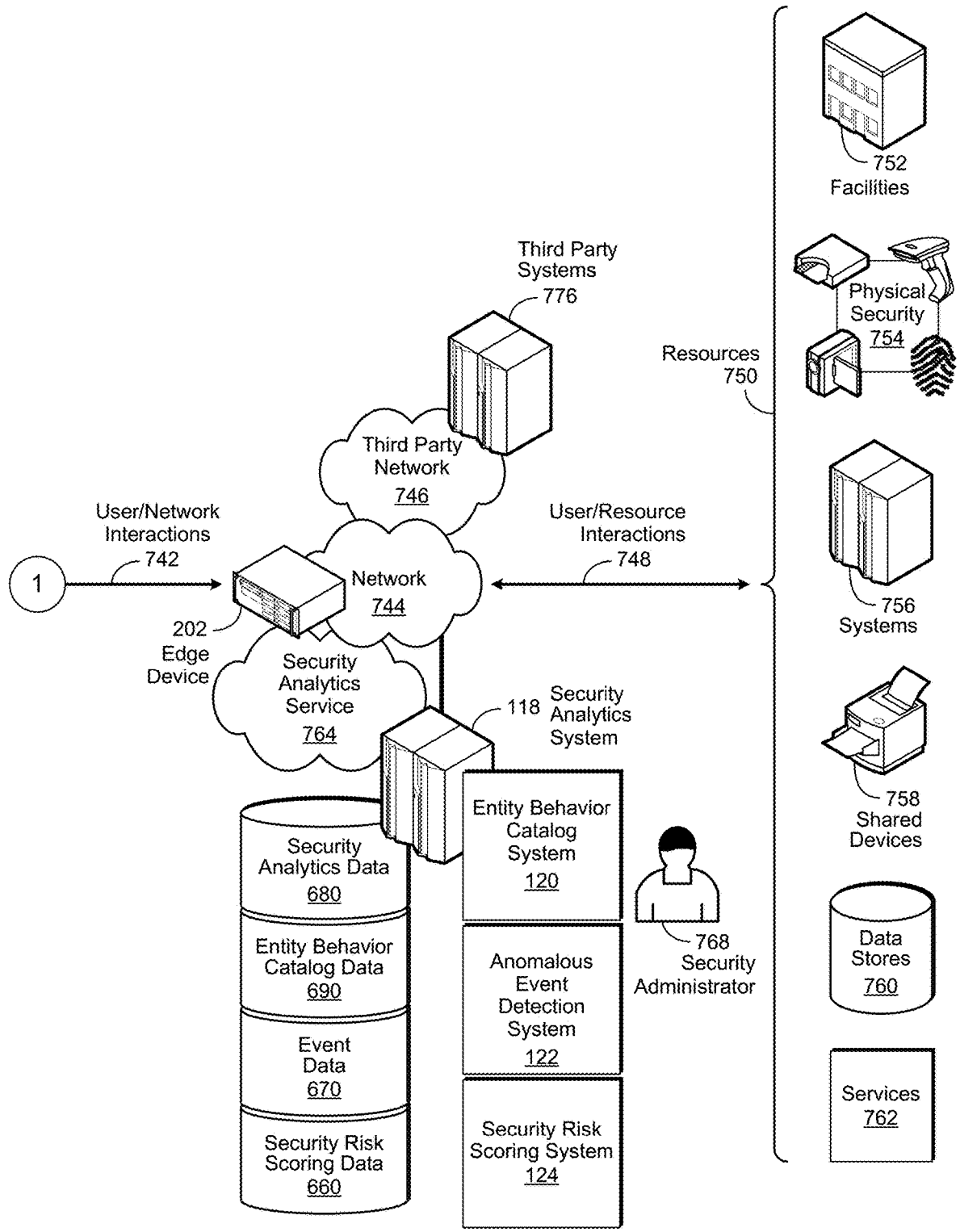

FIGS. 7a and 7b show a block diagram of a security analytics environment implemented in accordance with an embodiment of the invention. In certain embodiments, a security analytics system 118 may be implemented with an entity behavior catalog (EBC) system 120, an anomalous event detection system 122, and a security risk scoring system 124, or a combination thereof. In certain embodiments, analyses performed by the security analytics system 118 may be used to identify behavior associated with a particular entity that may be of analytic utility.

In certain embodiments, as likewise described in greater detail herein, the EBC system 120, the anomalous event detection system 122, and the security risk scoring system 124, or a combination thereof, may be used in combination with the security analytics system 118 to perform such analyses. In various embodiments, certain data stored in the repositories of security risk scoring 660, event 670, security analytics 680, and EBC 690 data, or a combination thereof, may be used by the security analytics system 118 to perform the analyses. As likewise described in greater detail herein, the security analytics system 118, the EBC system 120, the anomalous event detection system 122, and the security risk scoring system 124, or a combination thereof, may be used in combination with one another in certain embodiments to perform an anomalous event detection operation. Likewise, certain data stored in the repositories of security risk scoring 660, event 670, security analytics 680, and EBC 690 data, or a combination thereof, may be used in various embodiments to perform the anomalous event detection operation.

In certain embodiments, the entity behavior of analytic utility may be identified at a particular point in time, during the occurrence of an event, the enactment of a user or non-user entity behavior, or a combination thereof. As used herein, an entity broadly refers to something that exists as itself, whether physically or abstractly. In certain embodiments, an entity may be a user entity, a non-user entity, or a combination thereof. In certain embodiments, a user entity may be an individual user, such as user 'A' 702 or 'B' 772, a group, an organization, or a government. In certain embodiments, a non-user entity may likewise be an item, a device, such as endpoint 304 and edge 202 devices, a network, such as an internal 744 and external 746 networks, a domain, an operation, or a process. In certain embodiments, a non-user entity may be a resource 750, such as a geographical location or formation, a physical facility 752, such as a venue, various physical security devices 754, a system 756, shared devices 758, such as printer, scanner, or copier, a data store 760, or a service 762, such as a service 762 operating in a cloud environment.

As likewise used herein, an event broadly refers to the occurrence of an action performed by an entity. In certain embodiments, the action may be directly associated with an entity behavior, described in greater detail herein. As an example, a first user may attach a binary file infected with a virus to an email that is subsequently sent to a second user. In this example, the act of attaching the binary file to the email is directly associated with an entity behavior enacted by the first user. In certain embodiments, the action may be indirectly associated with an entity behavior. To continue the example, the recipient of the email may open the infected binary file, and as a result, infect their computer with malware. To further continue the example, the act of opening the infected binary file is directly associated with an entity behavior enacted by the second user. However, the infection of the email recipient's computer by the infected binary file is indirectly associated with the described entity behavior enacted by the second user.

In various embodiments, certain user authentication factors 606 may be used to authenticate the identity of a user entity. In certain embodiments, the user authentication factors 606 may be used to ensure that a particular user entity, such as user 'A' 702 or 'B' 772, is associated with their corresponding user entity profile 602, rather than a user entity profile 602 associated with another user. In certain embodiments, the user authentication factors 606 may include a user's biometrics 706 (e.g., a fingerprint or retinal scan), tokens 708 (e.g., a dongle containing cryptographic keys), user identifiers and passwords (ID/PW) 710, and personal identification numbers (PINs).

In certain embodiments, information associated with such user entity behavior may be stored in a user entity profile 602, described in greater detail herein. In certain embodiments, the user entity profile 602 may be stored in a repository of entity behavior catalog (EBC) data 690. In certain embodiments, as likewise described in greater detail herein, the user entity profile 602 may include user profile attributes 604, user behavior factors 610, user mindset factors 622, or a combination thereof. As used herein, a user profile attribute 604 broadly refers to data or metadata that can be used, individually or in combination with other user profile attributes 604, user behavior factors 610, or user mindset factors 622, to ascertain the identity of a user entity. In various embodiments, certain user profile attributes 604 may be uniquely associated with a particular user entity.

As likewise used herein, a user behavior factor 610 broadly refers to information associated with a user's behavior, whether the behavior occurs within a physical realm or cyberspace. In certain embodiments, the user behavior factors 610 may include the user's access rights 612, the user's interactions 614, and the date/time/frequency 616 of those interactions 614. In certain embodiments, the user behavior factors 610 may likewise include the user's location 618 when the interactions 614 are enacted, and the user gestures 620 used to enact the interactions 614.

In various embodiments, certain date/time/frequency 616 user behavior factors 610 may be implemented as ontological or societal time, or a combination thereof. As used herein, ontological time broadly refers to how one instant in time relates to another in a chronological sense. As an example, a first user behavior enacted at 12:00 noon on May 17, 2017 may occur prior to a second user behavior enacted at 6:39 PM on May 18, 2018. Skilled practitioners of the art will recognize one value of ontological time is to determine the order in which various user behaviors have been enacted.

As likewise used herein, societal time broadly refers to the correlation of certain user profile attributes 604, user behavior factors 610, user mindset factors 622, or a combination thereof, to one or more instants in time. As an example, user 'A' 702 may access a particular system 756 to download a customer list at 3:47 PM on Nov. 3, 2017. Analysis of their user behavior profile indicates that it is not unusual for user 'A' 702 to download the customer list on a weekly basis. However, examination of their user behavior profile also indicates that user 'A' 702 forwarded the downloaded customer list in an email message to user 'B' 772 at 3:49 PM that same day. Furthermore, there is no record in their user behavior profile that user 'A' 702 has ever communicated with user 'B' 772 in the past. Moreover, it may be determined that user 'B' 872 is employed by a competitor. Accordingly, the correlation of user 'A' 702 downloading the customer list at one point in time, and then forwarding the customer list to user 'B' 772 at a second point in time shortly thereafter, is an example of societal time.

In a variation of the prior example, user 'A' 702 may download the customer list at 3:47 PM on Nov. 3, 2017. However, instead of immediately forwarding the customer list to user 'B' 772, user 'A' 702 leaves for a two week vacation. Upon their return, they forward the previously-downloaded customer list to user 'B' 772 at 9:14 AM on Nov. 20, 2017. From an ontological time perspective, it has been two weeks since user 'A' 702 accessed the system 756 to download the customer list. However, from a societal time perspective, they have still forwarded the customer list to user 'B' 772, despite two weeks having elapsed since the customer list was originally downloaded.

Accordingly, the correlation of user 'A' 702 downloading the customer list at one point in time, and then forwarding the customer list to user 'B' 772 at a much later point in time, is another example of societal time. More particularly, it may be inferred that the intent of user 'A' 702 did not change during the two weeks they were on vacation. Furthermore, user 'A' 702 may have attempted to mask an intended malicious act by letting some period of time elapse between the time they originally downloaded the customer list and when they eventually forwarded it to user 'B' 772. From the foregoing, those of skill in the art will recognize that the use of societal time may be advantageous in determining whether a particular entity behavior is of analytic utility. As used herein, mindset factors 622 broadly refer to information used to infer the mental state of a user at a particular point in time, during the occurrence of an event, an enactment of a user behavior, or combination thereof.

In certain embodiments, the security analytics system 118 may be implemented to process certain entity attribute information, described in greater detail herein, associated with providing resolution of the identity of an entity at a particular point in time. In various embodiments, the security analytics system 118 may be implemented to use certain entity identifier information, likewise described in greater detail herein, to ascertain the identity of an associated entity at a particular point in time. In various embodiments, the entity identifier information may include certain temporal information, described in greater detail herein. In certain embodiments, the temporal information may be associated with an event associated with a particular point in time.

In certain embodiments, the security analytics system 118 may be implemented to use information associated with certain entity behavior elements to resolve the identity of an entity at a particular point in time. An entity behavior element, as used herein, broadly refers to a discrete element of an entity's behavior during the performance of a particular operation in a physical realm, cyberspace, or a combination thereof. In certain embodiments, such entity behavior elements may be associated with a user/device 730, a user/network 742, a user/resource 748, a user/user 770 interaction, or a combination thereof.

As an example, user 'A' 702 may use an endpoint device 304 to browse a particular web page on a news site on an external system 776. In this example, the individual actions performed by user 'A' 702 to access the web page are entity behavior elements that constitute an entity behavior, described in greater detail herein. As another example, user 'A' 702 may use an endpoint device 304 to download a data file from a particular system 756. In this example, the individual actions performed by user 'A' 702 to download the data file, including the use of one or more user authentication factors 606 for user authentication, are entity behavior elements that constitute an entity behavior. In certain embodiments, the user/device 730 interactions may include an interaction between a user, such as user 'A' 702 or 'B' 772, and an endpoint device 304.

In certain embodiments, the user/device 730 interaction may include interaction with an endpoint device 304 that is not connected to a network at the time the interaction occurs. As an example, user 'A' 702 or 'B' 772 may interact with an endpoint device 304 that is offline, using applications 732, accessing data 734, or a combination thereof, it may contain. Those user/device 730 interactions, or their result, may be stored on the endpoint device 304 and then be accessed or retrieved at a later time once the endpoint device 304 is connected to the internal 744 or external 746 networks. In certain embodiments, an endpoint agent 306 may be implemented to store the user/device 730 interactions when the user device 304 is offline.

In certain embodiments, an endpoint device 304 may be implemented with a device camera 728. In certain embodiments, the device camera 728 may be integrated into the endpoint device 304. In certain embodiments, the device camera 728 may be implemented as a separate device configured to interoperate with the endpoint device 304. As an example, a webcam familiar to those of skill in the art may be implemented receive and communicate various image and audio signals to an endpoint device 304 via a Universal Serial Bus (USB) interface.

In certain embodiments, the device camera 728 may be implemented to capture and provide user/device 730 interaction information to an endpoint agent 306. In various embodiments, the device camera 728 may be implemented to provide surveillance information related to certain user/device 730 or user/user 770 interactions. In certain embodiments, the surveillance information may be used by the security analytics system 118 to detect entity behavior associated with a user entity, such as user 'A' 702 or user 'B' 772 that may be of analytic utility.

In certain embodiments, the endpoint device 304 may be used to communicate data through the use of an internal network 744, an external network 746, or a combination thereof. In certain embodiments, the internal 744 and the external 746 networks may include a public network, such as the Internet, a physical private network, a virtual private network (VPN), or any combination thereof. In certain embodiments, the internal 744 and external 746 networks may likewise include a wireless network, including a personal area network (PAN), based on technologies such as Bluetooth. In various embodiments, the wireless network may include a wireless local area network (WLAN), based on variations of the IEEE 802.11 specification, commonly referred to as WiFi. In certain embodiments, the wireless network may include a wireless wide area network (WWAN) based on an industry standard including various 3G, 4G and 5G technologies.

In certain embodiments, the user/user 770 interactions may include interactions between two or more user entities, such as user 'A' 702 and 'B' 772. In certain embodiments, the user/user interactions 770 may be physical, such as a face-to-face meeting, via a user/device 730 interaction, a user/network 742 interaction, a user/resource 748 interaction, or some combination thereof. In certain embodiments, the user/user 770 interaction may include a face-to-face verbal exchange. In certain embodiments, the user/user 770 interaction may include a written exchange, such as text written on a sheet of paper. In certain embodiments, the user/user 770 interaction may include a face-to-face exchange of gestures, such as a sign language exchange.

In certain embodiments, temporal event information associated with various user/device 730, user/network 742, user/resource 748, or user/user 770 interactions may be collected and used to provide real-time resolution of the identity of an entity at a particular point in time. Those of skill in the art will recognize that many such examples of user/device 730, user/network 742, user/resource 748, and user/user 770 interactions are possible. Accordingly, the foregoing is not intended to limit the spirit, scope or intent of the invention.

In various embodiments, the security analytics system 118 may be implemented to process certain contextual information in the performance of certain security analytic operations. As used herein, contextual information broadly refers to any information, directly or indirectly, individually or in combination, related to a particular entity behavior. In certain embodiments, entity behavior may include a user entity's physical behavior, cyber behavior, or a combination thereof. As likewise used herein, a user entity's physical behavior broadly refers to any user behavior occurring within a physical realm, such as speaking, gesturing, facial patterns or expressions, walking, and so forth. More particularly, such physical behavior may include any action enacted by an entity user that can be objectively observed, or indirectly inferred, within a physical realm. In certain embodiments, the objective observation, or indirect inference, of the physical behavior may be performed electronically.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user entity that can be observed through the use of an electronic device (e.g., an electronic sensor), a computing device or system (e.g., an endpoint 304 or edge 202 device, a physical security device 754, a system 756, a shared device 758, etc.), computer instructions (e.g., a software application), or a combination thereof.

Cyber behavior, as used herein, broadly refers to any behavior occurring in cyberspace, whether enacted by an individual user, a group of users, or a system acting at the behest of an individual user, a group of users, or other entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system 756 at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, which makes them electronically-observable.

In certain embodiments, the contextual information may include location data 736. In certain embodiments, the endpoint device 304 may be configured to receive such location data 736, which is used as a data source for determining the user's location 618. In certain embodiments, the location data 736 may include Global Positioning System (GPS) data provided by a GPS satellite 738. In certain embodiments, the location data 736 may include location data 736 provided by a wireless network, such as from a cellular network tower 740. In certain embodiments (not shown), the location data 736 may include various Internet Protocol (IP) or other network address information assigned to the endpoint 304 or edge 202 device. In certain embodiments (also not shown), the location data 736 may include recognizable structures or physical addresses within a digital image or video recording.

In certain embodiments, the endpoint devices 304 may include an input device (not shown), such as a keypad, magnetic card reader, token interface, biometric sensor, and so forth. In certain embodiments, such endpoint devices 304 may be directly, or indirectly, connected to a particular facility 752, physical security device 754, system 756, or shared device 758. As an example, the endpoint device 304 may be directly connected to an ingress/egress system, such as an electronic lock on a door or an access gate of a parking garage. As another example, the endpoint device 304 may be indirectly connected to a physical security device 754 through a dedicated security network.

In certain embodiments, the security analytics system 118 may be implemented to perform various risk-adaptive protection operations. Risk-adaptive, as used herein, broadly refers to adaptively responding to risks associated with an electronically-observable entity behavior. In various embodiments, the security analytics system 118 may be implemented to perform certain risk-adaptive protection operations by monitoring certain entity behaviors, assess the corresponding risk they may represent, individually or in combination, and respond with an associated response. In certain embodiments, such responses may be based upon contextual information, described in greater detail herein, associated with a given entity behavior.

In certain embodiments, various information associated with a user entity profile 602, likewise described in greater detail herein, may be used to perform the risk-adaptive protection operations. In certain embodiments, the user entity profile 602 may include user profile attributes 604, user behavior factors 610, user mindset factors 622, or a combination thereof. In these embodiments, the information associated with a user entity profile 602 used to perform the risk-adaptive protection operations is a matter of design choice.

In certain embodiments, the security analytics system 118 may be implemented as a stand-alone system. In certain embodiments, the security analytics system 118 may be implemented as a distributed system. In certain embodiment, the security analytics system 118 may be implemented as a virtual system, such as an instantiation of one or more virtual machines (VMs). In certain embodiments, the security analytics system 118 may be implemented as a security analytics service 764. In certain embodiments, the security analytics service 764 may be implemented in a cloud environment familiar to those of skill in the art. In various embodiments, the security analytics system 118 may use data stored in a repository of security analytics data 680, entity behavior catalog data 690, entity identifier data 670, and event data 672, or a combination thereof, in the performance of certain security analytics operations, described in greater detail herein. Those of skill in the art will recognize that many such embodiments are possible. Accordingly, the foregoing is not intended to limit the spirit, scope or intent of the invention.

Figure 8:
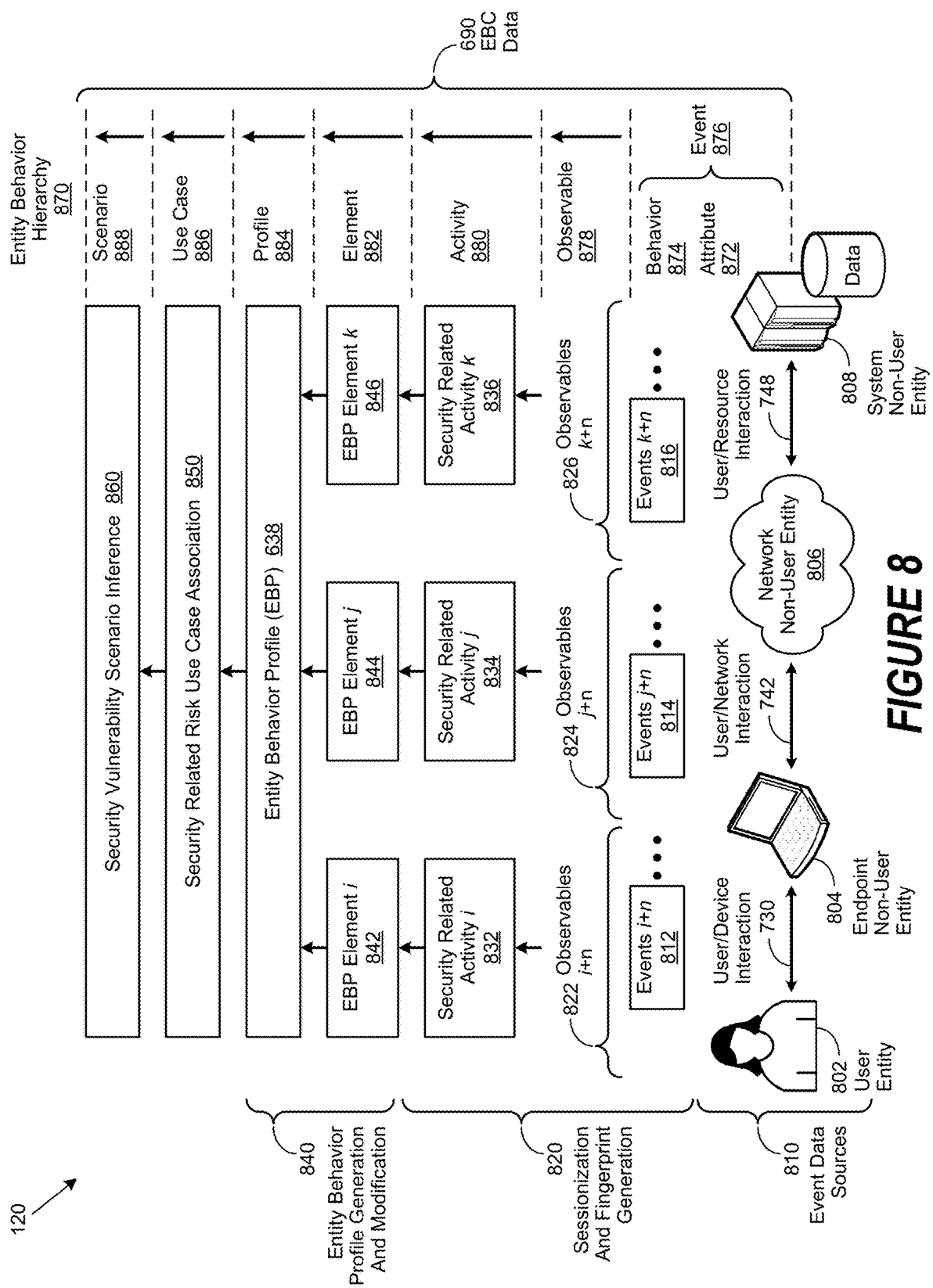
FIG. 8 is a simplified block diagram showing the mapping of an event to a security vulnerability scenario.

FIG. 8 is a simplified block diagram showing the mapping of an event to a security vulnerability scenario implemented in accordance with an embodiment of the invention. In certain embodiments, an entity behavior catalog (EBC) system 120 may be implemented to identify a security related activity, described in greater detail herein. In certain embodiments, the security related activity may be based upon an observable, likewise described in greater detail herein. In certain embodiments, the observable may include event information corresponding to electronically-observable behavior enacted by an entity. In certain embodiments, the event information corresponding to electronically-observable behavior enacted by an entity may be received from an electronic data source, such as the event data sources 810 shown in FIGS. 8 and 14.

In certain embodiments, as likewise described in greater detail herein, the EBC system 120 may be implemented to identify a particular event of analytic utility by analyzing an associated security related activity. In certain embodiments, the EBC system 120 may be implemented to generate entity behavior catalog data based upon an identified event of analytic utility associated with a particular security related activity. In various embodiments, the EBC system 120 may be implemented to associate certain entity behavior data it may generate with a predetermined abstraction level, described in greater detail herein.

In various embodiments, the EBC system 120 may be implemented to use certain EBC data 690 and an associated abstraction level to generate a hierarchical set of entity behaviors 870, described in greater detail herein. In certain embodiments, the hierarchical set of entity behaviors 870 generated by the EBC system 120 may represent an associated security risk, likewise described in greater detail herein. Likewise, as described in greater detail herein, the EBC system 120 may be implemented in certain embodiments to store the hierarchical set of entity behaviors 870 and associated abstraction level information within a repository of EBC data 690. In certain embodiments, the repository of EBC data 690 may be implemented to provide an inventory of entity behaviors for use when performing a security operation, likewise described in greater detail herein.

Referring now to FIG. 8, the EBC system 120 may be implemented in various embodiments to receive certain event information, described in greater detail herein, corresponding to an event associated with an entity interaction. As used herein, event information broadly refers to any information directly or indirectly related to an event. As likewise used herein, an event broadly refers to the occurrence of at least one action performed by an entity. In certain embodiments, the at least one action performed by an entity may include the enactment of an entity behavior, described in greater detail herein. In certain embodiments, the entity behavior may include an entity's physical behavior, cyber behavior, or a combination thereof, as likewise described in greater detail herein.

Likewise, as used herein, an entity interaction broadly refers to an action influenced by another action enacted by an entity. As an example, a first user entity may perform an action, such as sending a text message to a second user entity, who in turn replies with a response. In this example, the second user entity's action of responding is influenced by the first user entity's action of sending the text message. In certain embodiments, an entity interaction may include the occurrence of at least one event enacted by one entity when interacting with another, as described in greater detail herein. In certain embodiments, an event associated with an entity interaction may include at least one entity attribute, described in greater detail herein, and at least one entity behavior, likewise described in greater detail herein.

In certain embodiments, an entity attribute and an entity behavior may be respectively abstracted to an entity attribute 872 and an entity behavior 874 abstraction level. In certain embodiments, an entity attribute 872 and an entity behavior 874 abstraction level may then be associated with an event 876 abstraction level. In certain embodiments, the entity attribute 872, entity behavior 874, and event 876 abstraction levels may in turn be associated with a corresponding entity behavior hierarchy 870, as described in greater detail herein.

In various embodiments, the event information may be received from certain event data sources 810, such as a user 802 entity, an endpoint 804 non-user entity, a network 806 non-user entity, or a system 808 non-user entity. In certain embodiments, one or more events may be associated with a particular entity interaction. As an example, as shown in FIG. 8, one or more events i+n 812 may be associated with a user/device 730 interaction between a user 802 entity and an endpoint 804 non-user entity. Likewise, one or more events j+n 814 may be associated with a user/network 742 interaction between a user 802 entity and a network 806 non-user entity. As likewise shown in FIG. 8, one or more events k+n 916 816 may be associated with a user/resource 748 interaction between a user 802 entity and a system 808 non-user entity.

In certain embodiments, details of an event, such as events i+n 812, j+n 814, and k+n 816, may be included in their associated event information. In various embodiments, as described in greater detail herein, analytic utility detection operations may be performed on such event information to identify events of analytic utility. In various embodiments, certain event information associated with an event determined to be of analytic utility may be used to derive a corresponding observable. As used herein, an observable broadly refers to an event of analytic utility whose associated event information may include entity behavior that may be anomalous, abnormal, unexpected, malicious, or some combination thereof, as described in greater detail herein.

As an example, the details contained in the event information respectively corresponding to events i+n 812, j+n 814, and k+n 816 may be used to derive observables i+n 822, j+n 824, and k+n 826. In certain embodiments, the resulting observables i+n 822, j+n 824, and k+n 826 may then be respectively associated with a corresponding observable 878 abstraction level. In certain embodiments, the observable 878 abstraction level may in turn be associated with a corresponding entity behavior hierarchy 870, as described in greater detail herein.

In certain embodiments, the resulting observables may in turn be processed to generate an associated security related activity. As used herein, a security related activity broadly refers to an abstracted description of an interaction between two entities, described in greater detail herein, which may represent anomalous, abnormal, unexpected, or malicious entity behavior. For example, observables i+n 822, j+n 824, and k+n 826 may in turn be processed to generate corresponding security related activities i 832, j 834, and k 836. In certain embodiments, the resulting security related activities, i 832, j 834, and k 836 may then be respectively associated with a corresponding security related activity 880 abstraction level. In certain embodiments, the security related activity 880 abstraction level may in turn be associated with a corresponding entity behavior hierarchy 870, as described in greater detail herein.

In various embodiments, sessionization and fingerprint generation operations 820, described in greater detail herein, may be performed to associate certain events, observables, and security related activities, or a combination thereof, with a corresponding session, likewise described in greater detail herein. As an example, events i+n 812, j+n 814, k+n 816, observables i+n 822, j+n 824, k+n 826, and security related activities i 832, j 834, k 836 may be associated with corresponding sessions. In certain embodiments, a security related activity may be processed with associated contextual information, described in greater detail herein, to generate a corresponding EBP element.

For example, security related activities i 832, j 834, and k 836 may be processed with associated contextual information to generate corresponding EBP elements i 842, j 844, and k 846. In various embodiments, the resulting EBP elements i 842, j 844, and k 846 may then be associated with a corresponding EBP element 882 abstraction level. In certain embodiments, the EBP element 882 abstraction level may in turn be associated with a corresponding entity behavior hierarchy 870, as described in greater detail herein.

In certain embodiments, EBP generation and modification 840 operations may be performed to associate one or more EBP elements with a particular EBP 638. As an example, EBP elements i 842, j 844, and k 946 may be associated with a particular EBP 638, which may likewise be respectively associated with the various entities involved in the user/device 730, user/network 742, or user/resource 748 interactions. In these embodiments, the method by which the resulting EBP elements i 842, j 844, and k 846 are associated with a particular EBP 638 is a matter of design choice. In certain embodiments, the EBP 638 may likewise be associated with an EBP 884 abstraction level. In certain embodiments, the EBP 884 abstraction level may in turn be associated with a corresponding entity behavior hierarchy 870, as described in greater detail herein.

In various embodiments, the resulting EBP 638 may be used in the performance of security risk use case association 850 operations to identify one or more security risk use cases that match certain entity behavior information stored in the EBP 638. As used herein, a security risk use case broadly refers to a set of security related activities that create a security risk narrative that can be used to adaptively draw inferences, described in greater detail herein, from entity behavior enacted by a particular entity. In certain of these embodiments, the entity behavior information may be stored within the EBP 638 in the form of an EBP element, a security related activity, an observable, or an event, or a combination thereof. In certain embodiments, identified security risk use cases may then be associated with a security risk use case 886 abstraction level. In certain embodiments, the security risk use case 886 abstraction level may in turn be associated with a corresponding entity behavior hierarchy 870, as described in greater detail herein.

In certain embodiments, the results of the security risk use case association 850 operations may in turn be used to perform security vulnerability scenario inference 860 operations to associate one or more security risk use cases with one or more security vulnerability scenarios. As used herein, a security vulnerability scenario broadly refers to a grouping of one or more security risk use cases that represent a particular class of security vulnerability. In certain embodiments, the associated security vulnerability scenarios may then be associated with a security vulnerability scenario 888 abstraction level. In certain embodiments, the security vulnerability scenario 888 abstraction level may in turn be associated with a corresponding entity behavior hierarchy 870, as described in greater detail herein.

In various embodiments, certain event information associated with events i+n 812, j+n 814, and k+n 816 and certain observable information associated with observables i+n 822, j+n 824, and k+n 826 may be stored in a repository of EBC data 690. In various embodiments, certain security related activity information associated with security related activities i 832, j 834, and k 836 and EBP elements i 842, j 844, and k 846 may likewise be stored in the repository of EBC data 690. Likewise, in various embodiments, certain security risk use case association and security vulnerability scenario association information respectively associated with the performance of security risk use case association 850 and security vulnerability scenario inference 860 operations may be stored in the repository of EBC data 690.

Figure 9:
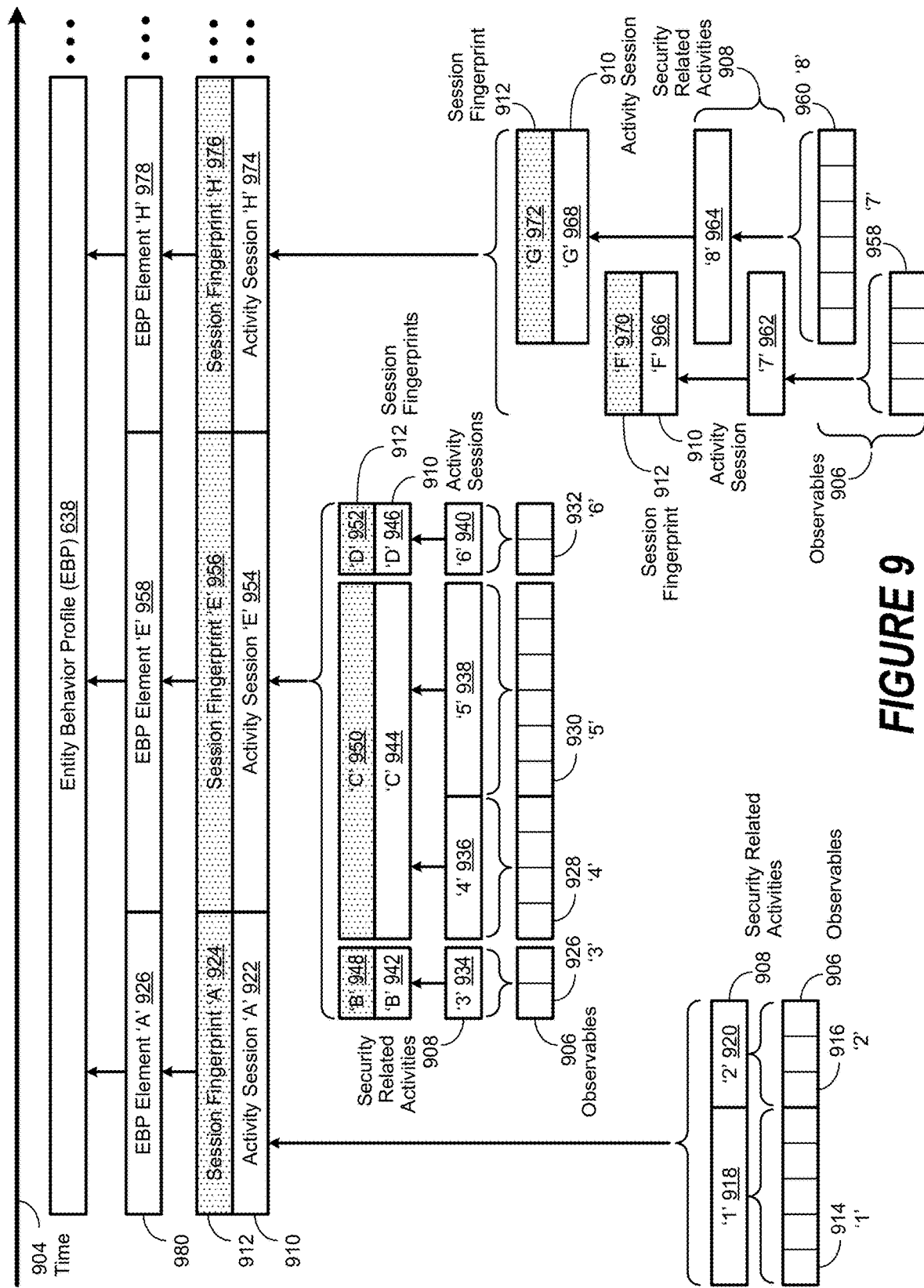
FIG. 9 is a simplified block diagram of the generation of a session and a corresponding session-based fingerprint.

FIG. 9 is a simplified block diagram of the generation of a session and a corresponding session-based fingerprint implemented in accordance with an embodiment of the invention. In certain embodiments, an observable 906 may be derived from an associated event, as described in greater detail herein. In certain embodiments, one or more observables 906 may be processed to generate a corresponding security related activity 908. In certain embodiments, one or more security related activities 908 may then be respectively processed to generate a corresponding activity session 910. In turn, the session 910 may be processed in certain embodiments to generate a corresponding session fingerprint 912. In certain embodiments, the resulting activity session 910 and its corresponding session fingerprint 912, individually or in combination, may then be associated with a particular entity behavior profile (EBP) element 980. In certain embodiments the EBP element 980 may in turn be associated with an EBP 638.

In certain embodiments, intervals in time 904 respectively associated with various security related activities 908 may be contiguous. For example, as shown in FIG. 9, the intervals in time 904 associated with observables 906 '1' 914 and '2' 916 may be contiguous. Accordingly, the intervals in time 904 associated with the security related activities 908 '1' 918 and '2' 920 respectively generated from observables 906 '1' 914 and '2' 916 would likewise be contiguous.

As likewise shown in FIG. 9, the resulting security related activities 908 '1' 918 and '2' 920 may be processed to generate an associated activity session 'A' 922, which then may be processed to generate a corresponding session fingerprint 'A' 924. In certain embodiments, activity session 'A' 922 and its corresponding session fingerprint 'A' 924 may be used to generate a new entity behavior profile (EBP) element 980 'A' 926. In certain embodiments, EBP element 980 'A' 926 generated from activity session 910 'A' 922 and its corresponding session fingerprint 912 'A' 924 may be associated with an existing EBP 638.

To provide an example, a user may enact various observables 906 '1' 914 to update sales forecast files, followed by the enactment of various observables 906 '2' 1016 to attach the updated sales forecast files to an email, which is then sent to various co-workers. In this example, the enactment of observables 906 '1' 914 and '2' 916 result in the generation of security related activities 908 '1' 918 and '2' 920, which in turn are used to generate activity session 910 'A' 922. In turn, the resulting activity session 910 'A' 922 is then used to generate its corresponding session-based fingerprint 912 'A' 924. To continue the example, activity session 910 'A' 922 is associated with security related activities 908 '1' 918 and '2' 920, whose associated intervals in time 904 are contiguous, as they are oriented to the updating and distribution of sales forecast files via email.

Various aspects of the invention reflect an appreciation that a user may enact certain entity behaviors on a recurring basis. To continue the preceding example, a user may typically update sales forecast files and distribute them to various co-workers every morning between 8:00 AM and 10:00 AM. Accordingly, the activity session 910 associated with such a recurring activity may result in a substantively similar session fingerprint 912 week-by-week. However, a session fingerprint 912 for the same session 910 may be substantively different should the user happen to send an email with an attached sales forecast file to a recipient outside of their organization. Consequently, a session fingerprint 912 that is inconsistent with session fingerprints 912 associated with past activity sessions 910 may indicate anomalous, abnormal, unexpected or malicious behavior.

In certain embodiments, two or more activity sessions 910 may be noncontiguous, but associated. In certain embodiments, an activity session 910 may be associated with two or more sessions 910. In certain embodiments, an activity session 910 may be a subset of another activity session 910. As an example, as shown in FIG. 9, the intervals in time 904 respectively associated with observables 906 '3' 914 and '6' 932 may be contiguous. Likewise, the intervals in time 904 associated with observables 906 '4' 936 and '5' 938 may be contiguous.

Accordingly, the intervals in time 904 associated with the security related activities 908 '4' 936 and '5' 938 respectively generated from observables 906 '4' 928 and '5' 930 would likewise be contiguous. However, the intervals in time 904 associated with security related activities 908 '4' 936 and '5' 938 would not be contiguous with the intervals in time respectively associated with security related activities 908 '3' 934 and '6' 940.

As likewise shown in FIG. 9, the resulting security related activities 908 '3' 934 and '6' 940 may be respectively processed to generate corresponding sessions 'B' 942 and 'D' 946, while security related activities 908 '4' 936 and '5' 938 may be processed to generate activity session 910 'C' 944. In turn, activity sessions 910 'B' 942, 'C' 944, and 'D' 946 are then respectively processed to generate corresponding session-based fingerprints 912 'B' 948, 'C' 950 and 'D' 952.

Accordingly, the intervals of time 904 respectively associated with activity sessions 910 'B' 942, 'C' 944, and 'D' 946, and their corresponding session fingerprints 912 'B' 948, 'C' 950 and 'D' 952, are not contiguous. Furthermore, in this example activity sessions 910 'B' 942, 'C' 944, and 'D' 946, and their corresponding session fingerprints 912 'B' 948, 'C' 950 and 'D' 952, are not associated with the EBP 638. Instead, as shown in FIG. 9, activity sessions 910 'B' 942, 'C' 944, and 'D' 946 are processed to generate activity session 910 'E' 954 and session fingerprints 912 'B' 948, 'C' 950 and 'D' 952 are processed to generate session fingerprint 912 'E' 956. In certain embodiments, activity session 'E' 954 and its corresponding session fingerprint 'E' 956 may be used to generate a new EBP element 980 'E' 958. In certain embodiments, EBP element 980 'E' 958 generated from activity session 910 'E' 954 and its corresponding session fingerprint 912 'E' 956 may be associated with an existing EBP 638.

Accordingly, session 910 'E' 1054 is associated with activity sessions 910 'B' 942, 'C' 944, and 'D' 946. Likewise, sessions 910 'B' 942, 'C' 944, and 'D' 946 are subsets of session 910 'E' 954. Consequently, while the intervals of time respectively associated with activity sessions 910 'B' 942, 'C' 944, and 'D' 946, and their corresponding session fingerprints 912 'B' 948, 'C' 950 and 'D' 952 may not be contiguous, they are associated as they are respectively used to generate session 910 'E' 954 and its corresponding session fingerprint 912 'E' 1056.

To provide an example, a user plans to attend a meeting scheduled for 10:00 AM at a secure facility owned by their organization to review a project plan with associates. However, the user wishes to arrive early to prepare for the meeting. Accordingly, they arrive at 9:00 AM and use their security badge to authenticate themselves and enter the facility. In this example, the enactment of observables 906 '3' 926 may correspond to authenticating themselves with their security badge and gaining access to the facility. As before, observables 906 '3' 926 may be used to generate a corresponding security related activity 908 '3' 934. In turn, the security related activity 908 '3' 934 may then be used to generate session 910 'B' 942, which is likewise used in turn to generate a corresponding session fingerprint 912 'B' 948.

The user then proceeds to a conference room reserved for the meeting scheduled for 10:00 AM and uses their time alone to prepare for the upcoming meeting. Then, at 10:00 AM, the scheduled meeting begins, followed by the user downloading the current version of the project plan, which is then discussed by the user and their associate for a half hour. At the end of the discussion, the user remains in the conference room and spends the next half hour making revisions to the project plan, after which it is uploaded to a datastore for access by others.

In this example, observables 906 '4' 928 may be associated with the user downloading and reviewing the project plan and observables 906 '5' 930 may be associated with the user making revisions to the project plan and then uploading the revised project plan to a datastore. Accordingly, behavior elements 906 '4' 928 and '5' 930 may be respectively used to generate security related activities 908 '4' 936 and '5' 938. In turn, the security related activities 908 '4' 936 and '5' 938 may then be used to generate session 910 'C' 944, which may likewise be used in turn to generate its corresponding session-based fingerprint 912 'C' 950.

To continue the example, the user may spend the next half hour discussing the revisions to the project plan with a co-worker. Thereafter, the user uses their security badge to exit the facility. In continuance of this example, observables 906 '6' 932 may be associated with the user using their security badge to leave the secure facility. Accordingly, observables 906 '6' 932 may be used to generate a corresponding security related activity 908 '6' 940, which in turn may be used to generate a corresponding session 910 'D' 946, which likewise may be used in turn to generate a corresponding session fingerprint 912 'D' 952.

In this example, the intervals of time 904 respectively associated with activity sessions 910 'B' 942, 'C' 944, and 'D' 946, and their corresponding session fingerprints 912 'B' 948, 'C' 950, and 'D' 952, are not contiguous. However they may be considered to be associated as their corresponding observables 906 '3' 926, '4' 928, '5' 930, and '6' 932, all have the common attribute of having been enacted within the secure facility. Furthermore, security related activities 908 '4' 936 and '5' 938 may be considered to be associated as their corresponding observables 906 have the common attribute of being associated with the project plan.

Accordingly, while the intervals of time 904 respectively associated with activity sessions 910 'B' 942, 'C' 944, and 'D' 946, and their corresponding session-based fingerprints 912 'B' 948, 'C' 950, and 'D' 952, may not be contiguous, they may be considered to be associated. Consequently, sessions 910 'B' 942, 'C' 944, and 'D' 946 may be considered to be a subset of session 910 'E' 954 and session-based fingerprints 912 'B' 948, 'C' 950, and 'D' 952 may be considered to be a subset of session-based fingerprint 912 'E' 956.

In certain embodiments, the interval of time 904 corresponding to a first activity session 910 may overlap an interval of time 904 corresponding to a second activity session 910. For example, observables 906 '7' 958 and '8' 960 may be respectively processed to generate security related activities 908 '7' 962 and '8' 964. In turn, the resulting security related activities 908 '7' 962 and '8' 964 are respectively processed to generate corresponding activity sessions 910 'F' 966 and 'G' 968. Sessions The resulting activity sessions 910 'F' 966 and 'G' 968 are then respectively processed to generate corresponding session-based fingerprints 912 'F' 970 and 'G' 972.

However, in this example activity sessions 910 'F' 966 and 'G' 968, and their corresponding session fingerprints 912 'F' 970 and 'G' 972, are not associated with the EBP 638. Instead, as shown in FIG. 9, activity sessions 910 'F' 966 and 'G' 968 are processed to generate activity session 910 'E' 954 and session fingerprints 912 'F' 970 and 'G' 972 are processed to generate session fingerprint 912 'H' 976. In certain embodiments, activity session 'H' 974 and its corresponding session fingerprint 'H' 976 may be used to generate a new EBP element 980 'H' 978. In certain embodiments, EBP element 980 'H' 978 generated from activity session 910 'E' 974 and its corresponding session fingerprint 912 'E' 976 may be associated with an existing EBP 638.

Accordingly, the time 904 interval associated with activity session 910 'F' 966 and its corresponding session fingerprint 912 'F' 970 overlaps with the time interval 904 associated with activity session 910 'G' 968 and its corresponding session fingerprint 912 'G' 972. As a result, activity sessions 910 'F' 966 and 'G' 968 are subsets of activity session 910 'H' 974. Consequently, while the intervals of time respectively associated with activity sessions 910 'F' 966 and 'G' 968, and their corresponding session fingerprints 912 'F' 970 and 'G' 972 may overlap, they are associated as they are respectively used to generate activity session 910 'H' 974 and its corresponding session fingerprint 912 'H' 976.

To provide an example, a user may decide to download various images for placement in an online publication. In this example, observables 906 '7' 958 may be associated with the user iteratively searching for, and downloading, the images they wish to use in the online publication. However, the user may not begin placing the images into the online publication until they have selected and downloaded the first few images they wish to use.

To continue the example, observables 906 '8' may be associated with the user placing the downloaded images in the online publication. Furthermore, the placement of the downloaded images into the online publication may begin a point in time 904 subsequent to when the user began to download the images. Moreover, the downloading of the images may end at a point in time 904 sooner than when the user completes the placement of the images in the online publication.

In continuance of the example, observables 906 '7' 958 and '8' 960 may be respectively processed to generate security related activities 908 '7' 962 and '8' 964, whose associated intervals of time 904 overlap one another. Accordingly, the intervals in time 904 associated with activity sessions 910 'F' 966 and 'G' 968 will likewise overlap one another as they are respectively generated from security related activities 908 '7' 962 and '8' 964.

Consequently, while the intervals of time 904 respectively associated with activity sessions 910 'F' 966 and 'G' 968, and their corresponding session fingerprints 912 'F' 970 and 'G' 972, may overlap, they may be considered to be associated as they both relate to the use of images for the online publication. Accordingly, activity sessions 910 'F' 1066 and 'G' 968 may be considered to be a subset of activity session 910 'H' 974 and session fingerprints 912 'F' 970 and 'G' 972 may be considered to be a subset of session fingerprint 912 'H' 976.

Figure 10:
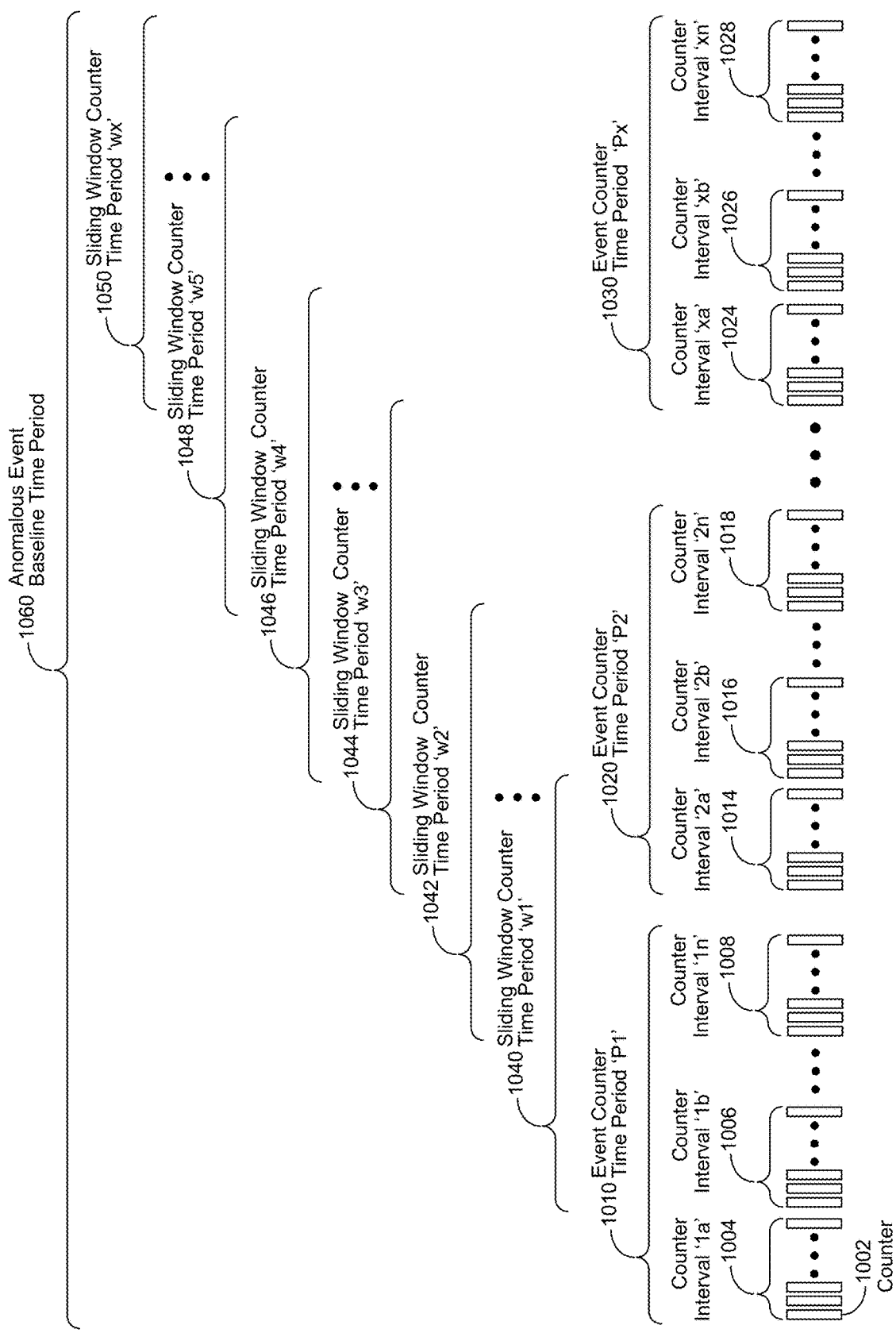
FIG. 10 is a simplified block diagram showing a plurality of event counter time periods used to detect an anomalous event.

FIG. 10 is a simplified block diagram showing a plurality of event counter time periods used in accordance with an embodiment of the invention to detect an anomalous event. As used herein, an event counter broadly refers to a numeric representation of the number of occurrences of a particular event, or class of endpoint events. Likewise, as used herein, an event counter time period broadly refers to a period of time during which an event counter counts, or otherwise tracks, the occurrence of a particular event, or class of events. As likewise used herein, an anomalous event broadly refers to any event whose occurrence may be out of the ordinary, unanticipated or otherwise unexpected.

In various embodiments, certain anomalous event detection operations, described in greater detail herein, may be performed during an anomalous event baseline time period 1060 to detect an anomalous event. As used herein, an anomalous event baseline time period 1060 broadly refers to a period of time during which anomalous event detection operations are performed. In these embodiments, the duration of the anomalous event baseline time period 1060 is a matter of design choice. As an example, the anomalous event baseline time period 1060 may be a sliding window implemented for a predetermined period of time to identify and omit false positives of anomalous behavior by an associated entity. In certain embodiments, the predetermined period of time is a matter of design choice. As an example, it may be one or more hours, one or more days, one or more weeks, one or more months, and so forth.

In certain embodiments, an anomalous event baseline time period 1060 may be associated with one or more event counter time periods. In certain embodiments, an event counter time period may be implemented to be a period of time that is less than, or equal to, an associated anomalous event baseline time period 1060. In certain embodiments, two or more event counter periods associated with a particular anomalous event baseline time period 1060 may be implemented to have the same duration of time (e.g., 24 hours, one week, and so forth).

In various embodiments, a certain sequence of event counter time periods may be selected for association with a particular anomalous event baseline time period 1060. In certain embodiments, the sequence of event counter time periods may be consecutive, or contiguous, or a combination thereof. In these embodiments, the event counter time periods selected to be associated with a particular anomalous event baseline time period, and the duration of their corresponding periods of time, is a matter of design choice.

In certain embodiments, an event counter time period (e.g. 'P1' 1010 and 'P2' 1020 through 'Px' 1030) may be implemented to be respectively associated with one or more event counter intervals. In certain embodiments, an event counter interval may be implemented to be an interval of time that is less than, or equal to, an associated event counter time period. In certain embodiments, two or more event counter intervals associated with a particular event counter time period may be implemented to have the same duration of time (e.g., one minute, one hour, one day, and so forth).

In various embodiments, a certain sequence of event counter intervals may be selected for association with a particular event counter time period. In certain embodiments, the sequence of event counter intervals may be consecutive, or contiguous, or a combination thereof. In these embodiments, the event counter intervals selected to be associated with a particular event counter time period, and the duration of their corresponding intervals of time, is a matter of design choice.

For example, as shown in FIG. 10, event counter time period 'P1' 1010 may be associated with event counter intervals '1a' 1004 and '1b' 1006 through '1n' 1008. Likewise, event counter time periods 'P2' 1020 through 'Px' 1030 may respectively be associated with event counter intervals '2a' 1014 and '2b' 1016 through '2n 1018, through intervals 'xa' 1024 and 'xb' 1026 through 'xn 1028. In this example, event counter time periods 'P1' 1010 and 'P2' 1020 through 'Px' 1030 may each have an associated time period of twenty four hours. Likewise, event counter intervals '1a' 1004 and '1b' 1006 through '1n' 1008, as well as intervals '2a' 1014 and '2b' 1016 through '2n 1018, through intervals 'xa' 1024 and 'xb' 1026 through 'xn 1028 may each have an associated time interval of one hour.

To continue the example, event counter intervals '1a' 1004, and '1b' 1006 through '1n' 1008, where 'n'=24, may correlate to hours one through twenty four of a corresponding twenty four hour time period. Likewise, event counter intervals '2a' 1014, and '2b' 1016 through '2n' 1018, through 'xa' 1024, and 'sb' 1026 through 'xn' 1028, where 'n'=24, may respectively correlate to hours one through twenty four of corresponding twenty four hour time periods. Accordingly, the time period associated with event counter time periods 'P1' 1010, and 'P' 1020 through 'Px' 1030 would be 24 hours, or one day.

In certain embodiments, event counter time periods may be implemented as a sequence of event counter time periods.

In certain embodiments, the sequence of event counter time periods may be consecutive, or contiguous, or a combination thereof. As an example, event counter time period 'P1' 1010 may be associated with a Monday of a particular week. Likewise counter time periods 'P2' 1020 through 'Px' 1030, where 'x'=7, may respectively associated with Tuesday through Sunday of the same week.

In certain embodiments, a counter interval may be implemented to be associated with one or more counter increments 1002 of time. As used herein, an event counter increment 1002 of time broadly refers to an increment of time that is less than, or equal to, an associated event counter interval. In certain embodiments, two or more event counter increments 1002 associated with a particular event counter interval may be implemented to have the same duration of time. As an example, an event counter increment 1002 of time may be one or more milliseconds, one or more seconds, one or more minutes, one or more hours, and so forth.

In various embodiments, a certain sequence of counter increments 1002 of time may be selected for association with a particular event counter interval. For example, as shown in FIG. 10, a first set of counter increments 1002 of time may be associated with event counter interval '1a' 1004, a second set with interval '1b' 1006, and so forth through interval '1n' 1008. In these embodiments, the sequence of counter increments 1002 of time selected to be associated with a particular event counter time interval, and the duration of their corresponding increments of time, is a matter of design choice. In certain embodiments, the sequence of counter increments 1002 of time may be consecutive, or contiguous, or a combination thereof.

As an example, sixty consecutive counter increments 1002 of time, each with a duration of one minute, may be selected to be associated with counter interval '1a' 1004. Accordingly, the duration of event counter interval '1a' 1004 would be sixty minutes, or one hour. In this example, the same number of consecutive counter increments 1002 of time, each with the same duration of time, may be selected for counter intervals '1b' 1006 through '1n' 1008. Likewise the same number of consecutive counter increments 1002 of time, each with the same duration of time, may be selected for counter intervals '2a' 1014, and '2b' 1016 through '2n' 1018, through 'xa' 1024, and 'xb' 1026 through 'xn' 1028. Accordingly counter intervals '1a' 1004, and '1b' 1006 through '1n' 1008, '2a' 1014, and '2b' 1016 through '2n' 1018, through 'xa' 1024, and 'xb' 1026 through 'xn' 1028, would all have a duration of 60 minutes, or one hour.

Accordingly, in this example the anomalous event baseline time period 1060 may be implemented to be associated with a particular week corresponding to counter time periods 'P1' 1010, and 'P2' 1020 through 'Px' 1030. Likewise, the occurrence of individual events, or classes of events, respectively associated with event counter time periods 'P1' 1010, and 'P2' 1020 through 'Px' 1030 can be counted, or otherwise tracked, over the week corresponding to the anomalous event baseline time period 1060. Furthermore, the occurrence of a particular event, or class of events, can be counted, or otherwise tracked by its associated event counter time period, event counter interval, and event counter increment, or a combination thereof.

Certain embodiments of the invention reflect an appreciation that an event may span two or more event counter time periods. As an example, the enactment of an event may be initiated at the end of one event counter time period (e.g., 11:58 PM) and conclude at the beginning of a second (e.g., 12:02 AM). Certain embodiments of the invention likewise reflect an appreciation that the occurrence of such an event may be anomalous and its detection may be challenging due to it spanning two or more event counter time periods.

Accordingly, in certain embodiments an event counter may be implemented as a sliding window counter time period. As used herein, a sliding window counter time period broadly refers to a period of time during which an event counter counts, or otherwise tracks, a particular event, or class of events, that occur in an event counter interval associated with one of two or more discrete event counter time periods. In certain embodiments, a series of sliding window counter time periods may be implemented to incrementally span a plurality of event counter intervals respectively associated with two or more event counter time periods. In these embodiments, the event counter intervals selected to be associated with a particular sliding window counter time period is a matter of design choice.

For example, as shown in FIG. 10, sliding window counter time period 'w1' 1040 has been implemented to span event counter intervals '1b' 1006 through '2a' 1014. As likewise shown in FIG. 10, sliding window counter time period 'w2' 1042 has been implemented to span event counter intervals prior to, and including, counter intervals '1n' 1008 and '2n' 1018. Likewise, as shown in FIG. 10, sliding window counter time period 'w3' 1044 has been implemented to iteratively span event counter intervals '2a' 1014, and so forth, up to counter interval 'xa' 1024.

Likewise, sliding window counter time period 'w4' 1046 has been implemented to iteratively span event counter intervals '2b' 1016, and so forth, up to event counter interval 'xb' 1026. Sliding window counter time period 'w5' 1048 has likewise been implemented to span event counter intervals '2n' 1018, and so forth, up to event counter interval 'xn' 1028. Likewise, sliding window counter time period 'w6' 1050 has been implemented to span event counter intervals 'xa' 1024, and so forth, through event counter interval 'xn' 1028.

In certain embodiments, numeric and other data related to the occurrence of individual events, or classes of events, during a particular anomalous event baseline time period 1060 may be used in the performance of an anomalous event detection operation. As used herein, an anomalous detection operation broadly refers to any operation performed, as described in greater detail herein, to detect an anomalous event. In various embodiments, certain information corresponding to one or more entities associated with a particular event, or class of events, may likewise be used in the performance of an anomalous event detection operation. As an example, the amount of data transferred between two or more entities during the occurrence of a particular event, or class of events, may be used to detect the occurrence of an anomalous event.

In certain embodiments, as described in greater detail herein, one or more event counters may be implemented on one or more devices, within an anomalous event detection system, or a combination thereof. In certain embodiments, event data collected by an event counter may be persisted in a repository of event data. In certain embodiments, as likewise described in greater detail herein, the event data collected by a particular event counter may be persistently stored in a repository of event data. In certain embodiments, the repository of event data may be centralized or distributed. In these embodiments, the method by which the event data is collected, the format in which it is stored, the location where it is stored, and the duration of time it is persisted is a matter of design choice.

Certain embodiments of the invention reflect an appreciation that event data collected by an event counter and temporarily stored in volatile memory, such as an endpoint device's RAM memory, may be lost if the endpoint device is rebooted. Certain embodiments of the invention likewise reflect an appreciation that losing such event data as a result of an endpoint device reboot, regardless of whether the reboot was intentional or not, may mask anomalous behavior enacted by an associated entity. Accordingly, in certain embodiments event data collected by a particular event counter may be stored to non-volatile memory, such as a hard drive or a memory card, as it is collected.

In various embodiments the notation of an event counter may be implemented to include certain properties or attributes associated with an event. In certain embodiments, such event properties or attributes may be represented in a JavaScript Object Notation (JSON) document, such as:

```
{
    "message_type": "counter",
    "counter_type": "raw_activites",
    "user_principal_name": or other form of user identification
    like user_email_address
    "full_computer_name": "LT-12345.websense.com",
    "data_channel": "email",
    "activity": "email_sent",
    "destination": "external_recipients", in some cases the
    destination is omitted
    "total_number_of_events": 12,
    "total_size_of_data_kb": 3254
    "period_type": "hour",
    "hour_in_the_day": 21,
    "day_in_the_month": 3,
    "month_in_the_year": 12,
    "day_in_the_year": 337,
    "period_start_time": "2019-12-03 21:00:00",
    "period_end_time": "2019-12-03 22:00:00",
    "reporting_product": "endpoint_protection_for_windows",
    "period_end_time": "20.05"
}
```

In certain embodiments, notation of an event counter may be implemented in an abbreviated, or abstracted, format, such as:

DD.hh data_channel/activity/destination <occurrences> <size_kb>

As an example, notation of an event counter implemented to track emails sent to external recipients may be abbreviated, or abstracted as follows:

03.21, email/email_sent/external_recipients, 12, 3254

As another example, notation of event counters implemented to track more than one class of events associated with an endpoint device's local hard drive may be abbreviated, or abstracted as follows:

03.21, local_hard_drive/data_copied_from_removable_storage, 13, 4342

03.21, local_hard_drive/data_copied_from_network_share 612, 643254

In this example, a data_copied_from_removable_storage event notation may indicate a potential security-related activity, described in greater detail herein, such as possible infection by virus files. Likewise, the data_copied_from_network_share event notation may indicate a data stockpiling security-related activity.

As yet another example, notation of event counters implemented to track events associated with transferring data to certain cloud or web applications may be abbreviated, or abstracted, as follows:

03.21 web/data_transmission/mail.google.com 3, 5242
03.21 web/data_transmission/drive.google.co.il 12, 3254
03.21 web/data_transmission/dropbox.com 7, 1274
03.21 web/data_transmission/web.whatsapp.com 2, 345

Various embodiments of the invention reflect an appreciation that implementing an event counter for tracking web-oriented events may involve certain considerations that may not be applicable for certain other event counters or associated data channels. As used herein, a data channel broadly refers to a method of transmitting or receiving data to or from an endpoint device. Examples of data channels include networks, network shares, an endpoint device's local storage, and removable storage. In certain embodiments, a data channel may refer to a destination, rather than a method of transmitting or receiving data.

As an example, a web data channel may have hundreds of destinations per user, and thousands for an organization. In this example, individual web site event counters are not necessary for anomalous event detection as such anomalies are typically based upon categories, or classes, of URLs. Accordingly, web-oriented event counters may be implemented in various embodiments to track endpoint device interactions with certain URL categories, or classes, such as gambling sites, social networks, private email services, shopping sites, private cloud repositories, business cloud repositories, job search sites, and so forth.

Various embodiments of the invention reflect an appreciation that there are certain situations, such as providing support for shadow information technology (IT) use cases, or investigating a particular user, that may require tracking interactions with individual web sites or URLs. Accordingly, event counters for individual web sites or URLs may be implemented in various embodiments, in addition to event counters tracking a particular endpoint device's interaction with certain classes of web sites or URLs.

In various embodiments, the event data collected by an event counter may be stored on a recurring (e.g., every hour), or near-real-time basis. In certain of these embodiments, the collected event data may be stored in the following event counter format:
    data_channel/activity/destination
Examples of the implementation of such an event counter format include:
    removable_storage/copy_file_to_removable_storage
    local_hard_drive/copy_file_from_removable_storage_to_local_drive
    local_hard_drive/copy_file_from_network_share_to_local_drive
    printing/all_activities/all_destinations
    printing/printing_file/local_printer
    printing/printing_file/network_printer
    printing/printing_file/file_printers
    printing/printing_data/network_printer
    printing/printing_data/local_printer
    printing/printing_data/file_printer
    web/data_upload/all_destinations
    web/data_upload/mail.google.com
    web/data_upload/drive.google.co.il
    web/data_upload/dropbox.com
    web/data_upload/web.whatsapp.com
    web/data_uplod/category_shopping_web_sites
    network_communication/outgoing_traffic/192.168.0.11
    network_communication/incoming_traffic/192.168.0.11

In certain embodiments, individual event counters may be correlated to an entity hierarchy. As an example, an event counter may be implemented to track the number of files copied to removable storage on a daily basis for all users who are direct reports of Vitaly, an IT manager, and in turn, for all users who are direct reports of Asi, an IT director, and likewise in turn for all users who are direct reports of Ofir, a VP of IT. In various embodiments, the sums of certain event counters associated with decedents within an entity hierarchy. For example, the daily sums of event counters associated with tracking the number of files copied to removable media per day may be aggregated for Asi, where Asi is an individual user with eight direct reports. In this example, the nine event counters respectively associated with Asi and his eight direct reports are aggregated.

In certain embodiments, one or more event counters may be associated with a particular class of users. In various embodiments, such a class of users may belong to the same organizational hierarchy. In certain of these embodiments, the class of users may have the same job title, organizational responsibilities, or exhibit substantively similar entity behaviors, described in greater detail herein, or a combination thereof. In various embodiments, such a class of users may be individual users, or belong to different organizational hierarchies, or a combination thereof. In certain of these embodiments, such a class of users may be crowdsourced.

In certain embodiments, data associated with one or more event counters respectively associated with individual members of a particular class of users may be averaged to generate a representative event counter. In certain embodiments, one or more such representative event counters may be implemented to establish an initial behavior model. In certain embodiments, the initial behavior model may be used to detect anomalous behavior associated with a new member of a particular class of user. In certain embodiments, such an initial behavior model may be implemented to detect anomalous behavior of a user without the necessity of observing the behavior of a new member of a particular class of users, or the use of a new endpoint device by a particular member of such a class of users, during a learning period, such as twenty to thirty days. Certain embodiments of the invention reflect an appreciation that detection of such "day zero" anomalous behavior may prove advantageous when no a priori knowledge of a particular user's behavior is available.

As an example, a software engineering group may have five software engineers, all of which have similar job responsibilities. In this example, each of the software engineers may have one or more associated event counters. To continue the example, data associated with certain event counters that are of the same type, or class, may be averaged to generate a representative event counter. In certain embodiments, one or more such representative event counters may be combined to generate an initial behavior model. To continue the example further, the initial behavior model may then be associated with a new software engineer when they join the group. Accordingly, certain behaviors associated with the new software engineer may be considered anomalous if it is not consistent with the initial behavior model. Skilled practitioners of the art will recognize that many such embodiments and examples are possible. Accordingly, the foregoing is not intended to limit the spirit, scope, or intent of the invention.

Figure 11:
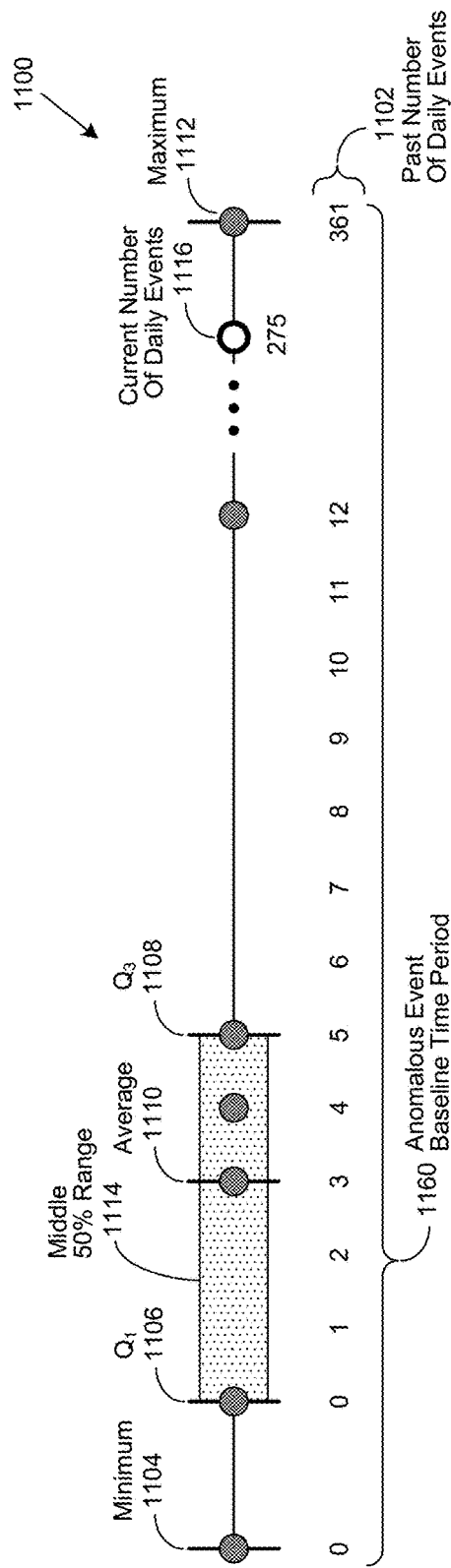
FIG. 11 shows a box and whisker plot used to detect an anomalous event.

FIG. 11 shows a box and whisker plot implemented in accordance with an embodiment of the invention to detect an anomalous event. Skilled practitioners of the art will be familiar with a box and whisker plot, also referred to as a box plot, which in the field of statistics is an approach for displaying a five-number statistical summary of an associated set of data. As typically displayed, the five-number statistical summary includes the dataset's minimum, its first quartile, its median, its third quartile, and its maximum. In certain embodiments, a set of event data collected during a particular time period by an event counter, as described in greater detail herein, may be processed to display an associated five-number statistical summary. In certain embodiments, the resulting five-number statistical summary may be used to detect an anomalous event, such as a suspicious number of files, or a suspicious total size of files, copied to removable storage on a daily basis.

For example, as shown in FIG. 11, an event counter may be implemented to count, or otherwise track, the number of files, and their aggregate size, copied from a particular endpoint device to removable storage each day during a particular ten day time period. In this example, each day in the ten day time period may be considered an individual event counter time period and the ten day time period may likewise be considered an anomalous event baseline time period 1160, as described in the descriptive text associated with FIG. 10. To continue the example, the number of files copied to removable storage each day during the anomalous event baseline time period may respectively be '3', '4', '0', '0', '5', '3', '12', '361', '3', and '0' for days one through ten, with a corresponding daily total file size of '4,007', '200', '0', '0', '125', '3,456', '541', '5,698', '20', and '0'.

To continue the example further, a numeric representation of the normal, or typical, number of files copied from the endpoint device to removable storage on a daily basis is determined by first removing outlier values in the set of event data. In this example, the first step in doing so is to reorder the number of files copied to removable storage from lowest to highest, as follows:

0 0 3 3 3 4 5 12 361

Once the event data set has been reordered, numbers whose numeric value do not fall in the 25% to 75% range of the data set, also referred to as the middle 50% range, are disregarded. Assuming 2n, or 2n+1, numbers in the reordered dataset of event data, then:

$Q_1$ represents the 25% point, which is the median of the n smallest numbers, and
$Q_3$ represents the 75% point, which is the median of the n largest numbers Accordingly,
Q1, the median of then smallest numbers (0 0 0 3 3)=0, and
Q3, the median of then largest numbers (3 4 5 12 361)=5
likewise,
the middle 50% range (0 0 033345 12 361) is 0 3 3 3 4 5:

Next, the average of the middle 50% range of the reordered data set of event data is calculated as follows:
the average=(0+3+3+3+4+5)/6=18/6=3,
and by using the formula known to those of skill in the art for determining a population standard deviation:
the standard deviation=1.67

Certain embodiments of the invention reflect an appreciation that the standard deviation identifies the dispersion, or spread, of the observations around the average of the middle 50% range of the reordered data set of event data. Accordingly, it can provide a reasonable indication of how well the average represents the normal, or typical, number of files copied to removable storage on a daily basis.

Referring now to the box and whiskers plot 1100 shown in FIG. 11, the numeric value of the minimum 1104 number of daily events 1102 during the anomalous event baseline time period 1160 is 0. Likewise, the maximum 1112 number of daily events 1102 during the same anomalous event baseline time period 1160 is 361. As likewise shown in FIG. 11, the middle 50% range 1114 of the reordered data set is defined by Q1 1106, which has a numeric value of 0, and Q3, which has a numeric value of 5. Accordingly, the average 1110 of the middle 50% range 1114 has a numeric value of 3.

In this example, the foregoing may be used as a baseline set of numbers to statistically detect anomalous events in subsequent event counter time periods, such as the current number of daily events 1116 shown in FIG. 11. In certain embodiments, the number of deviations of the number of events counted, or otherwise tracked, during a particular event counter period from the average of the middle 50% range 1114 may be used to detect an anomalous event.

To continue the preceding example, 275 files may have been copied to removable media in the current 24 hour event counter time period 1116. Accordingly:
number of files copied=275
middle 50% range average=3
standard deviation=1.67
files copied in current event counter time period=275
number of deviations=(275−3)/1.67=162

Accordingly, 162 deviations from the mean likely indicate the occurrence of an anomalous event in the current 24 hour event counter time period 1116. Certain embodiments of the invention reflect an appreciation that the number of such deviations from the average of the middle 50% range indicating the occurrence of an anomalous event is a matter of design choice. As an example, an observation of 15 files copied to removable storage during a particular 24 hour event counter time period, which is 7.2 deviations from the average (15−3)/1.67=7.2 may simply be considered a fluctuation in entity behavior.

Figure 12:
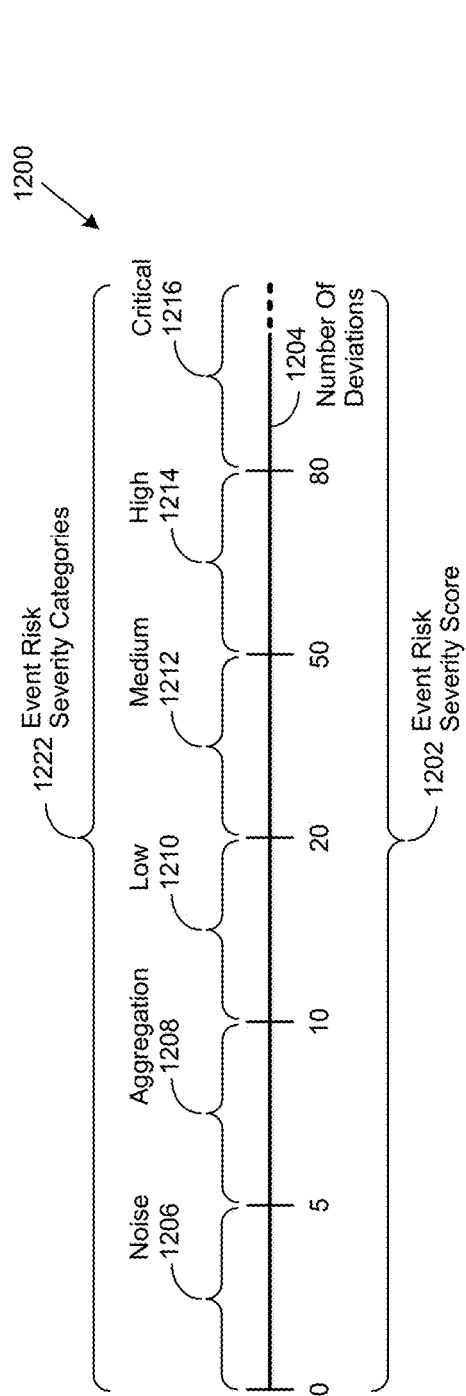
FIG. 12 shows an event risk severity scale used in the performance of security risk scoring operations.

FIG. 12 shows an event risk severity scale used in the performance of security risk scoring operations implemented in accordance with an embodiment of the invention. As used herein, a security risk scoring operation broadly refers to any operation associated with the generation of a risk score associated with the occurrence of a particular anomalous event. In various embodiments, as described in greater detail herein, the risk score may be implemented as a risk severity score. In certain of these embodiments the risk severity score may be used to provide a quantitative indicator of the risk corresponding to the occurrence of a particular anomalous event at a particular point in time. In certain of these embodiments, the risk severity score may be used to provide a quantitative indicator of the security risk associated with a particular entity at a particular point in time.

Certain embodiments of the invention reflect an appreciation that it is likely that different organizations will have correspondingly different tolerances for risk. A risk level that is acceptable for one organization may not be acceptable for another, and vice-versa. Various embodiments of the invention likewise reflect an appreciation that the number of deviations of a particular event from the average of the middle 50% range of a particular anomalous event baseline time period may prove helpful in detecting the occurrence of an anomalous event. Accordingly, in certain embodiments, an event risk severity scale 1200 may be implemented to use the number of such deviations to indicate the risk severity of a particular event.

For example, as shown in FIG. 12, the event risk severity score 1202 of a particular event may be graphically correlated to the number of its deviations from the average of the middle 50% range of an associated anomalous event baseline time period. To continue the example, as likewise shown in FIG. 12, event risk severity categories 1222 of noise 1206, aggregation 1208, low 1210, medium 1212, high 1214, and critical 1216 may respectively correspond to 5, 10, 20, 50, and 80 deviations 1204. In these embodiments, the nomenclature used to describe the event risk severity score 1202 of a particular event risk severity category 1222, the number of such categories 1222, and the number of deviations 1204 associated with each, is a matter of design choice.

FIGS. 13a through 13d show a graphical representation of a plurality of reduction functions implemented in accordance with an embodiment of the invention to decrease the value of an initial event risk severity score over an associated longevity time interval. In various embodiments, an anomalous event detection system, as described in greater detail herein, may be implemented to perform one or more anomalous event detection operations to detect an anomalous event associated with a particular entity. In certain of these embodiments, the anomalous event detection system may likewise be implemented to generate an anomalous event alert as a result of an anomalous event being detected. In certain embodiments, the anomalous event alert may be implemented as an indicator of behavior (IoB) enacted by an associated entity.

In certain embodiments, a risk scoring system, described in greater detail herein, may be implemented to assign an initial event risk severity score to an event that has been detected as being anomalous. As used herein, an initial event risk severity score broadly refers to an event risk severity score 1202, described in greater detail herein, assigned to an associated anomalous event at the time it is detected. For example, as shown in FIGS. 13a-d, the value of the initial event risk severity score may be set at '80' 1308, '40' 1318, '60' 1328, or '70' 1338 according to the event risk severity score corresponding to a particular anomalous event. In certain embodiments, the assignment of an initial event risk severity score to an anomalous event may be performed manually, automatically, or semi-automatically. In certain embodiments, the value of the initial event risk severity score may be determined manually, according to a rule, or a combination of the two.

In certain embodiments, a reduction function may be applied to the initial event risk severity score 1308 associated with a particular anomalous event to persist, or decrease, or a combination thereof, its value during an associated longevity time interval 1304, described in greater detail herein. In certain embodiments, as shown in FIGS. 13a-d, the reduction function may be implemented as a flat 1306, gradual 1316, flat then gradual 1326, or step 1336 reduction for a corresponding longevity time interval 1304. As used herein, a flat 1306 reduction broadly refers to a reduction function that maintains an initial event risk severity score 1308 for a predetermined period of time, after which it is reduced to a value of '0'. As likewise used herein, a gradual 1316 reduction function broadly refers to a reduction function that incrementally reduces an initial event risk severity score 1318 over a predetermined period of time to a value of '0'.

Likewise, as used herein, a flat then gradual 1326 reduction broadly refers to a reduction function that maintains an initial event risk severity score 1328 for a first predetermined period of time, after which it is incrementally reduced over a second predetermined period of time to a value of '0'. A step reduction 1336 function, as likewise used herein, broadly refers to a reduction function that maintains an initial event risk severity score 1338 for a first interval of time, after which it is lowered to a reduced event risk severity score 1340 for a second interval of time, after which it is reduced to a value of '0'. In certain embodiments, the step reduction 1336 function may be implemented to have a plurality of event risk severity score 1202 reductions over a corresponding number of time intervals. Those of skill in the art will recognize that many such reduction functions are possible. Accordingly, the foregoing is not intended to limit the spirit, scope, or intent of the invention.

As used herein, a longevity time interval 1304 broadly refers to an interval of time (e.g., minutes, hours, days, and so forth) during which a particular reduction function is applied to an initial event risk severity score 1202. In certain embodiments, the longevity time interval 1304 may be implemented to have a starting point in time (e.g., Monday, May 18, 2020, 8:03 AM, CST) and an ending point in time (e.g., five days later). In these embodiments, the interval of time selected for a particular longevity time interval 1304, and its associated measurement increments, is a matter of design choice. In certain embodiments, the initial event risk severity score value may be used in combination with a corresponding reduction function to determine a current event risk severity score 1202 for an associated entity at a particular point in time within an associated longevity time interval 1304. As used herein, a current event risk severity score 1202 broadly refers to the value of an event risk security score 1202 at a particular point in time within an associated longevity time interval 1304.

For example, as shown in FIG. 13a, a flat 1306 reduction may be applied to an initial event risk severity score 1308 of '80' for a longevity time interval 1304 of five days. In this example, the initial event risk severity score 1308 of '80' is persisted as the current event risk severity score 1202 for the duration of the longevity time interval 1304, after which it is reduced to '0'. As another example, as shown in FIG. 13b, a gradual 1316 reduction may be applied to an initial event risk severity score 1318 of '40' for a longevity time interval 1304 of thirty days. In this example, the initial event risk severity score 1318 of '40' is incrementally decreased as the current event risk severity score 1202 for the duration of the longevity time interval 1304 until it is reduced to a value of '0'.

As yet another example, as shown in FIG. 13c, a flat and then gradual 1326 reduction may be applied to an initial event risk severity score 1328 of '60' for a longevity time interval 1304 of eight days. In this example, the initial event risk severity score 1328 of '60' is persisted as the current event risk severity score 1202 for a first interval of time (e.g., six days). Thereafter, the current event risk severity score 1202 is incrementally decreased as the current event risk severity score 1202 for the remainder of the longevity time interval 1304 (e.g., two days) until it is reduced to a value of '0'. As yet still another example, as shown in FIG. 13d, step 1336 reduction may be applied to an initial event risk severity score 1338 of '70' for a longevity time interval 1304 of twenty five days. In this example, the initial event risk severity score 1338 of '70' is persisted as the current event risk severity score 1202 for a first interval of time (e.g., eight days). Thereafter, it is lowered to a reduced event risk severity score 1340 (e.g., thirty five) as the current event risk severity score 1202 for the remainder of the longevity time interval 1304 (e.g., seventeen days), after which it is reduced to a value of '0'.

Figure 14B:
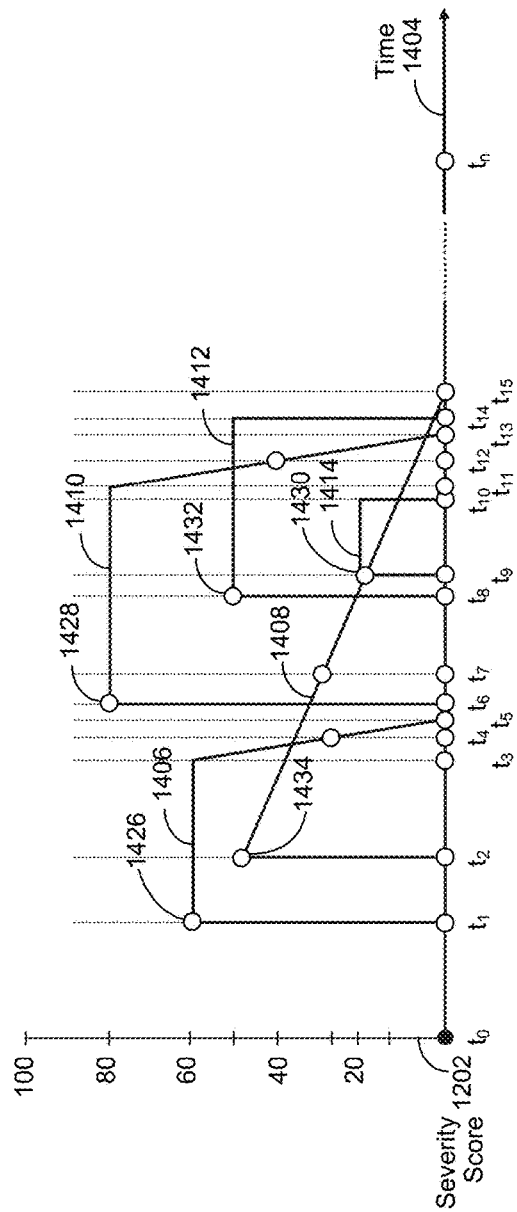
Figure 14C:
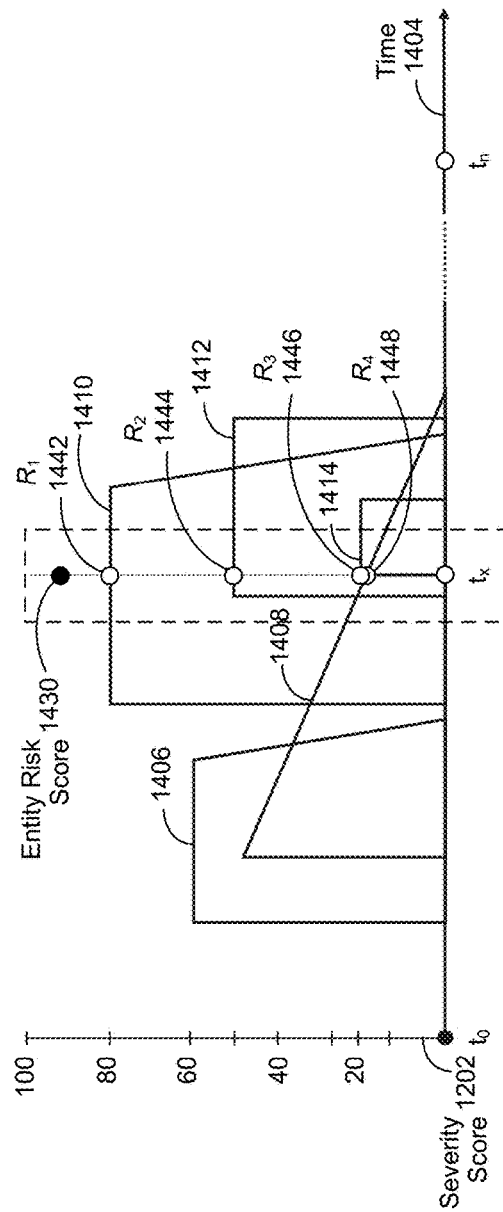

FIGS. 14a through 14c show the use of reduction functions implemented in accordance with an embodiment of the invention to generate an entity risk severity score from associated event risk severity scores at a certain point in time. In various embodiments, an anomalous event detection system, as described in greater detail herein, may be implemented to perform one or more anomalous detection operations to detect an anomalous event associated with a particular entity. In various embodiments, a plurality of such anomalous events associated with the entity may be detected over a certain interval of time 1404. In certain embodiments, as likewise described in greater detail herein, a reduction function may be applied to each of these anomalous events as they are detected over time 1404. In these embodiments, the reduction function selected to be applied to particular anomalous event as it is detected is a matter of design choice.

In certain embodiments, the longevity time interval of a reduction function associated with one anomalous event may be discrete from the longevity time interval of a reduction function associated with another anomalous event. In certain embodiments, the longevity time interval of a reduction function associated with one anomalous event may overlap the longevity time interval of a reduction function associated with another anomalous event. In various embodiments, the longevity time interval of a reduction function associated with one anomalous event may span the longevity time interval of two or more reduction functions associated with other anomalous events. In certain of these embodiments, the spanning of two or more longevity time intervals may include individual longevity time intervals being spanned completely, partially, or a combination thereof. In certain embodiments, the longevity time interval of a reduction function associated with one anomalous event may encompass the longevity time interval of a reduction function associated with another anomalous event.

For example, as shown in FIG. 14a, the reduction function associated with anomalous event 1406 is discrete from the reduction function associated with anomalous event 1410. As another example, the reduction function associated with anomalous event 1410 overlaps the reduction function associated with anomalous event 1412. As yet another example, the reduction function associated with anomalous event 1408 spans the reduction functions associated with anomalous events 1406, 1410, 1412, and 1414. In this example, the reduction function associated with anomalous event 1408 completely spans the reduction functions associated with anomalous events 1410, 1412, and 1414, but only partially spans the reduction function associated with anomalous event 1406. As yet another example, the reduction functions associated with anomalous events 1410 and 1410 both encompass the reduction functions associated with anomalous event 1414. Those of skill in the art will recognize that many such embodiments and examples are possible. Accordingly, the foregoing is not intended to limit the spirit, scope, or intent of the invention.

In various embodiments, as described in greater detail herein, a reduction function may be applied to the initial event risk severity score 1202 of an associated anomalous event at the time it is detected. In certain embodiments, as likewise described in greater detail herein, the reduction function may be implemented to determine the current event risk severity score 1202 of an associated anomalous event at a particular point in time 1404 within its corresponding longevity time interval. In certain embodiments, the initial event risk severity score 1202 may be implemented as the current event risk severity score 1202 for a portion, or the entirety, of the longevity time interval corresponding to a particular reduction function.

For example, as shown in FIG. 14b, an initial event risk severity score 1426 of '60' may be assigned to anomalous event 1406 at point in time 1404 $t_1$. In this example, the initial event risk severity score 1426 of '60' assigned at point in time 1404 $t_1$ is used as the current event risk severity score 1202 until point in time 1404 $t_3$. To continue the example, the reduction function associated with anomalous event 1406 then begins to gradually reduce the current risk severity score 1202 from '60' at point in time 1404 $t_3$ to '32' at point in time 1404 $t_4$, and eventually to '0' at point in time 1404 $t_5$.

As another example, an initial event risk severity score 1428 of '80' may be assigned to anomalous event 1410 at point in time 1404 $t_6$. In this example, the initial event risk severity score 1428 of '80' assigned at point in time 1404 $t_6$, is used as the current event risk severity score 1202 until point in time 1404 $t_{11}$. To continue the example, the reduction function associated with anomalous event 1410 then begins to gradually reduce the current risk severity score 1202 from '80' point in time 1404 $t_{11}$ to '40' at point in time 1404 $t_{12}$, and eventually to '0' at point in time 1404 $t_{13}$. As yet another example, an initial event risk severity score 1432 of '50' may be assigned to anomalous event 1412 at point in time 1404 $t_8$. In this example, the initial event risk severity score 1432 of '50' assigned at point in time 1404 $t_8$ is continued to be used as the current event risk severity score 1202 until point in time 1404 $t_{14}$, at which time it is reduced to '0'.

Likewise, an initial event risk severity score 1430 of '19' may be assigned to anomalous event 1414 point in time 1404 $t_9$, at which time it is continued to be used as the current event risk severity score 1202 until point in time 1404 $t_{10}$, at which time it is reduced to '0'. As yet still another example, an initial event risk severity score 1434 of '48' may be assigned to anomalous event 1408 at point in time 1404 $t_2$. In this example, the initial event risk severity score 1434 of '48' is gradually reduced by the reduction function associated with anomalous event 1410 until the current risk severity score 1202 reaches '32' at point in time 1404 $t_7$, and then '0' at point in time 1404 $t_{15}$.

In certain embodiments, one or more current event risk severity scores corresponding to the same entity may be used to generate an associated entity risk severity score 1430 for a particular point in time 1404. As used herein, an entity risk severity score 1430 broadly refers to a quantitative indicator of the collective risk corresponding to one or more anomalous events associated with a particular entity at a particular interval in time 1404. As likewise used herein, collective risk broadly refers to the degree of risk represented by all anomalous events associated with a particular entity at a particular point in time 1404.

For example, as shown in FIG. 14c, for point in time 1404 $t_x$, the current event risk severity score 1202 of anomalous events 1410, 1412, 1414, and 1408 are respectively represented by $R_1$ 1442, $R_2$ 1444, $R_3$ 1446, and $R_4$ 1448. Accordingly, in certain embodiments, the respective values of $R_1$ 1442, $R_2$ 1444, $R_3$ 1446, and $R_4$ 1448 may be used as follows to determine an entity risk severity score 1430 for a particular entity at point in time 1404 $t_x$:

$$R_1 = EventRiskSeverityScore_{Event1}$$

$$R_2 = R_1 + \left[\left\{\frac{(100 - R_1)}{100}\right\} * EventRiskSeverityScore_{Event2}\right]$$

$$R_3 = R_2 + \left[\left\{\frac{(100 - R_2)}{100}\right\} * EventRiskSeverityScore_{Event3}\right]$$

$$R_4 = R_3 + \left[\left\{\frac{(100 - R_3)}{100}\right\} * EventRiskSeverityScore_{Event4}\right]$$

$$R_n = R_{n1} + \left[\left\{\frac{(100 - R_{n-1})}{100}\right\} * EventRiskSeverityScore_{Event(n)}\right]$$

Accordingly, the value of the entity risk severity score 1430 shown in FIG. 14c may be calculated as follows:

$$R_1 = 80$$
$$R_2 = 80 + \left[\left\{\frac{(100-80)}{100}\right\} * 50\right] = 90$$
$$R_3 = 90 + \left[\left\{\frac{(100-90)}{100}\right\} * 20\right] = 92$$
$$R_4 = 92 + \left[\left\{\frac{(100-92)}{100}\right\} * 18\right] = 93.44$$

In certain embodiments the entity risk severity score may be calculated as follows:

EntityRiskScore=Round(x)

where x is the number of anomalous events used to calculate the entity risk severity score. Accordingly, in this example, the entity risk severity score is calculated as:

EntityRiskScore=Round($R_4$)=Round(93.44)=93

Certain embodiments of the invention reflect an appreciation that the results of the foregoing approach returns the same entity risk severity score 1430 regardless of the order in which the event risk severity scores are used. In certain embodiments, the entity risk severity score 1430 may be calculated at predetermined intervals (e.g., every minute, hour, day, etc.) within a interval of time 1404. In certain embodiments, the interval of time the entity risk severity score 1430 is calculated may be reduced or increased according to the current value of the entity risk severity score 1430.

As an example, the entity risk severity score 1430 may have historically been calculated once a day for three months, during which time it never exceeded a value of '20'. In this example, the entity risk severity score 1430 may be calculated to have a value of '50' at some point in time thereafter, at which time the frequency of calculation is decreased to every 15 minutes. To continue the example, the entity risk severity score 1430 may be calculated to have a value of '70' at some additional point in time thereafter, at which time the frequency of calculation is decreased to every five minutes. Accordingly, the frequency of how often the entity risk severity score 1430 is calculated, and under which circumstances, is a matter of design choice.

FIGS. 15a through 15f show a simplified block diagram of distributed security risk scoring operations performed in a distributed security risk scoring environment implemented in accordance with an embodiment of the invention. In various embodiments, two or more components of a distributed security risk scoring environment, described in greater detail herein, may be implemented to perform certain distributed risk scoring operations in combination with one another. As used herein, a distributed risk scoring operation broadly refers to a risk scoring operation, described in greater detail herein, performed by a component of a distributed risk scoring environment. As used herein, a component of a distributed security risk scoring environment broadly refers to any device configured to perform a distributed security risk scoring operation and then communicate its results to another component of the distributed security risk scoring environment.

Examples of components of a distributed security risk scoring environment include an protected endpoint 1504, an edge device 202, a security analytics system 118, and various third party systems 1510, all of which are described in greater detail herein. As likewise used herein, a distributed security risk scoring environment broadly refers to a group of distributed security risk scoring environment components configured to communicate the results of certain distributed security risk scoring operations amongst themselves. In certain embodiments, the results of a distributed security risk scoring operation may be communicated via a network 1502, described in greater detail herein.

For example, as shown in FIG. 15a, protected endpoint 1504 may be configured to perform one or more distributed security risk scoring operations to generate event risk severity scores 1512 of '30', '5', and '10', respectively corresponding to anomalous events '1', '2', and '3'. These event risk severity scores are processed, as follows, to generate an associated entity risk severity score 1514 of '40':

$$R_1 = 30$$
$$R_2 = 30 + \left[\left\{\frac{(100-30)}{100}\right\} * 5\right] = 33.5$$
$$R_3 = 33.5 + \left[\left\{\frac{(100-33.5)}{100}\right\} * 10\right] = 40.15$$

EntityRiskScore = Round($R_3$) = Round(40.15) = 40

In turn, the protected endpoint 1504 then communicates the event risk severity scores 1512 to the edge device 202 and the security analytics system 118. Once received, the edge device 202 and security analytics system 118 respectively process the event risk severity scores 1512 as received event risk severity scores 1516 and 1520 to generate corresponding entity risk severity scores 1518 and 1522. In certain embodiments, the protected endpoint 1504, the edge device 202, and the security analytics system 118 may be implemented to respectively generate event risk severity scores 1512, 1516, 1520 asynchronously. In certain embodiments, the protected endpoint 1504, the edge device 202, and the security analytics system 118 may be implemented to respectively generate entity risk severity scores 1514, 1518, 1522 asynchronously. In certain embodiments, the protected endpoint 1504, the edge device 202, and the security analytics system 118 may be implemented to respectively provide event risk severity scores 1512, 1516, 1520 asynchronously to other components in a distributed risk scoring environment.

In various embodiments, one component of a distributed security risk scoring environment may be implemented to use certain results of a first distributed security risk scoring operation provided by another component of a distributed security risk scoring environment to perform a second distributed security risk scoring operation. For example, as shown in FIG. 15b, the security analytics system 118 may be configured to perform one or more distributed security risk scoring operations to generate an event risk severity score 1524 of '20' corresponding to anomalous event '4'.

The resulting event risk severity score 1524 of '20' is then processed with the previously-received event risk severity scores 1520 of '30', '5', and '10', as described in greater detail herein, to generate a revised entity risk severity score 1526 of '52' as follows:

$$R_1 = 30$$

$$R_2 = 30 + \left[\left\{\frac{(100-30)}{100}\right\} * 5\right] = 33.5$$

$$R_3 = 33.5 + \left[\left\{\frac{(100-33.5)}{100}\right\} * 10\right] = 40.15$$

$$R_4 = 40.15 + \left[\left\{\frac{(100-40.15)}{100}\right\} * 20\right] = 52.12$$

$$EntityRiskScore = Round(R_4) = Round(52.12) = 52$$

Once the revised entity risk severity score 1526 is generated, the security analytics system 118 communicates the event risk severity score 1524 associated with anomalous event '4' to the protected endpoint 1504 and the edge device 202. Once received, the edge device 304 and the edge device 202 respectively process the event risk severity scores 1524 as received event risk severity scores 1532 and 1528 with existing event risk severity scores 1512 and 1516 to generate corresponding revised entity risk severity scores 1534 and 1530 of '52'.

In various embodiments, one component of a distributed security risk scoring environment may be implemented to provide one or more event risk severity scores to another component of the distributed security risk scoring environment. In certain of these embodiments, the receiving component of the distributed security risk scoring environment may be implemented to process the received event risk severity scores to generate a corresponding entity risk severity score for an associated entity. In these embodiments, the individual event risk severity scores selected to be communicated, and the individual components of a distributed security risk scoring environment selected to communicate them, is a matter of design choice.

Figure 15C:
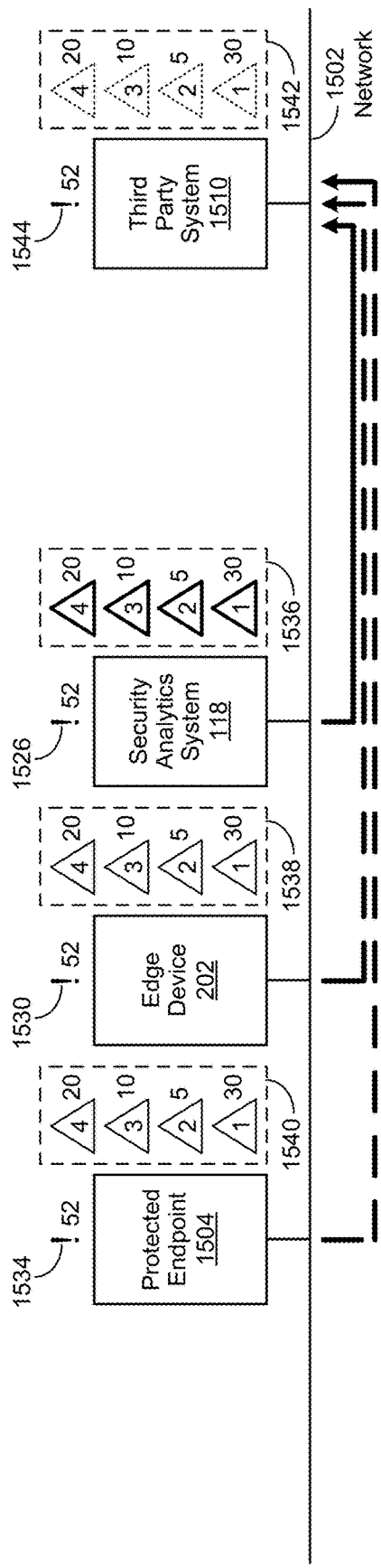

For example, as shown in FIG. 15c, the security analytics system 118 may be implemented to provide the event risk severity scores 1536 of '30', '5', '10', and '20', respectively corresponding to anomalous events '1', '2', '3', and '4' to a third party system 1510. These received event risk security scores 1542 are then processed by the third party system 1510, as described in greater detail herein, to generate an associated entity risk severity score 1544 of '52'. Alternatively, the protected endpoint 1504, or the edge device 202, may be implemented to respectively provide the event risk severity scores 1540 and 1538 of '30', '5', '10', and '20', which respectively correspond to anomalous events '1', '2', '3', and '4', to the third party system 1510. As before, the received event risk security scores 1542 are then processed by the third party system 1510, as described in greater detail herein, to generate an associated entity risk severity score 1544 of '52'.

Figure 15D:
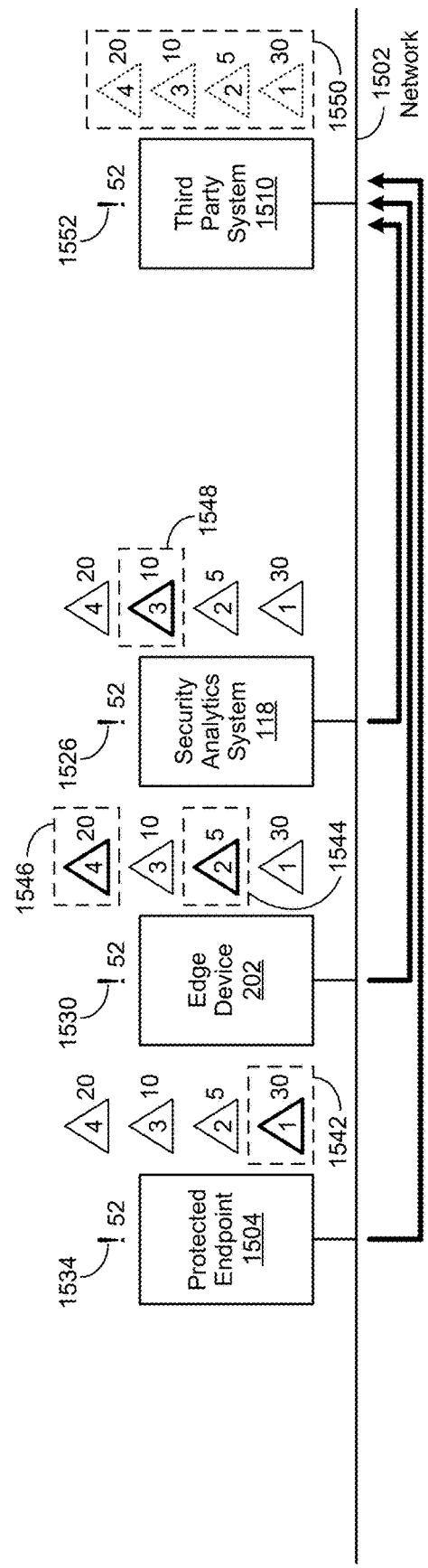

As another example, as shown in FIG. 15d, the event risk severity score 1542 of '30' corresponding to anomalous event '1' may be provided by the protected endpoint 1504 to the third party system 1510. Likewise, the event risk severity scores 1544, 1546 of '5' and '20', respectively corresponding to anomalous events '2' and '4', may be provided by the edge device 206 to the third party system 1510. In turn, the event risk severity score 1548 of '10' corresponding to anomalous event '3' may be provided by the security analytics system 118 to the third party system 1510. As before, the received event risk security scores 1550 are then processed by the third party system 1510 to generate an associated entity risk severity score 1552 of '52'.

In various embodiments, a component of a distributed security risk scoring environment, such as a third party system 1510, may be implemented to use certain information not available to other components of the distributed security risk scoring environment to detect an anomalous event. In certain of these embodiments, such a component of the distributed security risk scoring environment may in turn generate an event risk severity score corresponding to the detected anomalous events. In certain embodiments, the component generating the resulting event risk severity score may be implemented to communicate it to other components of the distributed security risk scoring environment.

As an example, a third party system 1510 might provide employee online activity monitoring services, such as their activity on certain social media sites. In this example, the third party system 1510 may be implemented to perform certain anomalous event detection operations, described in greater detail herein, to detect an anomalous event associated with an employee. To continue the example, detection of such an anomalous event may initiate a distributed security risk scoring operation to generate a corresponding event risk severity score, which in certain embodiments may be used with other such scores to calculate an associated entity risk severity score.

Figure 15E:
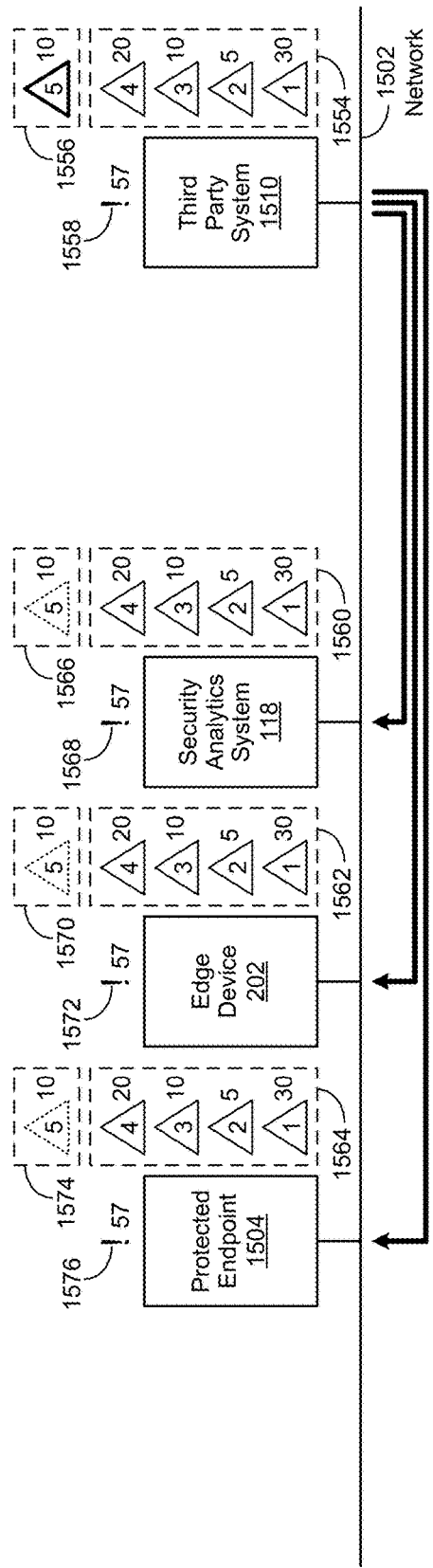

To illustrate this example, as shown in FIG. 15e, the anomalous event detected by the third party system 1510 may be identified as anomalous event '5' which has a corresponding event risk severity score 1556 of '10'. Accordingly, the event risk severity score 1556 of '10' corresponding to anomalous event '5' can be used with the event risk severity scores 1554 of '30', '5', '10', and '20', respectively correspond to anomalous events '1', '2', '3', and '4' to calculate an associated entity risk severity score 1558 as follows:

$$R_1 = 30$$

$$R_2 = 30 + \left[\left\{\frac{(100-30)}{100}\right\} * 5\right] = 33.5$$

$$R_3 = 33.5 + \left[\left\{\frac{(100-33.5)}{100}\right\} * 10\right] = 40.15$$

$$R_4 = 40.15 + \left[\left\{\frac{(100-40.15)}{100}\right\} * 20\right] = 52.12$$

$$R_5 = 52.12 + \left[\left\{\frac{(100-52.12)}{100}\right\} * 10\right] = 56.908$$

$$EntityRiskScore = Round(R_5) = Round(56.908) = 57$$

To further continue the example, the third party system 1510 may be implemented to likewise provide the event risk severity score 1556 of '10' associated with anomalous event '5' to the security analytics system 118, the edge device 202, and the protected endpoint 1504. The security analytics system 118, the edge device 202, and the protected endpoint 1504 can then respectively use the event risk severity score 1556 of '10' associated with anomalous event '5 as received event risk severity scores, 1566, 1570, and 1574. In turn, the received event risk severity scores, 1566, 1570, and 1574 can respectively be used with event risk severity scores

1560, 1562, and 1564 of '30', '5', '10', and '20', which respectively correspond to anomalous events '1', '2', '3', and '4', to generate associated entity risk severity scores 1568, 1572, and 1576 of '57'.

In certain embodiments, a component of a distributed security risk scoring environment may be implemented to identify a particular anomalous event as a false positive. In certain embodiments, the component of the distributed security risk scoring environment that identifies such an anomalous event as a false positive may be implemented to delete its corresponding event risk severity score, or reduce its value to '0', and recalculate an associated entity risk severity score. In various embodiments, the component of the distributed security risk scoring environment that identifies an anomalous event as a false positive may be implemented to communicate certain identifying information related to the anomalous event to other components in the distributed security risk scoring environment.

In certain embodiments, a component of the distributed risk scoring environment that receives such identifying information may be implemented to delete information related to the anomalous event, including its corresponding event risk severity score. In certain embodiments, a component of the distributed risk scoring environment that receives such identifying information may be implemented to retain information related to the anomalous event, but reduce its corresponding event risk severity score to a value of '0'. In certain embodiments, the component of the distributed risk scoring environment that receives such identifying information may likewise be implemented to recalculate the associated entity risk severity score once the anomalous event's corresponding event risk security score has been deleted or reduced to a value of '0'.

Figure 15F:
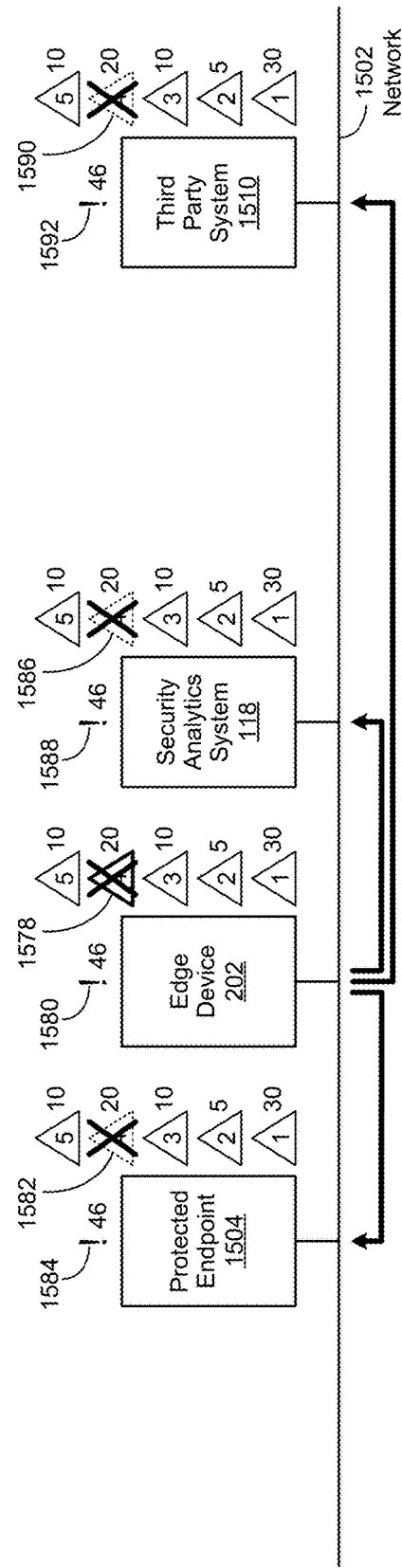

For example, as shown in FIG. 15f, the edge device 202 may have identified anomalous event '4' as a false positive. As a result, its corresponding event risk severity score 1578 of '20' is reduced to '0'. To continue the example, the associated entity risk severity score 1580 is then recalculated as follows:

$$R_1 = 30$$

$$R_2 = 30 + \left[\left\{\frac{(100-30)}{100}\right\} * 5\right] = 33.5$$

$$R_3 = 33.5 + \left[\left\{\frac{(100-33.5)}{100}\right\} * 10\right] = 40.15$$

$$R_4 = 40.15 + \left[\left\{\frac{(100-40.15)}{100}\right\} * 0\right] = 40.15$$

$$R_5 = 40.15 + \left[\left\{\frac{(100-40.15)}{100}\right\} * 10\right] = 46.135$$

$$EntityRiskScore = Round(R_5) = Round(46.135) = 46$$

To continue the example further, the edge device 202 then notifies the protected endpoint 1504, the security analytics system 118, and the third party system 1510 that anomalous event '4' has been identified as a false positive and its corresponding event risk severity score has been reduced to '0'. Accordingly, protected endpoint 1504, the security analytics system 118, and the third party system 1510 respectively reduce the value of event risk severity scores 1582, 1586, and 1590 associated with anomalous event '4' to a value of '0'. Thereafter, the protected endpoint 1504, the security analytics system 118, and the third party system 1510 respectively recalculate associated entity risk severity scores 1584, 1588, and 1592 as previously described.

FIGS. 16a and 16b show a simplified block diagram of distributed security risk scoring operations performed in a distributed security risk scoring environment implemented in accordance with an embodiment of the invention to generate an entity risk severity score for a user entity. In certain embodiments, a user entity, described in greater detail herein, may be associated with more than one endpoint devices, such as the protected endpoints '1' 1604 and '2' 1606 shown in FIG. 16a. Certain embodiments of the invention reflect an appreciation that it is possible for a user entity to use multiple endpoint devices, directly or indirectly, to enact entity behavior that may be malicious. For example, a user entity may directly use one endpoint device to access one data store to retrieve one type of data while indirectly using one or more other endpoint devices to access other data stores to retrieve other types of data. To continue the example, the user entity may use a tablet computer to directly download customer record files from a source of customer data while simultaneously having a remote desktop computer automatically download quarterly sales information from a source of company financial data at a pre-scheduled time.

Various embodiments reflect an appreciation that certain events associated with individual endpoint devices associated with the same user entity, in and of themselves, may not be considered particularly anomalous. Likewise, various embodiments of the invention reflect an appreciation that these same events may be considered more highly anomalous when viewed in whole as a combination of events, which may or may not be related. Certain embodiments of the invention likewise reflect an appreciation that it is often difficult to correlate the occurrence of such events with a particular user entity. Furthermore, certain embodiments of the invention reflect an appreciation that a user entity's associated entity risk severity score may be artificially low if such a correlation is not possible. Accordingly, in certain embodiments, entity risk severity score calculations may be performed in a distributed risk scoring environment to generate an entity risk severity score that reflects the aggregate severity of risk corresponding to anomalous events associated with two or more endpoint devices associated with a particular user entity.

For example, as shown in FIG. 16a, an edge device 202 may be implemented, as described in greater detail herein, to process event risk severity scores 1620 of '10, '30' and '10', corresponding to anomalous events '1', '3', and '5', to generate an associated entity risk severity score 1622 of '43'. In this example, the edge device 202 may have previously communicated the event risk severity scores 1620 of '10, '30' and '10' corresponding to anomalous events '1', '3', and '5', along with associated anomalous event information, to endpoint device '1' 1604, security analytics system 118, and cloud access security broker (CASB) 1608. Skilled practitioners of the art will be familiar with a CASB 1608, which as typically implemented is an on-premises or cloud-hosted system that resides between cloud service consumers, such as a user entity, and cloud service providers to enforce security, compliance, and governance policies for cloud-based applications.

To continue the example, the endpoint device '1' 304, security analytics system 118, and CASB 1608 may have respectively used the provided event risk severity scores 1620 as received event risk severity scores 1616, 1624, and 1628 to generate associated entity risk severity scores 1618, 1626, and 1630 of '43'. To continue the example further, the edge device 202 may likewise be implemented to interact with endpoint device '2' 1606 and determine whether it is associated with the same user entity as endpoint device '1' 1604. If so, the edge device 202 may be implemented to provide event risk severity scores 1620 of '10', '30', and '10' corresponding to anomalous events '1', '3', and '5', along with associated anomalous event information, to endpoint device '2' 1606. In turn, endpoint device '2' 1606 may be implemented to use the provided event risk severity scores 1620 as received event risk severity scores 1612, which are then used to generate an associated entity risk severity score 1614 of '43'.

In various embodiments a CASB 1608 may be implemented to monitor interactions between a user entities and certain cloud service providers. In certain embodiments, the monitoring of such entities may include monitoring the use of all protected endpoints associated with a particular user entity. In various embodiments, the CASB 1608 may likewise be implemented to use such protected endpoint monitoring in combination with certain security and governance policies to detect anomalous events involving two or more protected endpoints associated with a particular user entity. In certain embodiments, the CASB 1608 may be implemented to generate an event risk severity score for such an anomalous event, and then use the resulting event risk severity score to calculate a corresponding entity risk severity score for an associated user entity. In certain embodiments, the CASB 1608 may likewise be implemented to provide the resulting event risk severity score to other components in a distributed risk scoring environment, each of which may in turn be implemented to use it to generate a corresponding entity risk severity score for an associated user entity.

For example, as shown in FIG. 16b, the CASB 1608 may be implemented to generate an event risk severity score 1632 of '5' for anomalous event '6'. In this example, the CASB 1608 may be implemented to use the resulting event risk severity score of '5' associated with anomalous event '6' in combination with the event risk severity scores 1634 of '10', '30', and '10' corresponding to anomalous events '1', '3', and '5' to calculate an associated entity risk severity score 1636 of '46'.

To continue the example, the CASB 1608 may likewise be implemented to provide the event risk severity score 1632 of '5' for anomalous event '6' to the security analytics system 118, the edge device 202, and protected endpoints '1' 1604 and '2' 1606, where it is respectively received as event risk severity scores 1638, 1644, 1650, and 1660. To further continue the example, the security analytics system 118, the edge device 202, and protected endpoints '1' 1604 and '2' 1606 may in turn be implemented to respectively use the received event risk severity scores 1638, 1644, 1650, and 1660 in combination with existing event risk severity scores 1640, 1646, 1652, and 1658 to calculate associated entity risk severity scores 1642, 1648, 1654, and 1660 of '46'.

Figure 17A:
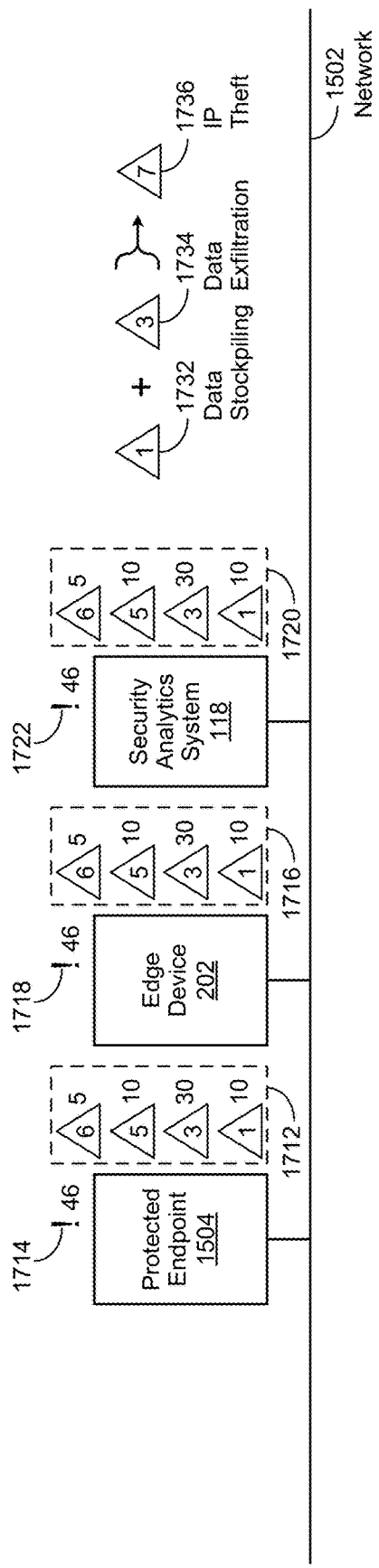
FIGS. 17a and 17b show a simplified block diagram of distributed security risk scoring operations performed in a distributed security risk scoring environment to generate a scenario risk severity score for a security vulnerability scenario.
Figure 17B:
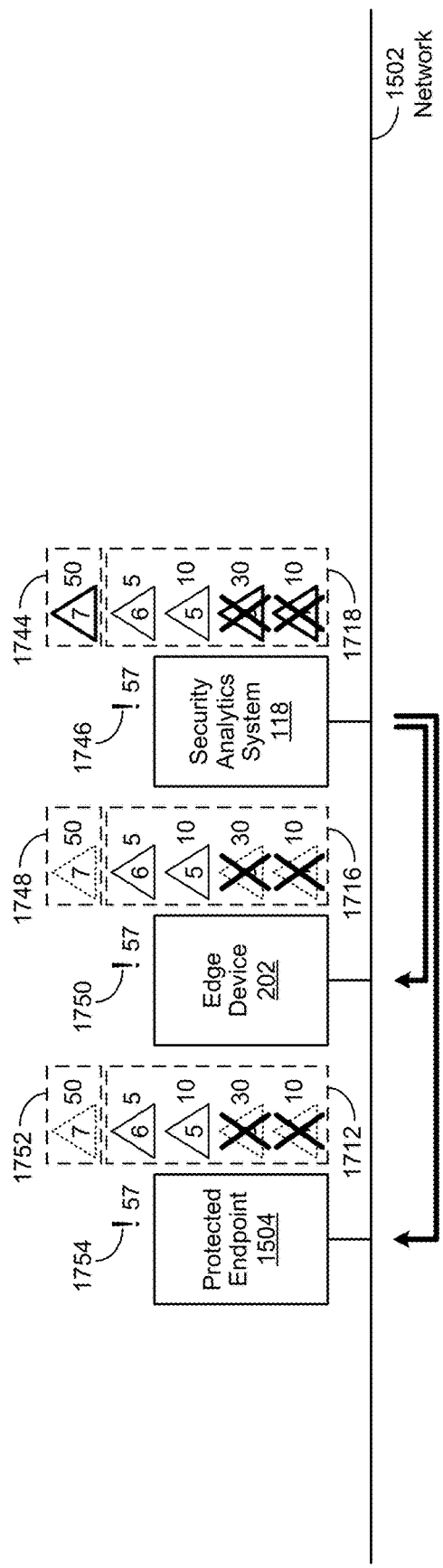

FIGS. 17a and 17b show a simplified block diagram of distributed security risk scoring operations performed in a distributed security risk scoring environment implemented in accordance with an embodiment of the invention to generate a scenario risk severity score for a security vulnerability scenario. In certain embodiments, a security analytics system 118, described in greater detail herein, may be implemented to correlate the occurrence of one or more anomalous events to a security vulnerability scenario, likewise described in greater detail herein. In various embodiments, the one or more anomalous events may respectively have a corresponding initial event risk severity score, described in greater detail herein. In various embodiments, a particular security vulnerability scenario may have an associated scenario risk severity score. As used herein, a scenario risk severity score broadly refers to a numeric representation that reflects the severity of risk a particular security vulnerability scenario may represent.

In certain embodiments, the scenario risk severity score may be generated automatically, manually, or a combination of both. In certain embodiments, the scenario risk severity score may be generated according to a rule, a policy, the class of security vulnerability scenarios the security vulnerability scenario may be part of, or a combination thereof. In these embodiments, the method by which a scenario risk severity score may be generated, and the numeric value of the resulting scenario risk severity score, is a matter of design choice. As an example, if an anomalous event with an event risk severity score of '50' is correlated to a particular scenario risk severity score, then a rule may be invoked that its corresponding event risk severity score be increased by 20%, which would result in an associated scenario risk severity score of '60'. Those of skill in the art will recognize that many such embodiments and examples are possible. Accordingly, the foregoing is not intended to limit the spirit, scope, or intent of the invention.

In various embodiments, the security analytics system 118 may be implemented to replace the one or more anomalous events, and their corresponding event risk severity scores, with the security vulnerability scenario and its corresponding scenario risk severity score. In certain embodiments, as described in greater detail herein, the security analytics system 118 may be implemented to decrease the event risk severity score of any anomalous event associated with a particular scenario risk severity score to '0'. Certain embodiments of the invention reflect an appreciation that decreasing the event risk severity score of any anomalous associated with a particular security vulnerability scenario to '0' would facilitate the retention of information associated with the anomalous events.

In certain embodiments, the security analytics system 118 may be implemented to use the scenario risk severity score, and any remaining event risk severity scores, to generate a revised entity risk severity score for an associated user entity. In certain embodiments, the security analytics system 118 may be implemented, as described in greater detail herein, to provide information related to the deletion of the anomalous events associated with the security vulnerability scenario, and their corresponding event risk severity scores to other components of a distributed risk scoring environment. In certain embodiments, the security analytics system 118 may likewise be implemented to provide information related to a particular security vulnerability scenario, and its corresponding scenario risk severity score, to other components of a distributed risk scoring environment. In certain embodiments, other components of a distributed risk scoring environment may be implemented to use such provided information and scores to generate a revised entity risk severity score for an associated user entity.

For example, as shown in FIG. 17a, an protected endpoint 1504, an edge device 202, and a security analytics system 118 may respectively have event risk severity scores 1712, 1716, 1720 of '10', '30', '10', and '5' corresponding to anomalous events '1', '3', '5', and '6'. In this example, the protected endpoint 1504, an edge device 202, and a security analytics system 118 may respectively have used the event risk severity scores 1712, 1716, 1720 to generate an associated entity risk severity score 1714, 1718, and 1722 of '46'. To continue the example, the security analytics system 118 may have been implemented to process the event risk severity scores 1720 of '10', '30', '10', and '5' corresponding to anomalous events '1', '3', '5', and '6' to identify possible correlation to a particular security vulnerability scenario. To continue the example further, the security analytics system 118 may identify anomalous event '1' as being related to data stockpiling 1732 and anomalous event '2' being related to data exfiltration 1734, which in combination correlate to a security vulnerability scenario of intellectual property (IP) theft 1736.

Accordingly, as shown in FIG. 17b, the security analytics system 118 may be further implemented to delete the event risk severity scores of '10' and '30' corresponding to anomalous events '1' and '3', or reduce their values to '0'. Likewise, the security analytics system 118 may be implemented to assign a scenario risk severity score 1744 of '50' to the IP theft security vulnerability '7', which is then used with the remaining event risk severity scores 1718 to generate a revised entity risk severity score 1746 of '57' for its associated user entity.

To continue the example further, the security analytics system 118 then notifies the protected endpoint 1504 and the edge device 202 that anomalous events '1' and '3' have been identified as being associated with an IP theft 1736 security vulnerability scenario and their corresponding event risk severity scores have been deleted or reduced to '0'. Accordingly, the protected endpoint 1504 and the edge device 202 respectively delete or reduce the value of the event risk severity scores 1712, 1716 associated with anomalous event '1' and '3' to a value of '0'. Thereafter, the protected endpoint 1504 and the edge device recalculate associated entity risk severity scores 1754 and 1750 as previously described.

Figure 18:
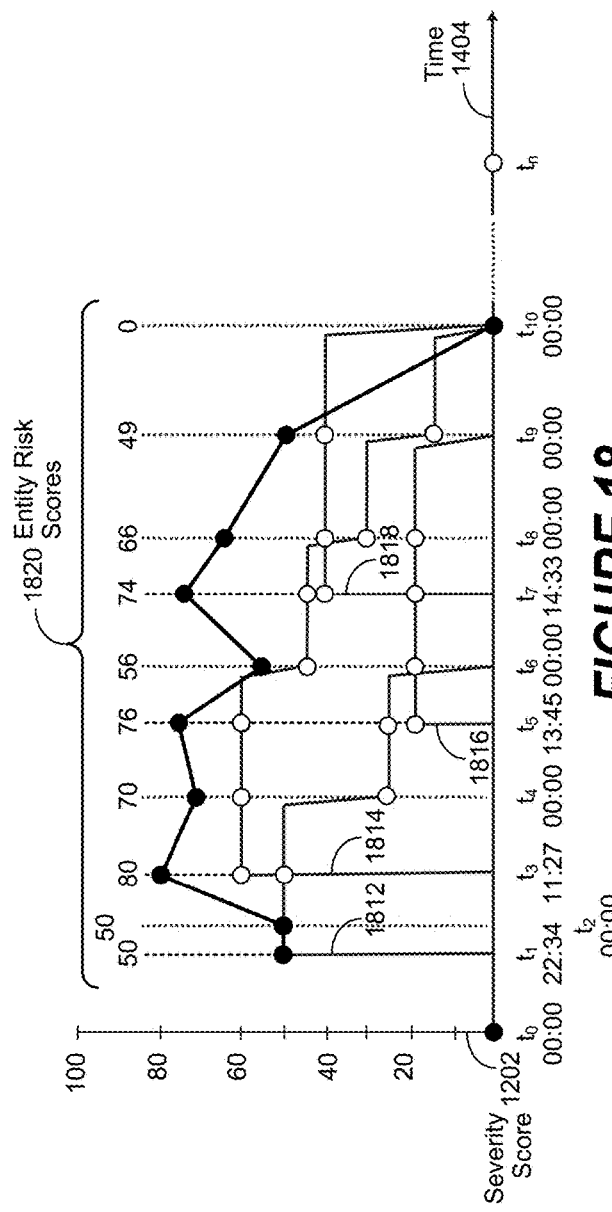
FIG. 18 shows a graphical representation of the effect of one or more event risk severity scores on an associated entity risk severity score over time.

FIG. 18 shows a graphical representation of the effect of one or more event risk severity scores implemented in accordance with an embodiment of the invention on an associated entity risk severity score over time. In certain embodiments, as described in greater detail herein, a reduction function may be applied to the initial event risk severity score corresponding to a particular anomalous event for a predetermined longevity time interval. Likewise, as described in greater detail herein, the application of a particular risk function to the initial event risk severity score corresponding to an anomalous event may result in its associated event risk severity score 1202 changing over time 1404.

In various embodiments, as likewise described in greater detail herein, the longevity time interval of a reduction function applied to one anonymous event may coincide with the longevity time interval of a reduction function applied to another anonymous event at a certain point in time 1404. In certain embodiments, the current event risk severity score of one or more anonymous events may be processed, as described in greater detail herein, to calculate an entity risk severity score 1820 for an associated entity at a particular point in time 1404. Accordingly, the entity risk severity score 1820 for an associated entity may change over time 1404.

For example, as shown in FIG. 18, a combined flat and then gradual, stepped reduction function may be applied to anomalous event '1' 1812 between points in time 1404 $t_1$ and $t_6$. Likewise, a combined flat and then gradual, stepped reduction function may be applied to anomalous event '2' 1814 between points in time 1404 $t_3$ and $t_{10}$. As likewise shown in FIG. 18, a flat and then gradual reduction function may be applied to anomalous event '3' 1816 between points in time 1404 $t_5$ and $t_6$. Likewise, a flat and then gradual reduction function may be applied to anomalous event '4' 1818 between points in time 1404 $t_7$ and $t_{10}$.

To continue the example, using the entity risk severity score 1820 calculation approaches described in greater detail herein, the following entity risk severity scores 1820 can be calculated for various points in time 1404:

$t_1$=22:34|Risk: 50

$t_2$=00:00|Risk: 50

$t_3$=11:27|Risk: 50+(0.5×60)=80

$t_4$=00:00|Risk: 25+(0.75×60)=70

$t_5$=13:45|Risk: 25+(0.75×60)+(0.3×20)=76

$t_6$=00:00|Risk: 45+(0.55×20)=56

$t_7$=14:33|Risk: 45+(0.55×20)+(0.44×40)=74

$t_8$=00:00|Risk: 30+(0.7×20)+(0.56×40)=66

$t_9$=00:00|Risk: 15+(0.85×40)=49

$t_{10}$=00:00|Risk: 0

Accordingly, the effect of one or more current event risk severity scores 1202 corresponding to an entity risk severity score 1820 associated with a particular entity can be determined over a certain interval of time 1404.

Figure 19:
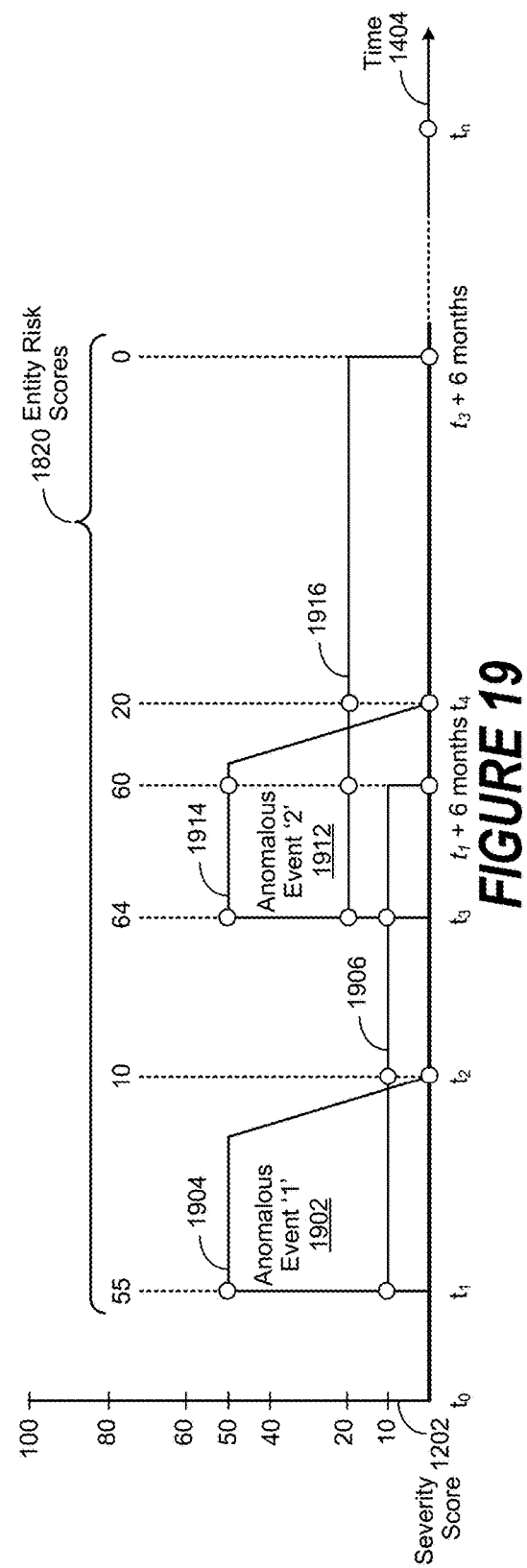
FIG. 19 shows a graphical representation of the application of a historical entity risk reduction function to an anomalous event to provide an indication of historical security risk.

FIG. 19 shows a graphical representation of the application of a historical entity risk reduction function implemented in accordance with an embodiment of the invention to an anomalous event to provide an indication of historical security risk. Certain embodiments of the invention reflect an appreciation that a particular anomalous event associated with a particular entity at a particular point in time may not appear to represent significant risk. Various embodiments of the invention likewise reflect an appreciation that certain anomalous events associated with a particular entity may occur at certain points in time, separated by intervals of time without any occurrence of an anomalous event. Likewise, certain embodiments of the invention reflect an appreciation that the infrequent occurrence of a series of discrete anomalous events associated with the same entity over an extended interval of time, each of which may not appear to represent significant risk, may mask malicious behavior by the entity.

Various embodiments of the invention reflect an appreciation that providing a historical indication of risk associated with a particular entity may assist in detecting malicious behavior that otherwise may have been missed. Accordingly, in certain embodiments, a historical entity risk reduction function may be applied to a particular anomalous event to coincide with an previously-applied reduction function. As used herein, a historical entity risk reduction function broadly refers to a reduction function, described in greater detail herein, that may be implemented in certain embodiments to apply an additional event risk severity score 1202 to the current event risk severity score 1202 corresponding to an anomalous event at a particular point in time.

In various embodiments, the historical risk reduction function may be implemented to represent the security risk reputation of a particular entity over a certain interval of time. In certain of these embodiments, implementation of the historical risk reduction function may result in the entity risk severity score associated with a particular entity remaining elevated for some predetermined interval of time, even in the absence of the occurrence of an abnormal event associated with the entity. In certain embodiments, the historical entity risk reduction function may be implemented to provide a supplemental event risk severity score 1202, which may be used with one or more other event risk severity scores 1202 respectively corresponding to one or more anomalous events to calculate a corresponding entity risk severity score 1202 associated with a particular entity.

In certain embodiments of the invention, the historical entity risk reduction function may be applied to an anomalous event at the time it is detected. In certain embodiments, the historical entity risk reduction function may be applied to an anomalous event at a predetermined point in time within the longevity time interval of an associated reduction function applied to the same anomalous event. In certain embodiments, the historical entity risk reduction function may be implemented as a flat, gradual, flat and then gradual, or step reduction function, or a combination thereof, as described in greater detail herein.

In certain embodiments, the longevity time interval corresponding to a particular historical entity risk reduction function may be implemented to exceed the longevity time interval of an associated reduction function applied to the same anomalous event. In certain embodiments, the initial event risk severity score 1202 corresponding to a particular historical entity risk reduction function may be determined, manually, automatically, or semi-automatically. In certain embodiments, the initial event risk severity score 1202 corresponding to a particular historical entity risk reduction function may likewise be determined by a mathematical factor, a mathematical formula, a rule, or a combination thereof. In these embodiments, the type of reduction function that may be selected for implementation of a particular historical entity risk reduction function, its initial event risk severity score 1202, and the point in time it may be implemented relative to an associated reduction function applied to the same anomalous event, is a matter of design choice.

For example, as shown in FIG. 19, a flat and then gradual reduction function 1904 is applied to anomalous event '1' 1902 between points in time 1404 $t_1$ and $t_2$. In this example, an initial event risk severity score of '50' is assigned to the anonymous event 1902 at point in time 1404 $t_1$. Thereafter, the initial event risk severity score of '50' is persisted as a current event risk severity score of '50' for a predetermined interval of time 1404, after which it is gradually reduced to a value of '0' at point in time 1404 $t_2$. In this example, the fact that an anomalous event '1' 1902 was detected at point in time 1404 $t_1$ would typically be lost at some future point in time 1404, such as $t_1+6$ months. Accordingly, in this example, a flat historical entity risk reduction function 1904 with an initial event risk severity score 1202 of '10' and a longevity time interval of $t_1+6$ months is concurrently applied to the anonymous event '1' 1902 when it is detected at point in time 1404 $t_1$.

To continue the example, the entity risk severity scores 1202 corresponding to points in time 1404 $t_1$, $t_2$ and $t_1+6$ months can be calculated, as described in greater detail herein, as follows:

$$EntityRiskScore\ \text{at}\ t_1 = 50 + \left[\left\{\frac{(100-50)}{100}\right\} * 10\right] = 55$$

$$EntityRiskScore\ \text{at}\ t_2 = 10$$

$$EntityRiskScore\ \text{at}\ t_1 + 6\ \text{months} = 10$$

Accordingly, an entity risk severity score of '10' from point in time 1404 $t_1$, to point in time 1404 $t_1+6$ months provides an indication of historical risk corresponding to the entity associated with anomalous event '1' 1902.

To continue the example further, anomalous event '2' 1912 may be detected at point in time 1404 $t_3$, which is within the longevity time interval of the historical entity risk reduction function 1904 previously applied to the initial event risk severity score corresponding to anomalous event '1' 1902. At the time of its detection, an initial event risk severity score of '50' is assigned to the anonymous event 1912 at point in time 1404 $t_3$. A flat and then gradual reduction 1914 is then applied to anomalous event '2' 1912 between points in time 1404 $t_3$ and $t_4$. Thereafter, the initial event risk severity score of '50' is persisted as a current event risk severity score of '50' for a predetermined interval of time 1404, after which it is gradually reduced to a value of '0' at point in time 1404 $t_4$.

At the same time, a flat historical entity risk reduction function 1916 with a longevity time interval of $t_3+6$ months is concurrently applied to the anomalous event '2' 1912 at point in time 1404 $t_3$. However, due to the fact that detection of anomalous event '2' 1912 occurred within the longevity time interval of the previously-applied historical entity risk reduction function 1906, its initial event risk severity score 1202 is set to a value of '20' to reflect the historical risk associated with the prior occurrence of anomalous event '1' 1902. To continue the example yet further, the entity risk severity scores 1202 corresponding to points in time 1404 $t_3$, $t_1+6$ months, $t_2$ and $t_3+6$ months can be calculated, as described in greater detail herein, as follows:

$$EntityRiskScore\ \text{at}\ t_3 = 10 + \left[\left\{\frac{(100-10)}{100}\right\} * 20\right] + \left[\left\{\frac{(100-28)}{100}\right\} * 50\right] = 64$$

$$EntityRiskScore\ \text{at}\ t_1 + 6\ \text{months} = 0 + \left[\left\{\frac{(100-0)}{100}\right\} * 20\right] + \left[\left\{\frac{(100-20)}{100}\right\} * 50\right] = 60$$

$$EntityRiskScore\ \text{at}\ t_4 = 20$$

$$EntityRiskScore\ \text{at}\ t_3 + 6\ \text{months} = 20$$

Accordingly, an entity risk severity score of '20' from point in time 1404 $t_4$, to point in time 1404 $t_3+6$ months provides an indication of historical risk corresponding to the entity associated with anomalous events '1' 1902 and '2' 1912. Skilled practitioners of the art will recognize that many such embodiments and examples of how to provide an indication of historical risk through the application of a historical entity risk reduction function to a previously-applied reduction function associated with an anomalous event are possible. Accordingly, the foregoing is not intended to limit the spirit, scope, or intent of the invention.

Figure 20:
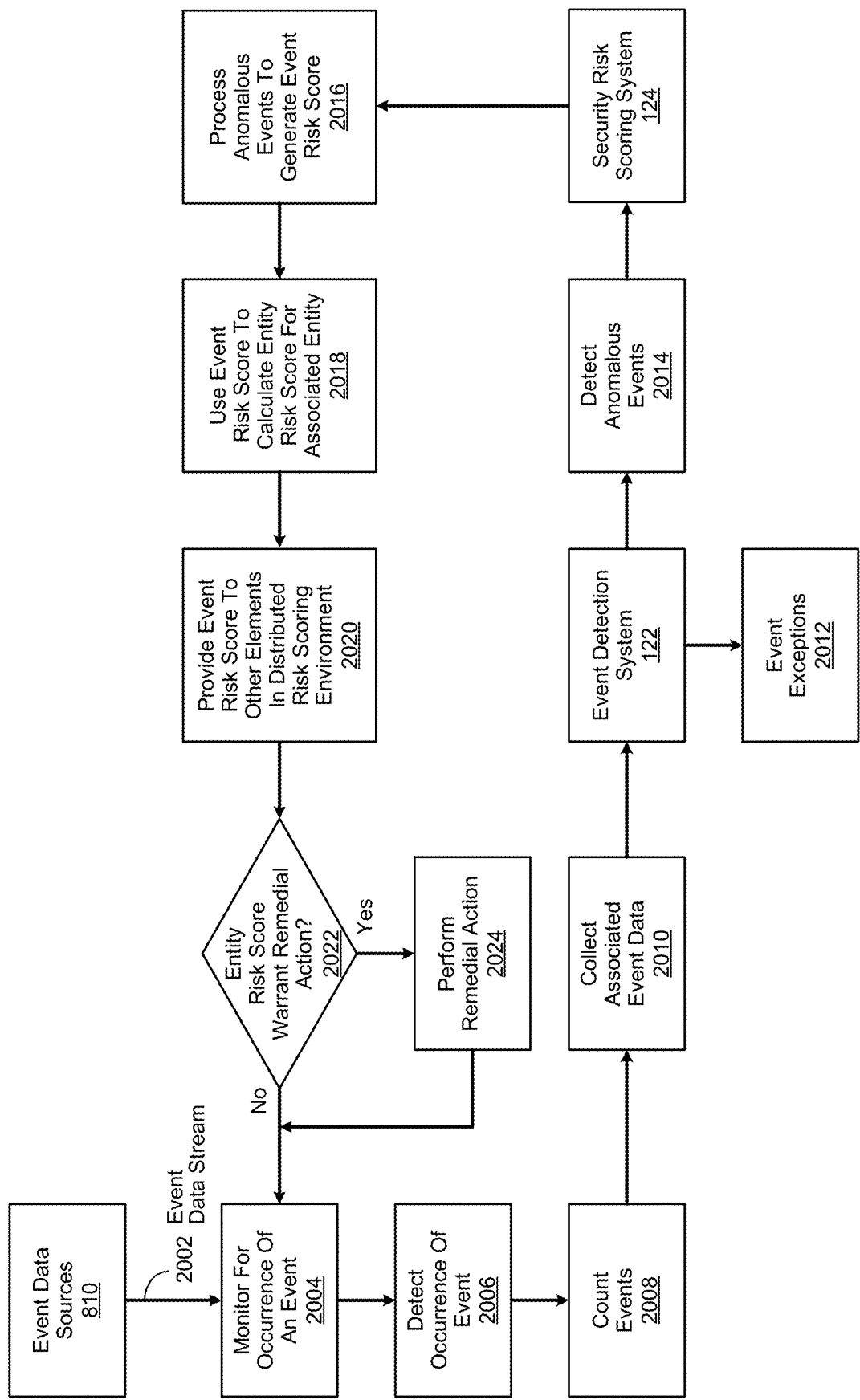
FIG. 20 shows a simplified process flow of the performance of anomalous event risk scoring operations.

FIG. 20 shows a simplified process flow of the performance of anomalous event risk scoring operations implemented in accordance with an embodiment of the invention. In certain embodiments, a stream of event data 2002 provided by one or more event data sources 810, described in greater detail herein, is monitored in step 2004 for the occurrence of a particular event. If an event is detected in step 2006, then it is counted, or otherwise tracked, in step 2008, followed by its associated data being collected in step 2010.

The data collected in step 2010 is then provided an event detection system 122 for processing. Once received, the event data collected in step 2010 is processed by the event detection system 122 to determine whether its associated event adheres to one or more security policies. If it does, then the event data collected in step 2010 is marked as an event exception in step 2012. However, if it does not, then the data collected in step 2010 is processed in step 2014 by the event detection system 122 to detect anomalous events of analytic utility, described in greater detail herein. If an anomalous event is detected in step 2014, then it is provided to a security risk scoring system 124, described in greater detail herein.

The security risk scoring system then processes the anomalous event in step 2016 to generate a corresponding event risk severity score, as described in greater detail herein. The resulting event risk severity score is then processed by the security risk scoring system 124 to generate an entity risk severity score, as likewise described in greater detail herein. Thereafter, in step 2020, the previously-generated event risk severity score is provided to other entities in a distributed risk scoring environment, likewise as described in greater detail herein. A determination is then made in step 2022 whether the current entity risk severity score warrants the performance of a remedial action. If so, then it is performed in step 2024. Thereafter, or if it was determined in step 2022 that the current entity risk severity score does not warrant performance of a remedial action, the process is continued, proceeding with step 2004.

Figure 21A:
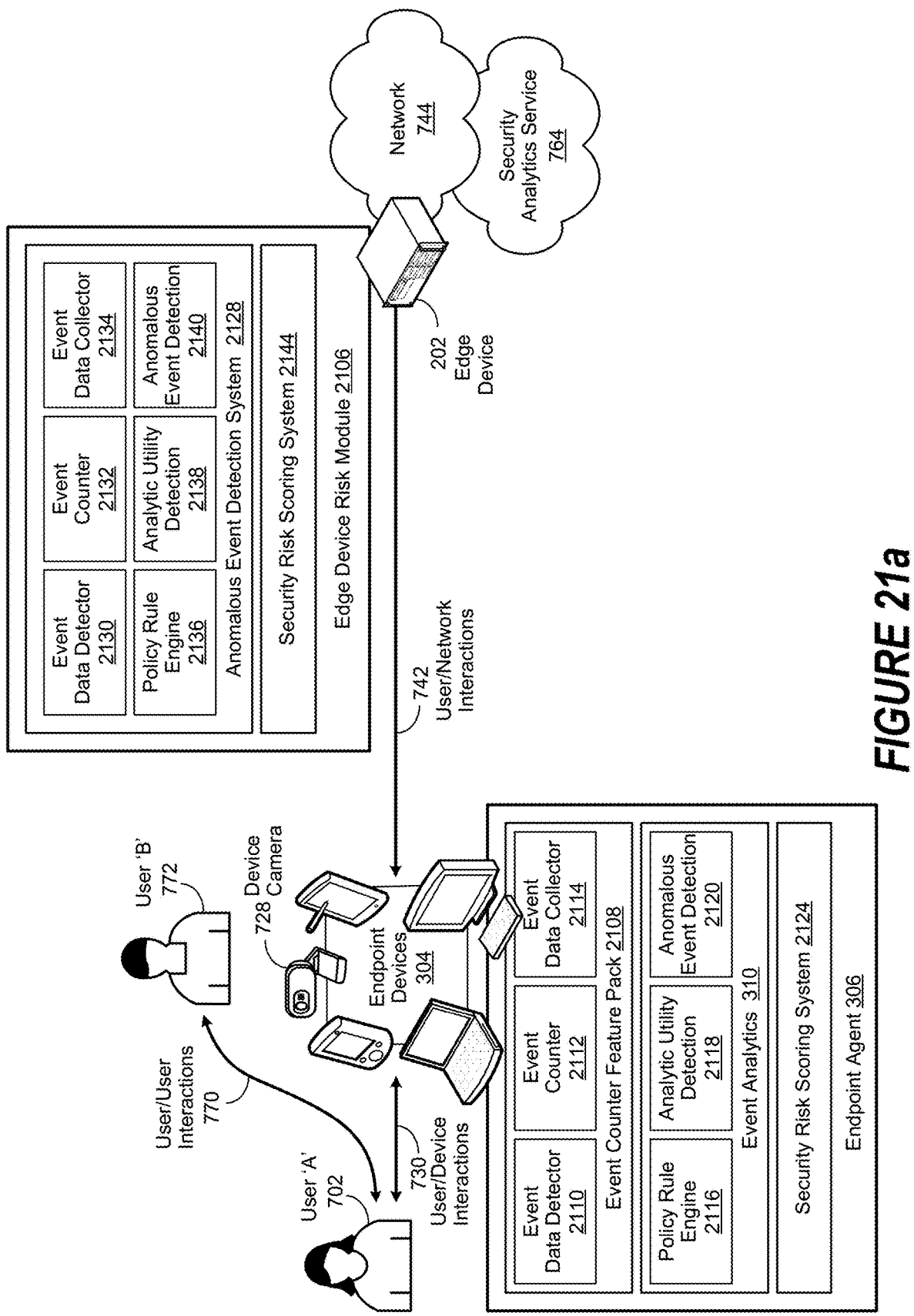
FIGS. 21a and 21b show a simplified block diagram of a distributed security risk scoring system environment.
Figure 21B:
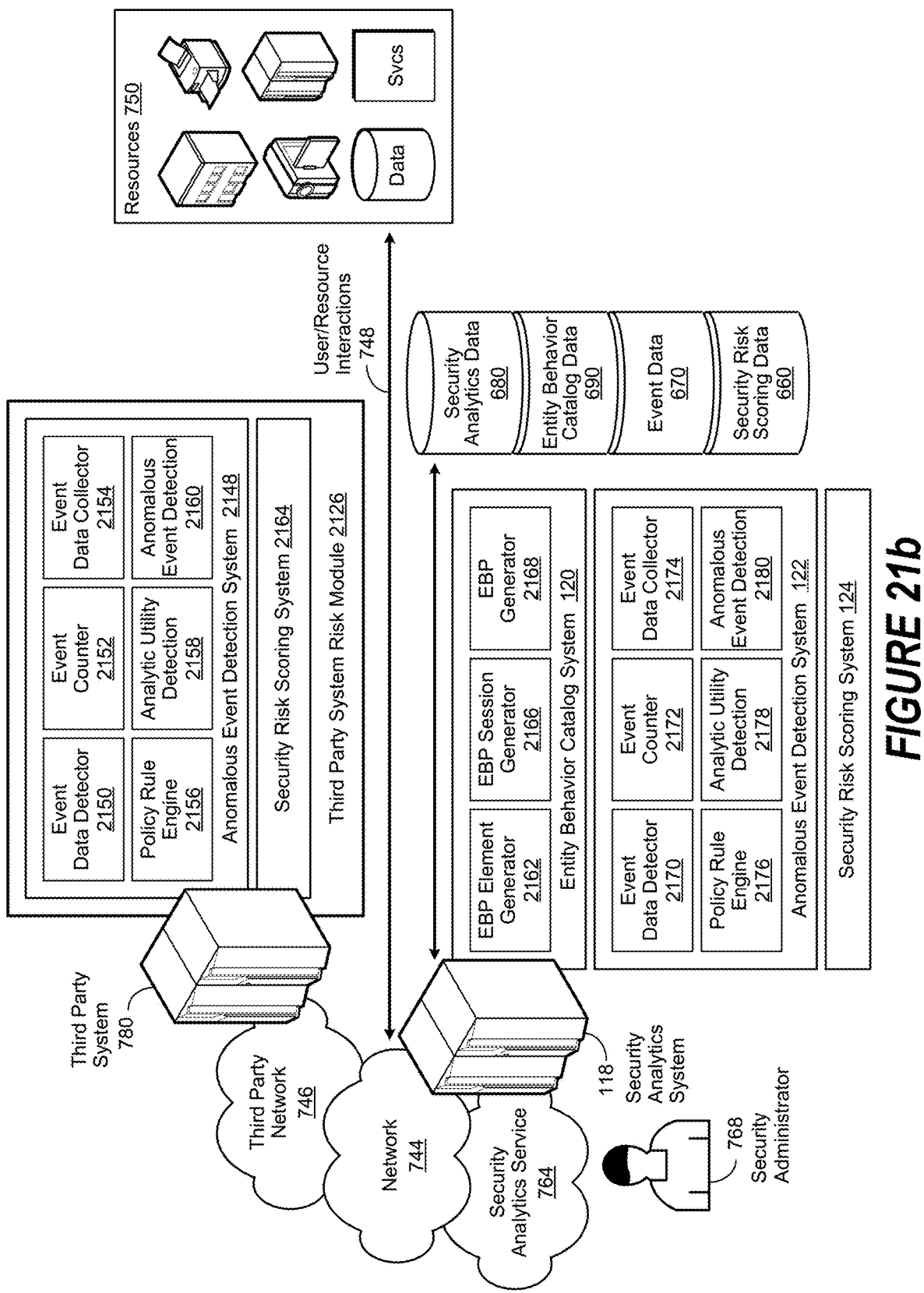

FIGS. 21*a* and 21*b* show a simplified block diagram of a distributed security risk scoring environment implemented in accordance with an embodiment of the invention. In certain embodiments, the distributed security risk scoring environment may be implemented to detect an anomalous event, described in greater detail herein. In certain embodiments, the distributed security risk scoring environment may be implemented to include a security analytics system 118, likewise described in greater detail herein. In certain embodiments, the security analytics system 118 may be implemented to include an entity behavior catalog (EBC) system 120, an anomalous event detection system 122, and a security risk scoring system 124, or a combination thereof.

In certain embodiments, the security risk scoring system 124 may be implemented to generate an event risk severity score, likewise described in greater detail, for an anomalous event detected by the anomalous event detection system 122. In certain embodiments, the security risk scoring system 124 may be implemented to generate an event risk severity score corresponding to an anomalous event when it is first detected, as likewise described in greater detail herein. In certain embodiments, the risk scoring system 124 may be implemented, as likewise described in greater detail herein, to use such an event risk severity score as an initial event risk severity score for the detected anomalous event. In certain embodiments, the security risk scoring system 124 may likewise be implemented, as described in greater detail herein, to apply a particular reduction function to an initial event risk severity score to generate a current event risk severity score for a particular point in time during the longevity time interval associated with the reduction function.

In certain embodiments, as likewise described in greater detail herein, the risk scoring system 124 may be implemented to apply a particular historical entity risk reduction function to an anomalous event when it is first detected to provide an indication of historical risk. As likewise described in greater detail herein, the risk scoring system 124 may be implemented in certain embodiments to generate a scenario risk severity score from one or more event risk severity scores. In certain embodiments, the risk scoring system 124 may be implemented to generate an entity risk severity score, as likewise described in greater detail herein, from one or more event risk severity scores, or one or more scenario risk severity scores, or a combination thereof, for an associated entity. Likewise, as described in greater detail herein, the risk scoring system 124 may be implemented in certain embodiments to provide one or more event risk severity scores, or one or more security vulnerability scores, or a combination thereof, to one or more other components in a distributed risk scoring environment.

In certain embodiments, analyses performed by the security analytics system 118 may be used to detect an anomalous event that may be of analytic utility, as described in greater detail herein. In certain embodiments, the anomalous event may be associated with one or more user or non-user entities, likewise described in greater detail herein. In certain embodiments, as likewise described in greater detail herein, the EBC system 120, the anomalous event detection system 122, and the security risk scoring system 124, or a combination thereof, may be used in combination with the security analytics system 118 to perform such analyses. In various embodiments, certain data stored in a repository of security analytics 680 data, a repository of EBC 690 data, a repository of event 670 data, or a repository of security risk scoring data 660, or a combination thereof, may be used by the security analytics system 118, the EBC system 120, the anomalous event detection system 122, or the security risk scoring system 124, or some combination thereof, to perform the analyses.

In certain embodiments, the EBC system 120, as described in greater detail herein, may be implemented to use entity behavior information and associated event data, to generate an entity behavior profile (EBP), as described in greater detail herein. In various embodiments, the security analytics system 118 may be implemented to use one or more session-based fingerprints to perform security analytics operations to detect certain user or non-user entity behavior, as likewise described in greater detail herein. In certain embodiments, the security analytics system 118 may be implemented to monitor entity behavior associated with a user entity, such as a user 'A' 702 or user 'B' 772. In certain embodiments, the user or non-user entity behavior may be monitored during user/device 730, user/network 742, user/resource 748, and user/user 770 interactions. In certain embodiments, the user/user 770 interactions may occur between a first user, such as user 'A' 702 and user 'B' 772.

In certain embodiments, the anomalous event detection system 122 may be implemented to perform an anomalous event detection operation, described in greater detail herein. In various embodiments, as likewise described in greater detail herein, the anomalous event detection system 122 may be implemented to use certain associated event information to perform the anomalous event detection operation. In certain embodiments, the event information may be stored in a repository of event 670 data. In various embodiments, the security risk scoring system 124 may be implemented to provide certain security risk scoring information stored in the repository of security risk scoring 660 data to the security analytics system 118 for use by the anomalous event detection system 122.

In various embodiments, the security risk scoring system 124 may be implemented, as described in greater detail herein, to manage certain security risk scoring information relevant to the occurrence of an event. In various embodiments, as likewise described in greater detail herein, the security risk scoring system 124 may be implemented to provide certain security risk scoring information relevant to a particular event to the anomalous event detection system 122. In certain embodiments, the security risk scoring information provided by the security risk scoring system 124 to the anomalous event detection system 122 may be used to determine whether a particular event is anomalous.

In certain embodiments, as described in greater detail herein, an endpoint agent 306 may be implemented on an endpoint device 304 to perform user or non-user entity behavior monitoring. In certain embodiments, the user or non-user entity behavior may be monitored by the endpoint agent 306 during user/device 730 interactions between a user entity, such as user 'A' 702, and an endpoint device 304. In certain embodiments, the user or non-user entity behavior may be monitored by the endpoint agent 306 during user/network 742 interactions between user 'A' 702 and a network, such as an internal 744 or external 746 network. In certain embodiments, the user or non-user entity behavior may be monitored by the endpoint agent 306 during user/resource 748 interactions between user 'A' 702 and a resource 750, such as a facility, printer, surveillance camera, system, datastore, service, and so forth. In certain embodiments, the monitoring of user or non-user entity behavior by the endpoint agent 306 may include the monitoring of electronically-observable actions respectively enacted by a particular user or non-user entity. In certain embodiments, the endpoint agent 306 may be implemented in combination with the security analytics system 118, the EBC system 120, the anomalous event detection system 122, and the security policy management system 124, or a combination thereof, to detect entity behavior of analytic utility and perform a security operation to mitigate risk.

In certain embodiments, the endpoint agent 306 may be implemented to include an event counter feature pack 2108, an event analytics 310 module, and a security risk scoring system 2124, or a combination thereof. In certain embodiments, the event counter feature pack 2108 may be further implemented to include an event data detector 2110 module, an event counter 2112 module, and an event data collector 2114 module, or a combination thereof. In certain embodiments, the event analytics 310 module may be implemented to include a security policy rule 2116 engine, an event of analytic utility 2118 module, and an anomalous event detection 2120 module, or a combination thereof.

In certain embodiments, the event data detector 2110 module may be implemented to detect event data associated with a particular endpoint device 304, as described in greater detail herein, resulting from user/device 730, user/network 742, user/resource 748, and user/user 770 interactions. In various embodiments, the event counter 2112 module may be implemented to collect, or otherwise track, the occurrence of certain events, or classes of events, as described in greater detail herein, resulting from user/device 730, user/network 742, user/resource 748, and user/user 770 interactions.

In various embodiments, the event data collector 2114 module may be implemented to collect certain event data associated with the user/device 730, user/network 742, user/resource 748, and user/user 770 interactions. In certain embodiments, the security policy 2116 engine may be implemented to manage security policy information relevant to determining whether a particular event is of analytic utility, anomalous, or both. In certain embodiments, the event of analytic utility detection 2118 module may be implemented to detect an event of analytic utility associated with events corresponding to the user/device 730, user/network 742, user/resource 748, and user/user 770 interactions. In various embodiments, the event of analytic utility detection 2118 module may be implemented to use certain security policy information provided by the security policy 2116 engine to determine whether a particular event associated with an endpoint device 304 is of analytic utility. In certain embodiments, the security policy 2116 engine may be implemented to determine whether a particular event of analytic utility associated with an endpoint device 304 is anomalous.

In various embodiments, the anomalous event detection 2120 module may be implemented to perform anomalous event detection operations, described in greater detail herein, associated with events of analytical utility corresponding to the user/device 730, user/network 742, user/resource 748, and user/user 770 interactions. In various embodiments, the event of analytic utility detection 2118 module may be implemented to provide certain information associated with one or more events of analytic utility to the anomalous event detection 2120 module. In various embodiments, the anomalous event detection 2120 module may be implemented to use such information in the performance of certain anomalous event detection operations, which in turn may result in the detection of an anomalous event. In certain embodiments, the endpoint agent 306 may be implemented to communicate the event and associated event counter data collected by the event data collector 2114 module, data associated with the events of analytic utility detected by the event of analytic utility detection 2118 module, and the anomalous events detected by the anomalous event detection 2120 module, or a combination thereof, to the security analytics 118 system or another component of the distributed risk scoring environment.

In certain embodiments, the security risk scoring system 2124 may be implemented to generate an event risk severity score, likewise described in greater detail, for an anomalous event detected by the anomalous event detection 2120 module. In certain embodiments, the security risk scoring system 2124 may be implemented to generate an event risk severity score corresponding to an anomalous event when it is first detected, as likewise described in greater detail herein. In certain embodiments, the risk scoring system 2124 may be implemented, as likewise described in greater detail herein, to use such an event risk severity score as an initial event risk severity score for the detected anomalous event. In certain embodiments, the security risk scoring system 2124 may likewise be implemented, as described in greater detail herein, to apply a particular reduction function to an initial event risk severity score to generate a current event risk severity score for a particular point in time during the longevity time interval associated with the reduction function.

In certain embodiments, as likewise described in greater detail herein, the risk scoring system 2124 may be implemented to apply a particular historical entity risk reduction function to an anomalous event when it is first detected to provide an indication of historical risk. As likewise described in greater detail herein, the risk scoring system 2124 may be implemented in certain embodiments to generate a scenario risk severity score from one or more event risk severity scores. In certain embodiments, the risk scoring system 2124 may be implemented to generate an entity risk severity score, as likewise described in greater detail herein, from one or more event risk severity scores, or one or more scenario risk severity scores, or a combination thereof, for an associated entity. In certain embodiments, as described in greater detail herein, the endpoint agent 306 may be implemented to provide one or more event risk severity scores, or one or more scenario risk severity scores, or a combination thereof, to one or more other components in a distributed risk scoring environment.

In certain embodiments, an edge device 202 may be implemented to include an edge device risk module 2106. In certain embodiments, the edge device risk module 2106 may be implemented to include an anomalous event detection 2128 system, or a security risk scoring system 2144, or both. In certain embodiments, the anomalous event detection 2128 system may be implemented to include an event data detector 2130 module, an event counter 2132 module, an event data collector 2134 module, a security policy rule 2136 engine, an event of analytic utility 2138 module, and an anomalous event detection 2140 module, or a combination thereof.

In certain embodiments, the event data detector 2130 module may be implemented to detect event data associated with a particular edge device 202, as described in greater detail herein, resulting from user/device 730, user/network 742, user/resource 748, and user/user 770 interactions. In various embodiments, the event counter 2132 module may be implemented to collect, or otherwise track, the occurrence of certain events, or classes of events, as described in greater detail herein, resulting from user/device 730, user/network 742, user/resource 748, and user/user 770 interactions.

In various embodiments, the event data collector 2134 module may be implemented to collect certain event data associated with the user/device 730, user/network 742, user/resource 748, and user/user 770 interactions. In certain embodiments, the security policy 2136 engine may be implemented to manage security policy information relevant to determining whether a particular event is of analytic utility, anomalous, or both. In certain embodiments, the event of analytic utility detection 2138 module may be implemented to detect an event of analytic utility associated with events corresponding to the user/device 730, user/network 742, user/resource 748, and user/user 770 interactions. In various embodiments, the event of analytic utility detection 2138 module may be implemented to use certain security policy information provided by the security policy 2136 engine to determine whether a particular event associated with an edge device 202 is of analytic utility. In certain embodiments, the security policy 2136 engine may be implemented to determine whether a particular event of analytic utility associated with an edge device 202 is anomalous.

In various embodiments, the anomalous event detection 2140 module may be implemented to perform anomalous event detection operations, described in greater detail herein, associated with events of analytical utility corresponding to the user/device 730, user/network 742, user/resource 748, and user/user 770 interactions. In various embodiments, the event of analytic utility detection 2138 module may be implemented to provide certain information associated with one or more events of analytic utility to the anomalous event detection 2140 module. In various embodiments, the anomalous event detection 2140 module may be implemented to use such information in the performance of certain anomalous event detection operations, which in turn may result in the detection of an anomalous event. In certain embodiments, the edge device risk module 2106 may be implemented to communicate the event and associated event counter data collected by the event data collector 2134 module, data associated with the events of analytic utility detected by the event of analytic utility detection 2138 module, and the anomalous events detected by the anomalous event detection 2140 module, or a combination thereof, to the security analytics 118 system or another component of the distributed risk scoring environment.

In certain embodiments, the security risk scoring system 2144 may be implemented to generate an event risk severity score, likewise described in greater detail, for an anomalous event detected by the anomalous event detection 2140 module. In certain embodiments, the security risk scoring system 2144 may be implemented to generate an event risk severity score corresponding to an anomalous event when it is first detected, as likewise described in greater detail herein. In certain embodiments, the risk scoring system 2144 may be implemented, as likewise described in greater detail herein, to use such an event risk severity score as an initial event risk severity score for the detected anomalous event. In certain embodiments, the security risk scoring system 2144 may likewise be implemented, as described in greater detail herein, to apply a particular reduction function to an initial event risk severity score to generate a current event risk severity score for a particular point in time during the longevity time interval associated with the reduction function.

In certain embodiments, as likewise described in greater detail herein, the risk scoring system 2144 may be implemented to apply a particular historical entity risk reduction function to an anomalous event when it is first detected to provide an indication of historical risk. As likewise described in greater detail herein, the risk scoring system 2144 may be implemented in certain embodiments to generate a scenario risk severity score from one or more event risk severity scores. In certain embodiments, the risk scoring system 2144 may be implemented to generate an entity risk severity score, as likewise described in greater detail herein, from one or more event risk severity scores, or one or more scenario risk severity scores, or a combination thereof, for an associated entity. In certain embodiments, as described in greater detail herein, the edge device risk module 2106 may be implemented to provide one or more event risk severity scores, or one or more scenario risk severity scores, or a combination thereof, to one or more other components in a distributed risk scoring environment.

In certain embodiments, a third party system 780 may be implemented to include a third party system risk module 2126. In certain embodiments, the third party system risk module 2126 may be implemented to include an anomalous event detection 2148 system, or a security risk scoring system 2164, or both. In certain embodiments, the anomalous event detection 2148 system may be implemented to include an event data detector 2150 module, an event counter 2152 module, an event data collector 2154 module, a security policy rule 2156 engine, an event of analytic utility 2158 module, and an anomalous event detection 2160 module, or a combination thereof.

In certain embodiments, the event data detector 2150 module may be implemented to detect event data associated with a particular third party system 780, as described in greater detail herein, resulting from user/device 730, user/network 742, user/resource 748, and user/user 770 interactions. In various embodiments, the event counter 2152 module may be implemented to collect, or otherwise track, the occurrence of certain events, or classes of events, as described in greater detail herein, resulting from user/device 730, user/network 742, user/resource 748, and user/user 770 interactions.

In various embodiments, the event data collector 2154 module may be implemented to collect certain event data associated with the user/device 730, user/network 742, user/resource 748, and user/user 770 interactions. In certain embodiments, the security policy 2156 engine may be implemented to manage security policy information relevant to determining whether a particular event is of analytic utility, anomalous, or both. In certain embodiments, the event of analytic utility detection 2158 module may be implemented to detect an event of analytic utility associated with events corresponding to the user/device 730, user/network 742, user/resource 748, and user/user 770 interactions. In various embodiments, the event of analytic utility detection 2158 module may be implemented to use certain security policy information provided by the security policy 2156 engine to determine whether a particular event associated with a third party system 780 is of analytic utility. In certain embodiments, the security policy 2156 engine may be implemented to determine whether a particular event of analytic utility associated with a third party system 780 is anomalous.

In various embodiments, the anomalous event detection 2160 module may be implemented to perform anomalous event detection operations, described in greater detail herein, associated with events of analytical utility corresponding to the user/device 730, user/network 742, user/resource 748, and user/user 770 interactions. In various embodiments, the event of analytic utility detection 2158 module may be implemented to provide certain information associated with one or more events of analytic utility to the anomalous event detection 2160 module. In various embodiments, the anomalous event detection 2160 module may be implemented to use such information in the performance of certain anomalous event detection operations, which in turn may result in the detection of an anomalous event. In certain embodiments, the third party system risk module 2126 may be implemented to communicate the event and associated event counter data collected by the event data collector 2154 module, data associated with the events of analytic utility detected by the event of analytic utility detection 2158 module, and the anomalous events detected by the anomalous event detection 2160 module, or a combination thereof, to the security analytics 118 system or another component of the distributed risk scoring environment.

In certain embodiments, the security risk scoring system 2164 may be implemented to generate an event risk severity score, likewise described in greater detail, for an anomalous event detected by the anomalous event detection 2160 module. In certain embodiments, the security risk scoring system 2164 may be implemented to generate an event risk severity score corresponding to an anomalous event when it is first detected, as likewise described in greater detail herein. In certain embodiments, the risk scoring system 2164 may be implemented, as likewise described in greater detail herein, to use such an event risk severity score as an initial event risk severity score for the detected anomalous event. In certain embodiments, the security risk scoring system 2164 may likewise be implemented, as described in greater detail herein, to apply a particular reduction function to an initial event risk severity score to generate a current event risk severity score for a particular point in time during the longevity time interval associated with the reduction function.

In certain embodiments, as likewise described in greater detail herein, the risk scoring system 2164 may be implemented to apply a particular historical entity risk reduction function to an anomalous event when it is first detected to provide an indication of historical risk. As likewise described in greater detail herein, the risk scoring system 2164 may be implemented in certain embodiments to generate a scenario risk severity score from one or more event risk severity scores. In certain embodiments, the risk scoring system 2164 may be implemented to generate an entity risk severity score, as likewise described in greater detail herein, from one or more event risk severity scores, or one or more scenario risk severity scores, or a combination thereof, for an associated entity. In certain embodiments, as described in greater detail herein, the third party system risk module 2126 may be implemented to provide one or more event risk severity scores, or one or more scenario risk severity scores, or a combination thereof, to one or more other components of the distributed risk scoring environment.

In certain embodiments, the security analytics system 118 may be implemented to receive the event data, the event counter data, the data associated with the detected events of analytic utility and anomalous events, or a combination thereof, provided by the endpoint agent 306, the edge device risk module 2106, and the third party system risk module 2126, or a combination thereof. In certain embodiments, the security analytics system 118 may be implemented to provide the event data and event counter data, the data associated with the detected endpoint events of analytic utility and anomalous events, or a combination thereof, to the EBC system 120, the anomalous event detection system 122, and the security risk scoring system 124 for processing.

In certain embodiment, the EBC system 120 may be implemented to include an EBP element generator 2162 module, an EBP session generator 2166 module, an EBP generator 2168 module, or a combination thereof. In various embodiments, the EBP element generator 2162 module may be implemented to process the event and event counter, data associated with events of analytic utility and anomalous events provided by the endpoint agent 306 to generate EBP elements, described in greater detail herein. In certain embodiments, the EBP session generator 2166 may be implemented to use the event and endpoint event counter, data associated with events of analytic utility and anomalous events provided by the endpoint agent 306, to generate session information. In certain embodiments, the EBP session generator 2166 may be implemented to use the resulting session information to generate an activity session, described in greater detail herein. In various embodiments, as likewise described in greater detail herein, certain EBP management operations may be performed to associate EBP elements generated by the EBP element generator 2162 module with a corresponding EBP. Likewise, certain EBP management operations may be performed to use the session information generated by the EBP session generator 2166 module to associate a particular EBP element with a particular EBP In certain embodiments, the anomalous event detection system 122 may be implemented to include an event data detector 2170 module, an event counter 2172 module, an event data collector 2174 module, a security policy rule 2176 engine, an event of analytic utility 2178 module, and an anomalous event detection 2180 module, or a combination thereof. In certain embodiments, the event data detector 2170 module may be implemented to detect event data associated with a particular endpoint device 304, edge device 202, or third party system 780, as described in greater detail herein, resulting from user/device 730, user/network 742, user/resource 748, and user/user 770 interactions. In various embodiments, the event counter 2172 module may be implemented to collect, or otherwise track, the occurrence of certain events, or classes of events, as described in greater detail herein, resulting from user/device 730, user/network 742, user/resource 748, and user/user 770 interactions.

In various embodiments, the event data collector 2174 module may be implemented to collect certain event data associated with the user/device 730, user/network 742, user/resource 748, and user/user 770 interactions. In certain embodiments, the security policy 2176 engine may be implemented to manage security policy information relevant to determining whether a particular event is of analytic utility, anomalous, or both. In certain embodiments, the event of analytic utility detection 2178 module may be implemented to detect an event of analytic utility associated with events corresponding to the user/device 730, user/network 742, user/resource 748, and user/user 770 interactions. In various embodiments, the event of analytic utility detection 2178 module may be implemented to use certain security policy information provided by the security policy 2176 engine to determine whether a particular event associated with a particular endpoint device 304, edge device 202, or third party system 780 is of analytic utility. In certain embodiments, the security policy 2156 engine may be implemented to determine whether a particular event of analytic utility associated with an endpoint device, edge device 202, or third party system 780 is anomalous.

In various embodiments, the anomalous event detection 2180 module may be implemented to perform anomalous event detection operations, described in greater detail herein, associated with events of analytical utility corresponding to the user/device 730, user/network 742, user/resource 748, and user/user 770 interactions. In various embodiments, the event of analytic utility detection 2178 module may be implemented to provide certain information associated with one or more events of analytic utility to the anomalous event detection 2180 module. In various embodiments, the anomalous event detection 2180 module may be implemented to use such information in the performance of certain anomalous event detection operations, which in turn may result in the detection of an anomalous event. In certain embodiments, the anomalous event detection system 122 may be implemented to communicate the event and associated event counter data collected by the event data collector 2154 module, data associated with the events of analytic utility detected by the event of analytic utility detection 2158 module, and the anomalous events detected by the anomalous event detection 2160 module, or a combination thereof, to another component of the distributed risk scoring environment.

In certain embodiments, the security risk scoring system 124 may be implemented to generate an event risk severity score, likewise described in greater detail, for an anomalous event detected by the anomalous event detection 2180 module. In certain embodiments, the security risk scoring system 124 may be implemented to generate an event risk severity score corresponding to an anomalous event when it is first detected, as likewise described in greater detail herein. In certain embodiments, the risk scoring system 124 may be implemented, as likewise described in greater detail herein, to use such an event risk severity score as an initial event risk severity score for the detected anomalous event. In certain embodiments, the security risk scoring system 124 may likewise be implemented, as described in greater detail herein, to apply a particular reduction function to an initial event risk severity score to generate a current event risk severity score for a particular point in time during the longevity time interval associated with the reduction function.

In certain embodiments, as likewise described in greater detail herein, the risk scoring system 124 may be implemented to apply a particular historical entity risk reduction function to an anomalous event when it is first detected to provide an indication of historical risk. As likewise described in greater detail herein, the risk scoring system 124 may be implemented in certain embodiments to generate a scenario risk severity score from one or more event risk severity scores. In certain embodiments, the risk scoring system 124 may be implemented to generate an entity risk severity score, as likewise described in greater detail herein, from one or more event risk severity scores, or one or more scenario risk severity scores, or a combination thereof, for an associated entity. In certain embodiments, as described in greater detail herein, the security risk scoring system 124 may be implemented to provide one or more event risk severity scores, or one or more scenario risk severity scores, or a combination thereof, to one or more other components of the distributed risk scoring environment. Those of skill in the art will recognize that many such implementations are possible. Accordingly, the foregoing is not intended to limit the spirit, scope, or intent of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for generating an anomalous event risk score, comprising:
monitoring a plurality of electronically-observable actions of an entity, the plurality of electronically-observable actions of the entity corresponding to a respective plurality of events enacted by the entity, the entity comprising a user entity;
converting the plurality of electronically-observable actions of the entity to electronic information representing the plurality of actions of the entity;
identifying an anomalous event from the plurality of events enacted by the entity;
generating a first event risk severity score based upon the anomalous event, the first event risk severity score being generated at a time the anomalous event is identified;
generating a second event risk severity score based upon a historical entity risk function, the historical entity risk function providing an indication of historical security risk of the entity, the historical entity risk function comprises a historical entity risk reduction function, the historical risk reduction function being selected from a flat reduction function, a gradual reduction function, a flat then gradual reduction function and a step reduction function;
generating an entity risk severity score for the entity, the generating using the historical entity risk function and the event risk severity score;
performing a security analytics operation via the security analytics system using the event risk severity score, the security analytics system executing on a hardware processor, the security analytics operation using the entity risk severity score, the security analytics operation responding to mitigate a security risk associated with the anomalous event.

2. The method of claim 1, wherein:
the first event risk severity score comprises an initial event risk severity score, the initial event risk severity score comprising an initial event risk severity score value;
the initial event security risk score value is modified to provide a current event risk severity score by application of a reduction function to the initial event security risk score value.

3. The method of claim 2, wherein:
the reduction function comprises at least one of a flat reduction function, a gradual reduction function, a flat then gradual reduction function, and a step reduction function.

4. The method of claim 2, wherein:
the reduction function comprises an associated longevity time interval, the risk reduction function being applied to the initial event risk severity score for the associated longevity time interval;
the historical entity risk reduction function comprises an associated historical longevity time interval, the historical entity risk reduction being maintained for the associated longevity time interval.

5. The method of claim 2, wherein:
the initial event risk severity score value is modified to provide a current event risk severity score by application of the reduction function and the historical risk reduction function to the initial event security risk score value.

6. The method of claim 5, further comprising:
identifying when another anomalous event occurs;
generating another event risk severity score based upon the another anomalous event;
generating a new entity risk severity score based upon the historical risk reduction function and the another event risk severity score.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
monitoring a plurality of electronically-observable actions of an entity, the plurality of electronically-observable actions of the entity corresponding to a respective plurality of events enacted by the entity, the entity comprising a user entity;

converting the plurality of electronically-observable actions of the entity to electronic information representing the plurality of actions of the entity;

identifying an anomalous event from the plurality of events enacted by the entity;

generating a first event risk severity score based upon the anomalous event, the first event risk severity score being generated at a time the anomalous event is identified;

generating a second event risk severity score based upon a historical entity risk function, the historical entity risk function providing an indication of historical security risk of the entity, the historical entity risk function maintaining the second event risk severity score for a longevity time interval, the longevity time interval comprising an interval of time during which the historical entity risk function is applied to generate the second event risk severity score;

generating an entity risk severity score for the entity, the generating using the historical entity risk function and the event risk severity score;

performing a security analytics operation via the security analytics system using the event risk severity score, the security analytics system executing on a hardware processor, the security analytics operation using the entity risk severity score, the security analytics operation responding to mitigate a security risk associated with the anomalous event.

8. The system of claim 7, wherein:
the first event risk severity score comprises an initial event risk severity score, the initial event risk severity score comprising an initial event risk severity score value;
the initial event security risk score value is modified to provide a current event risk severity score by application of a reduction function to the initial event security risk score value.

9. The system of claim 8, wherein:
the reduction function comprises at least one of a flat reduction function, a gradual reduction function, a flat then gradual reduction function, and a step reduction function.

10. The system of claim 8, wherein:
the reduction function comprises an associated longevity time interval, the risk reduction function being applied to the initial event risk severity score for the associated longevity time interval;
the historical entity risk reduction function comprises an associated historical longevity time interval, the historical entity risk reduction being maintained for the associated longevity time interval.

11. The system of claim 8, wherein:
the initial event risk severity score value is modified to provide a current event risk severity score by application of the reduction function and the historical risk reduction function to the initial event security risk score value.

12. The system of claim 11, wherein the instructions executable by the processor are further configured for:
identifying when another anomalous event occurs;
generating another event risk severity score based upon the another anomalous event;

generating a new entity risk severity score based upon the historical risk reduction function and the another event risk severity score.

13. A non-transitory, computer-readable storage medium embodying computer program code, the computer program code comprising computer executable instructions configured for:

monitoring a plurality of electronically-observable actions of an entity, the plurality of electronically-observable actions of the entity corresponding to a respective plurality of events enacted by the entity, the entity comprising a user entity;

converting the plurality of electronically-observable actions of the entity to electronic information representing the plurality of actions of the entity;

identifying an anomalous event from the plurality of events enacted by the entity;

generating a first event risk severity score based upon the anomalous event, the first event risk severity score being generated at a time the anomalous event is identified;

generating a second event risk severity score based upon a historical entity risk function, the historical entity risk function providing an indication of historical security risk of the entity, the historical entity risk function maintaining the second event risk severity score for a longevity time interval, the longevity time interval comprising an interval of time during which the historical entity risk function is applied to generate the second event risk severity score;

generating an entity risk severity score for the entity, the generating using the historical entity risk function and the event risk severity score;

performing a security analytics operation via the security analytics system using the event risk severity score, the security analytics system executing on a hardware processor, the security analytics operation using the entity risk severity score, the security analytics operation responding to mitigate a security risk associated with the anomalous event.

14. The non-transitory, computer-readable storage medium of claim 13, wherein:
the first event risk severity score comprises an initial event risk severity score, the initial event risk severity score comprising an initial event risk severity score value;
the initial event security risk score value is modified to provide a current event risk severity score by application of a reduction function to the initial event security risk score value.

15. The non-transitory, computer-readable storage medium of claim 14, wherein:
the reduction function comprises at least one of a flat reduction function, a gradual reduction function, a flat then gradual reduction function, and a step reduction function.

16. The non-transitory, computer-readable storage medium of claim 14, wherein:
the reduction function comprises an associated longevity time interval, the risk reduction function being applied to the initial event risk severity score for the associated longevity time interval;
the historical entity risk reduction function comprises an associated historical longevity time interval, the historical entity risk reduction being maintained for the associated longevity time interval.

17. The non-transitory, computer-readable storage medium of claim 14, wherein:
  the initial event risk severity score value is modified to provide a current event risk severity score by application of the reduction function and the historical risk reduction function to the initial event security risk score value.

18. The non-transitory, computer-readable storage medium of claim 13, wherein the computer executable instructions are further configured for:
  identifying when another anomalous event occurs;
  generating another event risk severity score based upon the another anomalous event;
  generating a new entity risk severity score based upon the historical risk reduction function and the another event risk severity score.

19. The non-transitory, computer-readable storage medium of claim 13, wherein:
  the computer executable instructions are deployable to a client system from a server system at a remote location.

20. The non-transitory, computer-readable storage medium of claim 13, wherein:
  the computer executable instructions are provided by a service provider to a user on an on-demand basis.

* * * * *